US010695631B2

(12) United States Patent
Morrow et al.

(10) Patent No.: US 10,695,631 B2
(45) Date of Patent: Jun. 30, 2020

(54) LACROSSE HEAD POCKET AND RELATED METHOD OF MANUFACTURE

(71) Applicant: Warrior Sports, Inc., Warren, MI (US)

(72) Inventors: David K. Morrow, Cherry Hills Village, CO (US); Tina Tse, Sterling Heights, MI (US); Zachary W. Currier, Fraser, MI (US)

(73) Assignee: Warrior Sports, Inc., Warren, MI (US)

( * ) Notice: Subject to any disclaimer, the term of this patent is extended or adjusted under 35 U.S.C. 154(b) by 120 days.

(21) Appl. No.: 16/123,252

(22) Filed: Sep. 6, 2018

(65) Prior Publication Data

US 2019/0009153 A1   Jan. 10, 2019

Related U.S. Application Data

(63) Continuation-in-part of application No. 15/015,375, filed on Feb. 4, 2016, now Pat. No. 10,226,673, which
(Continued)

(51) Int. Cl.
*A63B 59/20* (2015.01)
*D03D 1/00* (2006.01)
(Continued)

(52) U.S. Cl.
CPC .............. *A63B 59/20* (2015.10); *A63B 59/00* (2013.01); *B29C 45/14* (2013.01);
(Continued)

(58) Field of Classification Search
CPC ...................................................... A63B 59/20
See application file for complete search history.

(56) References Cited

U.S. PATENT DOCUMENTS 1,017,376 A * 2/1912 Brandt ................... A63B 67/22
473/507
1,411,459 A * 4/1922 Severin .................... F21H 3/00
431/100
(Continued)

FOREIGN PATENT DOCUMENTS

CA    2326206 A1    5/2001
CA    2359858 A1    4/2002
(Continued)

OTHER PUBLICATIONS

US Lacrosse, 2018 Stick Rules, available at https://www.uslacrosse.org/sites/default/files/public/documents/rules/2018-ncaa-stick-rules.pdf (Year: 2018).
(Continued)

*Primary Examiner* — Matthew J Daniels
*Assistant Examiner* — Andrew D Graham
(74) *Attorney, Agent, or Firm* — Warner Norcross + Judd, LLP

(57) ABSTRACT

A lacrosse head pocket and a related method of manufacture are provided to facilitate consistent, repeatable and/or custom manufacture of lacrosse equipment. The pocket can be knitted, weaved or otherwise assembled on an automated assembly machine from strands, and/or can be formed as a unitary textile material having regions/sections with different physical and/or mechanical properties. The pocket can be integrally molded within portions of a lacrosse head to eliminate manually constructed connections between the pocket and lacrosse head. The pocket can include a perimeter flange constructed from special materials and/or a perimeter flange including intermittent voids along an outer edge so that the perimeter flange stretches when the pocket is in a loaded state with the lacrosse ball therein, thereby
(Continued)

providing dampening to the pocket when a lacrosse ball exerts force upon the pocket in the loaded state.

16 Claims, 34 Drawing Sheets

Related U.S. Application Data is a continuation of application No. 14/843,558, filed on Sep. 2, 2015, now Pat. No. 9,283,699, which is a continuation of application No. 14/815,001, filed on Jul. 31, 2015, now Pat. No. 10,238,937.

(60) Provisional application No. 62/555,867, filed on Sep. 8, 2017, provisional application No. 62/147,795, filed on Apr. 15, 2015, provisional application No. 62/111,837, filed on Feb. 4, 2015, provisional application No. 62/067,151, filed on Oct. 22, 2014, provisional application No. 62/034,252, filed on Aug. 7, 2014.

(51) Int. Cl.
| | | |
|---|---|---|
| *D03D 13/00* | (2006.01) | |
| *D04B 1/22* | (2006.01) | |
| *D05B 1/02* | (2006.01) | |
| *B29C 45/14* | (2006.01) | |
| *D03D 51/00* | (2006.01) | |
| *D04B 15/78* | (2006.01) | |
| *D05B 19/12* | (2006.01) | |
| *B29C 65/02* | (2006.01) | |
| *A63B 59/00* | (2015.01) | |
| *B29L 31/52* | (2006.01) | |
| *A63B 102/14* | (2015.01) | |
| *B29C 65/00* | (2006.01) | |
| *B29C 65/18* | (2006.01) | |
| *B29K 77/00* | (2006.01) | |
| *B29C 45/16* | (2006.01) | |
| *B29C 45/00* | (2006.01) | |
| *B29K 623/00* | (2006.01) | |
| *B29K 677/00* | (2006.01) | |
| *B29K 101/12* | (2006.01) | |
| *B29L 28/00* | (2006.01) | |
| *B29C 70/68* | (2006.01) | |
| *B29C 45/76* | (2006.01) | |
| *B29K 101/00* | (2006.01) | |

(52) U.S. Cl.
CPC .. *B29C 45/14065* (2013.01); *B29C 45/14336* (2013.01); *B29C 45/14786* (2013.01); *B29C 65/02* (2013.01); *D03D 1/00* (2013.01); *D03D 13/004* (2013.01); *D03D 51/00* (2013.01); *D04B 1/22* (2013.01); *D04B 15/78* (2013.01); *D05B 1/02* (2013.01); *D05B 19/12* (2013.01); *A63B 2102/14* (2015.10); *B29C 45/0046* (2013.01); *B29C 45/14221* (2013.01); *B29C 45/14262* (2013.01); *B29C 45/1671* (2013.01); *B29C 45/76* (2013.01); *B29C 65/18* (2013.01); *B29C 66/1122* (2013.01); *B29C 66/301* (2013.01); *B29C 66/43* (2013.01); *B29C 66/729* (2013.01); *B29C 66/73921* (2013.01); *B29C 66/81427* (2013.01); *B29C 66/919* (2013.01); *B29C 66/91421* (2013.01); *B29C 70/688* (2013.01); *B29C 2045/14147* (2013.01); *B29C 2045/14245* (2013.01); *B29K 2023/06* (2013.01); *B29K 2077/00* (2013.01); *B29K 2101/00* (2013.01); *B29K 2101/12* (2013.01); *B29K 2623/0683* (2013.01); *B29K 2677/00* (2013.01); *B29K 2713/00* (2013.01); *B29L 2028/00* (2013.01); *B29L 2031/52* (2013.01); *B29L 2031/5227* (2013.01); *B29L 2031/5245* (2013.01); *D03D 2700/265* (2013.01); *D10B 2401/041* (2013.01); *D10B 2403/033* (2013.01); *D10B 2507/00* (2013.01)

(56) References Cited

U.S. PATENT DOCUMENTS

| | | | |
|---|---|---|---|
| 2,039,138 A | 4/1936 | Auer | |
| 2,042,984 A * | 6/1936 | Fritz | A63B 67/22 473/505 |
| 2,460,674 A * | 2/1949 | Lajos | A41C 3/02 450/40 |
| 2,659,958 A | 11/1953 | Johnson | |
| 3,389,580 A * | 6/1968 | Bentley | D04B 11/06 66/89 |
| 3,507,495 A * | 4/1970 | Fracalossi | A63B 59/20 473/513 |
| 3,702,702 A * | 11/1972 | Hoult | A63B 59/20 473/513 |
| 3,726,112 A | 4/1973 | Roque | |
| 3,789,098 A | 1/1974 | Cole et al. | |
| 3,822,062 A * | 7/1974 | Tucker | A63B 59/20 473/513 |
| 3,905,088 A * | 9/1975 | Tucker | A63B 59/20 29/433 |
| 4,022,477 A | 5/1977 | Pool | |
| 4,034,984 A * | 7/1977 | Crawford | A63B 59/20 473/513 |
| 4,049,273 A * | 9/1977 | Pool | A63B 59/20 473/513 |
| 4,097,046 A * | 6/1978 | Friant | A63B 60/00 473/513 |
| 4,153,251 A * | 5/1979 | Pond | A63B 51/02 473/513 |
| 4,185,822 A | 1/1980 | Li | |
| 4,273,331 A | 6/1981 | Fischer | |
| 4,460,178 A | 7/1984 | Ulman | |
| 4,756,026 A | 7/1988 | Pierce, Jr. | |
| 4,861,042 A * | 8/1989 | Trettin | A63B 59/20 473/513 |
| 4,938,480 A * | 7/1990 | Lods | A63B 51/02 473/513 |
| D318,509 S * | 7/1991 | Naumburg, Jr. | D21/724 |
| 5,174,580 A | 12/1992 | Pratt | |
| 5,269,532 A | 12/1993 | Tucker et al. | |
| 5,339,657 A * | 8/1994 | McMurray | D04B 21/10 66/195 |
| 5,425,541 A * | 6/1995 | Ambros | A63B 60/42 473/513 |
| 5,460,369 A * | 10/1995 | Baum | A63B 59/50 473/567 |
| 5,735,759 A | 4/1998 | Lin et al. | |
| 5,752,496 A | 5/1998 | McPherson | |
| 5,771,716 A | 6/1998 | Schlussel | |
| 5,920,970 A | 7/1999 | Coblentz | |
| 5,957,791 A * | 9/1999 | Nichols | A63B 60/46 473/513 |
| 6,082,145 A * | 7/2000 | Lonati | A41C 3/0007 66/170 |
| 6,116,057 A * | 9/2000 | Roell | D04B 1/22 66/64 |
| 6,213,901 B1 * | 4/2001 | Collinson | A63B 51/00 473/513 |
| 6,318,131 B1 | 11/2001 | Kobata et al. | |
| 6,390,232 B1 | 5/2002 | Kirschbaum | |
| 6,402,646 B1 | 6/2002 | Wolf | |
| 6,447,410 B2 | 9/2002 | Crawford | |
| 6,471,276 B1 | 10/2002 | Brunsman et al. | |
| 6,506,132 B1 * | 1/2003 | Brine, III | A63B 49/038 473/513 |
| 6,520,875 B1 | 2/2003 | Crawford | |

(56) References Cited

U.S. PATENT DOCUMENTS

| | | | |
|---|---|---|---|
| 6,533,686 B2 | 3/2003 | LeMire | |
| 6,540,950 B1 | 4/2003 | Coffield | |
| 6,572,498 B2 | 6/2003 | Nevers | |
| 6,626,774 B2 | 9/2003 | Sorbie | |
| 6,641,492 B2 | 11/2003 | LeMire | |
| 6,681,601 B2 | 1/2004 | Li | |
| 6,852,047 B2 | 2/2005 | Tucker, Sr. | |
| 6,916,259 B2 | 7/2005 | Kohler et al. | |
| 6,966,854 B1 | 11/2005 | Gait | |
| 7,022,035 B2 | 4/2006 | Morrow et al. | |
| 7,070,523 B1 | 7/2006 | Gait | |
| 7,131,919 B2 | 11/2006 | Kohler et al. | |
| 7,192,369 B2 | 3/2007 | Morrow | |
| 7,211,009 B2 | 5/2007 | Samaras et al. | |
| 7,238,128 B1 | 7/2007 | Filice et al. | |
| 7,278,936 B2 | 10/2007 | Tucker, Jr. | |
| 7,331,884 B2 | 2/2008 | Samaras et al. | |
| RE40,182 E * | 3/2008 | Morrow | A63B 59/20 473/513 |
| 7,338,396 B2 | 3/2008 | Gait | |
| 7,347,011 B2 | 3/2008 | Dua et al. | |
| 7,364,519 B1 | 4/2008 | Gait | |
| 7,390,275 B1 | 6/2008 | Gait | |
| 7,458,908 B1 | 12/2008 | Gait | |
| 7,503,859 B1 | 3/2009 | Gait | |
| 7,507,171 B2 | 3/2009 | Gait | |
| 7,524,253 B1 | 4/2009 | Gait | |
| 7,682,269 B1 * | 3/2010 | Gait | A63B 59/20 473/513 |
| 7,727,092 B2 | 6/2010 | Lignelli et al. | |
| 7,736,251 B2 | 6/2010 | Rogers et al. | |
| 7,749,112 B2 | 7/2010 | Hayden et al. | |
| 7,749,113 B2 * | 7/2010 | Morrow | A63B 59/20 473/513 |
| 7,833,116 B2 | 11/2010 | Tucker, Sr. et al. | |
| 7,854,670 B2 | 12/2010 | Gait | |
| 7,905,801 B2 * | 3/2011 | Schmidt | A63B 60/38 473/513 |
| 7,963,867 B1 * | 6/2011 | Gait | A63B 59/20 473/513 |
| 7,979,918 B2 * | 7/2011 | Sandusky | F41H 5/0492 2/2.5 |
| 8,083,978 B1 | 12/2011 | Fox et al. | |
| 8,235,846 B2 | 8/2012 | Winningham et al. | |
| 8,282,512 B1 | 10/2012 | Winningham et al. | |
| 8,371,966 B2 | 2/2013 | Winningham et al. | |
| 8,839,532 B2 | 9/2014 | Huffa et al. | |
| D726,850 S | 4/2015 | Burns et al. | |
| 9,283,699 B2 | 3/2016 | Morrow et al. | |
| 9,468,824 B1 * | 10/2016 | Miceli | A63B 59/20 |
| 9,492,723 B1 * | 11/2016 | McCampbell | A63B 59/20 |
| D832,954 S | 11/2018 | Binge et al. | |
| D842,403 S | 3/2019 | Paquette | |
| 2001/0044347 A1 | 11/2001 | Crawford | |
| 2002/0107094 A1 | 8/2002 | LeMire | |
| 2002/0160865 A1 | 10/2002 | Brine, III et al. | |
| 2002/0173389 A1 | 11/2002 | Morrow | |
| 2003/0100388 A1 | 5/2003 | LeMire | |
| 2003/0181270 A1 | 9/2003 | Morrow et al. | |
| 2004/0029657 A1 | 2/2004 | Scaramuzzino et al. | |
| 2004/0053714 A1 | 3/2004 | Gait et al. | |
| 2005/0010142 A1 | 1/2005 | Kim | |
| 2006/0046876 A1 | 3/2006 | Tucker, Jr. | |
| 2006/0194655 A1 * | 8/2006 | Tucker, Sr. | A63B 59/20 473/513 |
| 2006/0258488 A1 | 11/2006 | Lamson et al. | |
| 2007/0010357 A1 | 1/2007 | Matthew | |
| 2007/0054760 A1 | 3/2007 | Gait | |
| 2007/0191153 A1 | 8/2007 | Gait | |
| 2008/0026883 A1 | 1/2008 | MacNeil et al. | |
| 2008/0127615 A1 | 6/2008 | Gait | |
| 2008/0146385 A1 * | 6/2008 | Lundberg | A63B 59/20 473/513 |
| 2008/0146387 A1 | 6/2008 | Gait | |
| 2008/0214336 A1 * | 9/2008 | Lamson | A63B 59/20 473/513 |
| 2008/0268987 A1 * | 10/2008 | Lignelli | A63B 59/20 473/513 |
| 2010/0075785 A1 | 3/2010 | Winningham et al. | |
| 2010/0190590 A1 * | 7/2010 | Sobel | A63B 59/20 473/513 |
| 2011/0160007 A1 | 6/2011 | Winningham et al. | |
| 2012/0122617 A1 | 5/2012 | Szurley | |
| 2012/0165140 A1 * | 6/2012 | Bound | A63B 60/00 473/513 |
| 2012/0205268 A1 * | 8/2012 | Kreger | A63B 71/0045 206/315.1 |
| 2012/0246973 A1 | 10/2012 | Dua | |
| 2012/0255670 A1 | 10/2012 | Winningham et al. | |
| 2012/0318026 A1 | 12/2012 | Dua et al. | |
| 2013/0296082 A1 * | 11/2013 | Gonzalez | A63B 60/00 473/513 |
| 2014/0103566 A1 | 4/2014 | Janisse | |
| 2014/0106910 A1 | 4/2014 | Burns et al. | |
| 2014/0106911 A1 * | 4/2014 | Burns | B29C 45/14786 473/513 |
| 2014/0173934 A1 | 6/2014 | Bell | |
| 2014/0186090 A1 * | 7/2014 | Gozzo | D06M 23/02 401/52 |
| 2014/0221137 A1 | 8/2014 | Krysiak et al. | |
| 2014/0302951 A1 | 10/2014 | White et al. | |
| 2014/0349789 A1 * | 11/2014 | Szurley | B32B 37/185 473/513 |
| 2015/0018136 A1 | 1/2015 | Goldstein et al. | |
| 2015/0059154 A1 * | 3/2015 | Miceli | D06M 13/02 29/458 |
| 2016/0008688 A1 * | 1/2016 | Van Loon, III | A63B 59/20 473/513 |
| 2016/0024693 A1 | 1/2016 | Henry et al. | |
| 2016/0038802 A1 * | 2/2016 | Morrow | D03D 1/00 473/513 |
| 2016/0101333 A1 * | 4/2016 | McCampbell | A63B 59/20 473/513 |
| 2016/0206939 A1 * | 7/2016 | Huffa | D03D 1/00 |
| 2017/0340934 A1 * | 11/2017 | Kohler | D02G 3/28 |
| 2018/0140914 A1 | 5/2018 | Gait | |
| 2019/0009153 A1 * | 1/2019 | Morrow | B29C 45/14786 |

FOREIGN PATENT DOCUMENTS

| | | | |
|---|---|---|---|
| CN | 104117674 A | 10/2014 | |
| CN | 104274912 A | 1/2015 | |
| CN | 104324493 A | 2/2015 | |
| GB | 2274067 A | 7/1994 | |
| JP | H02-116390 A | 5/1990 | |
| JP | H07-39612 A | 2/1995 | |

OTHER PUBLICATIONS

Photo of deBeer Lacrosse Head.

Webpage download, e-lacrosse, 2003, www.e-lacrosse.com/stech67.php, 10 pages.

U.S. Appl. No. 62/061,631, filed Oct. 8, 2014 by Jake McCampbell. This is a provisional of above cited U.S. Application 2016/0101333, but includes significantly less disclosure compared to the above cited U.S. Application.

Webpage download, Dupont2013, 2013, www.dupont.com/products-and-services/fabrics-fibers-nonwovens/fibers/brands/kevlar.html/, 5 pages.

* cited by examiner

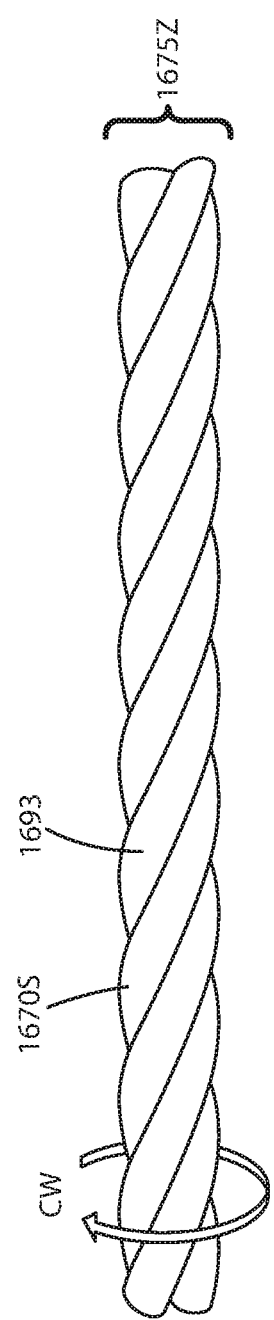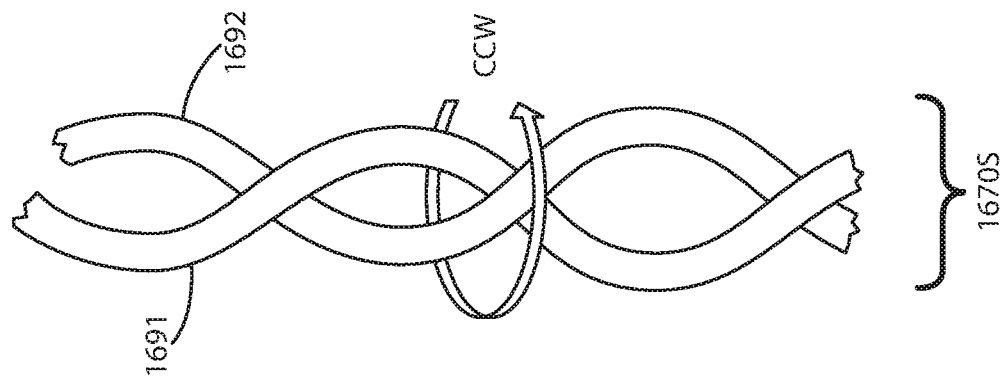
Fig. 30
Fig. 29

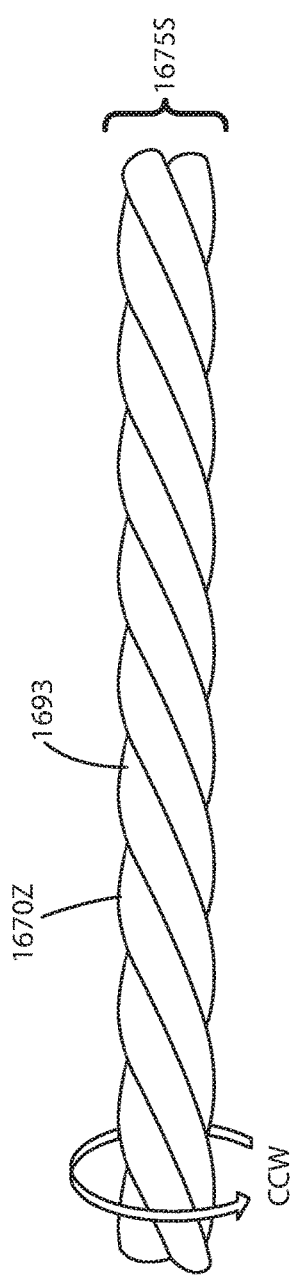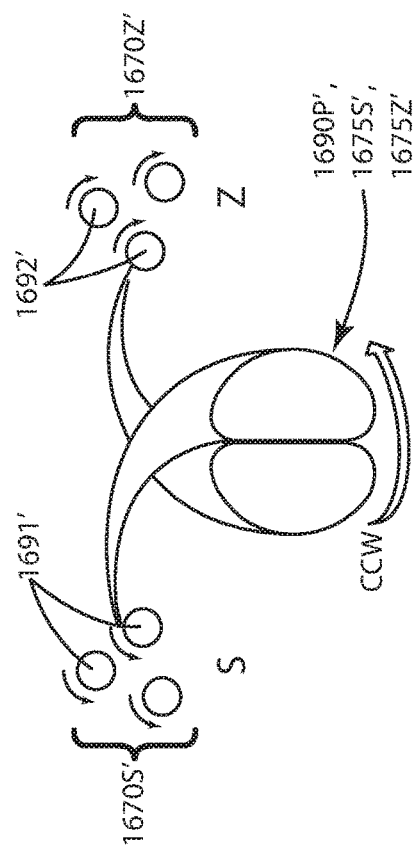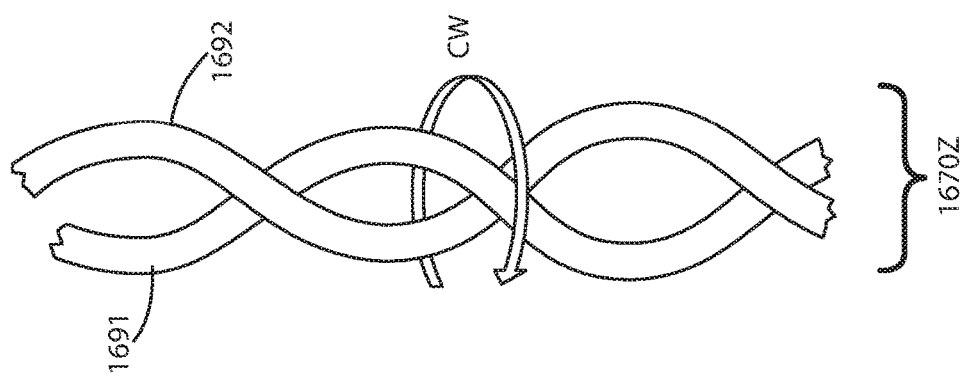
Fig. 32
Fig. 33
Fig. 31

LACROSSE HEAD POCKET AND RELATED METHOD OF MANUFACTURE

BACKGROUND OF THE INVENTION

The present invention relates generally to lacrosse equipment, and more particularly, to a lacrosse head pocket and a related method of manufacture.

Conventional lacrosse sticks include a head joined with a handle. The head includes a frame that forms a region within which a lacrosse ball can be caught, held or shot. A net is joined with the back side of the frame. Typically, the net is constructed from conventional, large diameter laces (e.g., a traditional pocket) or mesh (e.g., a mesh pocket), which is further connected to the frame via multiple small holes defined by the frame. The net forms a pocket within which the lacrosse ball is held while a player is in possession of the ball, and can be a determinant factor as to the player's ability to catch, retain and shoot the ball.

When the net is in the form of a traditional pocket, it usually includes four separate leather large dimension thongs joined with the laces. The laces are held in place with sidewall strings that are carefully sewn through net holes in the sidewall of the lacrosse head. Such traditional pockets typically require extensive maintenance, and are prone to deteriorated performance when the thongs are subject to moisture. Repeated use of a traditional pocket also can stretch out the thongs, thereby changing the shape and performance of the pocket. Over time, the pocket begins to behave differently. In turn, the pocket has varying performance consistency over its useful life. Players thus have to adapt to the changing pocket, or adjust the pocket to a preferred condition.

In addition, when a traditional pocket wears out, the mere thought of replacing it can be daunting to many, particularly younger or less experienced lacrosse players. This also can be true for mesh pockets, which include a single piece of soft mesh material that is carefully attached directly to the lacrosse head. The reason many players dread replacing or servicing pockets is because most pockets require a complex lacing procedure, which is mastered by only a limited number of individuals, to secure the net to a lacrosse head and attain a desired pocket configuration. Thus, many lacrosse players, particularly youths and newcomers to the sport, are left at the mercy of having to wait for their lacrosse sticks to be restrung by someone else, and even then, after the pocket is strung, it usually takes several weeks or months until the pocket is properly broken in to achieve a desired profile.

Mesh pockets also have other drawbacks. One in particular is the absence of shooting strings, a shooting ramp or a defined ball channel within the single piece of mesh. Users sometimes intertwine additional pieces of lace in the mesh to form the same, but this can require a special level of skill and time to do it properly.

Some manufacturers have attempted to combine different types of pockets. For example, one type of pocket includes a mesh part near the ball stop of the head, and a plastic sheet near the scoop. The sheet is laced to the mesh, with the lacing extending across the width of the pocket. Another type of pocket includes two meshes. One mesh, such as a ten hole mesh, is near the scoop, and another mesh, such as a seven hole mesh, is in the throat and near the ball stop.

While conventional lacrosse pockets provide some level of ball control and shooting performance, there remains room for improvement.

SUMMARY OF THE INVENTION

A lacrosse head is provided including a lacrosse pocket that is durable and provides desirable playing characteristics. The pocket is easy to manufacture, replace and/or service. The pocket also can be repeatedly replicated to provide consistent performance from one pocket to the next. A method for making the pocket also is provided.

In one embodiment, the lacrosse pocket can be constructed from a textile, fabric and/or mesh material that is engineered for specific pocket shapes and functionality in different regions of the pocket. The textile material can be substantially unitary and one piece; however, different portions or regions of the unitary textile material can be reinforced with additional strands that are knitted, weaved, or otherwise included in the material in a manner that affects the functional characteristics and properties of the material in the region within which those strands are located. Optionally, the textile material can include multiple different knit and/or weave patterns in different regions of the pocket to provide the desired properties. For example, in the middle of the pocket and/or in the throat of the pocket, the textile material can be constructed from a unitary, stretchable weaved or knitted textile material. As the pocket transitions to the scoop, generally in the upper half or third of the pocket, the textile material can include, in the same unitary textile material, a multiple layer density weave that provides added reinforcement and enhanced rigidity in that region of the pocket. Thus, the pocket can include a stretch and a non-stretch region in the same unitary textile material.

In yet another further embodiment, the pocket can be constructed from a textile material, having engineered characteristics as noted above to provide specific pocket shapes. In addition, the pocket can include a perimeter flange constructed from certain materials, such as a polyamide or similar elongatable materials, so that the perimeter flange stretches when the pocket is in a loaded state with the lacrosse ball therein, thereby providing dampening to the pocket when a lacrosse ball exerts force upon the pocket in the loaded state. With this dampening, the pocket can feel deeper to a player utilizing the pocket and can exhibit less of an abrupt thump or reaction by the pocket upon catching, passing and/or throwing.

In another further embodiment, the pocket can include a perimeter flange including intermittent voids along an outer edge so that the perimeter flange stretches when the pocket is in a loaded state with the lacrosse ball therein, thereby providing dampening to the pocket when a lacrosse ball exerts force upon the pocket in the loaded state. With this dampening, again, the pocket can feel deeper to a player utilizing the pocket and can exhibit less of an abrupt thump or reaction by the pocket upon catching, passing and/or throwing.

In still a further embodiment, a method of manufacturing a lacrosse pocket includes providing first and second strands twisted in a first rotational direction to form a first ply, the first ply twisted with a third strand in a second rotational direction opposite the first to form a pocket strand; and mechanically manipulating the pocket strand with an automated pocket assembly machine during an automated process, to form a lacrosse pocket including a predefined, three dimensional, concave shape.

In still yet a further embodiment, a lacrosse pocket is provided including a body strand comprising a first strand and a second strand twisted in a clockwise direction or a counterclockwise direction to form a first ply, and a third strand twisted with the first ply in an opposite direction to make the finished ply resistant to unravelling. The body strand can form a lacrosse pocket body including a predefined, three dimensional, concave contour. A perimeter strand can form a perimeter flange around at least a portion of the lacrosse pocket body.

In another embodiment, a method of making a lacrosse pocket is provided that includes mechanically manipulating a plurality of first and second strands with an automated pocket assembly machine during an automated process to form a lacrosse pocket body during the automated process. The lacrosse pocket body includes a predefined, three dimensional, concave shape, the lacrosse pocket body having a lower pocket portion, an upper pocket portion and a middle pocket portion therebetween. The method includes heating the plurality of first strands so that the plurality of first strands at least partially melt to form a first molten material that fuses individual ones of the first plurality of strands with one another. The plurality of first strands are cooled so that the first molten material solidifies, thereby forming a fused pocket area of the lacrosse pocket body.

In still another embodiment, the plurality of first strands form a perimeter of the lacrosse pocket body and the perimeter is the fused pocket area of the lacrosse pocket body. The method optionally includes preventing the plurality of second strands from melting during the heating step, wherein the plurality of second strands are located inward from the perimeter.

In yet another embodiment, the method includes forming the fused pocket area along a perimeter of the lacrosse pocket body. In another example, the method includes forming the fused pocket area so that the fused pocket area forms a runner extending away from the middle pocket portion toward the upper pocket portion. In still another example, the method includes forming the fused pocket area so that the fused pocket area forms a shooting string extending across the upper pocket portion.

In still another embodiment, a lacrosse pocket includes a plurality of strands forming a lacrosse pocket body including a predefined, three dimensional, concave contour. The lacrosse pocket includes a fused area in which the plurality of strands are fused to one another and an unfused area in which the plurality of strands are not fused to one another. The fused area is adjacent the unfused area at an interface, and the interface is at least one of linear and curved.

The lacrosse pocket and methods herein can provide a pocket that is virtually unaffected by weather changes, temperature changes and moisture, which enables it to have a substantially consistent profile and configuration throughout such conditions. In turn, this enables the player to play with confidence, even under adverse environmental conditions. The pocket can be pre-assembled, and easily installed on a lacrosse head. The sections and seam-runners can be custom configured to provide desired performance characteristics of the pocket. Where it includes a preselected set of contours, the pocket herein can require minimal break-in, maintenance and skill for installation on a lacrosse head. The pocket herein also can be less expensive to manufacture and assemble than conventional lacrosse head pockets.

Further, the pockets herein that are preformed and pre-shaped are surprisingly consistent from one pocket to the next. This contrasts with manually strung traditional and mesh pockets, which were generally inconsistent due to human error or techniques in stringing the pocket. In addition, the pockets herein and their methods of manufacture are suitable to produce repeatable, consistent and highly customized pockets. Indeed, a player can select a particular pocket profile and performance characteristics. A manufacturer can consistently custom form that pocket over and over for the player. In this manner, a player can purchase the "same" pocket and/or lacrosse head every time they need a new one. The methods herein thus provide ways to precisely replicate pockets and heads at a commercial level.

These and other objects, advantages, and features of the invention will be more fully understood and appreciated by reference to the description of the current embodiment and the drawings.

Before the embodiments herein are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 29 is a side view of a first ply of the lacrosse pocket formed with first and second individual strands loosely twisted in a counterclockwise direction;

FIG. 30 is a side view of the first ply of the lacrosse pocket twisted in a clockwise direction with a third strand to form a type of pocket strand;

FIG. 31 is a side view of the another type of first ply of the lacrosse pocket formed with individual strands loosely twisted in a clockwise direction;

FIG. 32 is a side view of the other type of first ply of the lacrosse pocket twisted in a counterclockwise direction with a third strand to form another type of pocket strand;

FIG. 33 is a cross section of yet another aspect of a pocket strand of the third embodiment;

DETAILED DESCRIPTION OF THE CURRENT EMBODIMENTS

Figure 1:
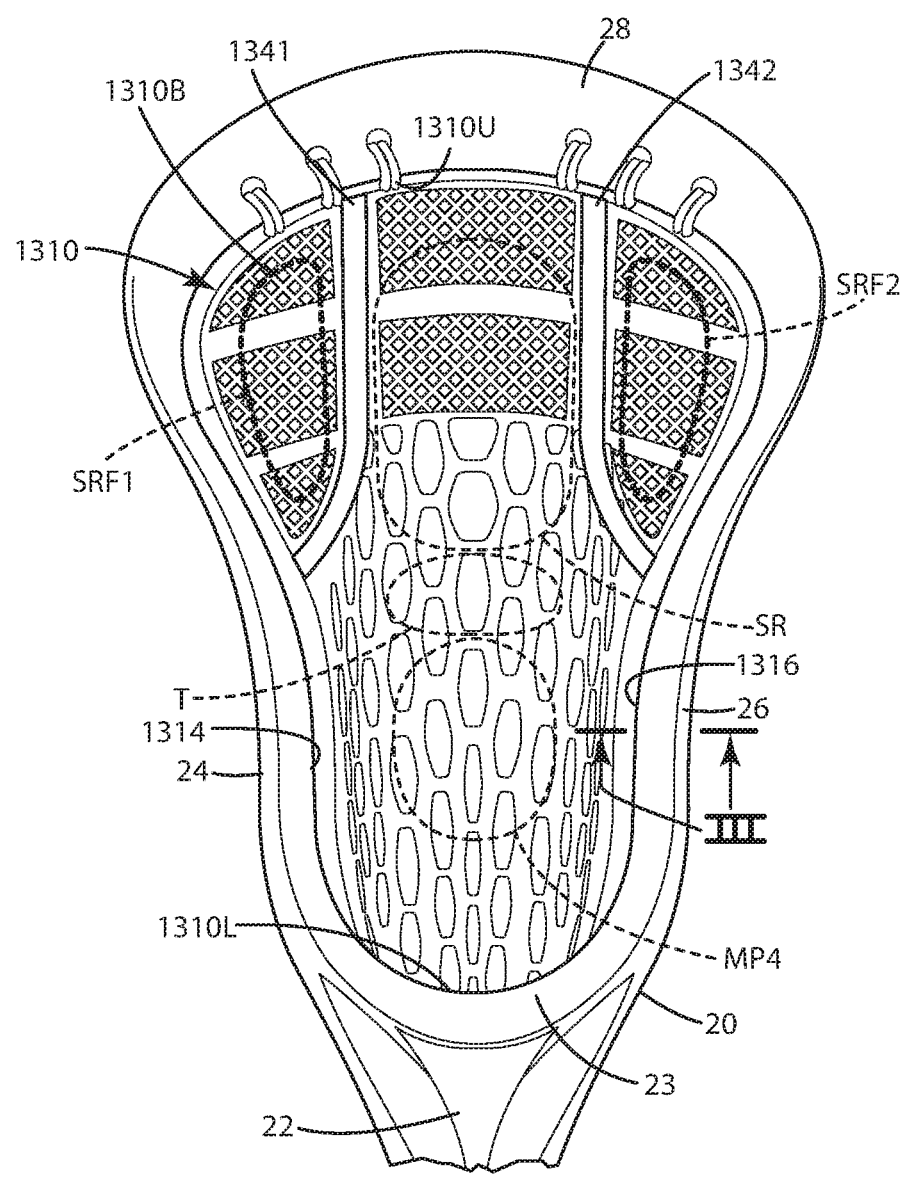
FIG. 1 is a front view of the lacrosse pocket of one current embodiment illustrating different components thereof.
Figure 2:
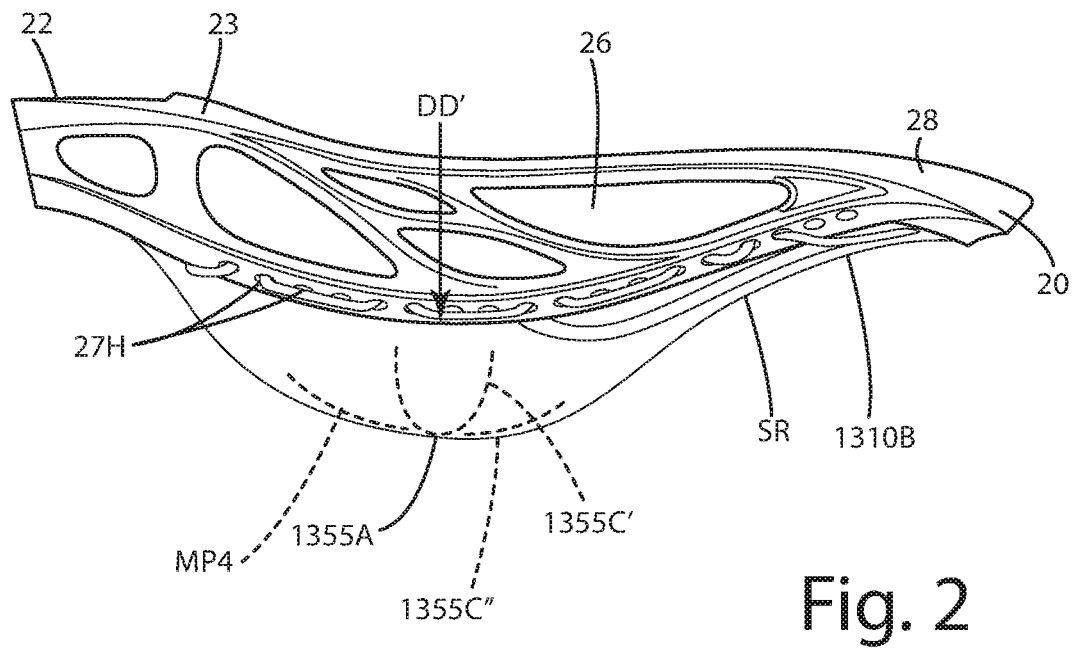
FIG. 2 is a side view of the lacrosse pocket of the current embodiment mounted on a lacrosse head illustrating the concavity and three dimensional shape of the pocket.

A current embodiment of a lacrosse pocket is illustrated in FIGS. 1-16 and generally designated 1310. The pocket shown there is similar in structure, function and operation to the embodiments described above with several exceptions. To begin, the current embodiment 1310 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 1.0 mm, greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material.

Optionally, large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

As noted above, a strand encompasses threads, cables, yarn, fibers, filaments, cords and other strand-like elongated structures. Certain conventional strands have an indefinite length and can be combined with other strands to produce a yarn for use in textile materials. The strands used in this embodiment can be constructed from materials such as thermoplastic polymers, such as nylon, polypropylene, high density polyethylene, ultra-high molecular weight polyethylene, polyethylene, as well as polyamides, aromatic polyamides and other polymeric materials. Other abrasion resistant and durable material likewise can be implemented. As explained below, the forgoing materials can be mixed and matched within a single unitary textile material, making up a pocket to provide different mechanical and physical properties in different regions of the pocket as desired. As mentioned above, the pocket is a unitary textile material. Unitary textile materials can be produced via machine implemented mechanical manipulation of the strands, thereby producing a weaved or knitted material. The lacrosse pocket 1310 generally can be constructed automatically, by manipulating strands using various techniques implemented on a machine (rather than performed manually by a human). The various techniques include knitting, weaving, intertwining and/or twisting, the latter two of which are generally encompassed by knitting.

The pocket of this embodiment can be constructed on a textile manufacturing machine, such as a knitting machine and/or a weaving machine. A knitting machine utilized to construct one commercial embodiment of the pocket 1310. Knitting includes interlooping strands in a series of connected loops, optionally forming multiple columns of loops. In weaving, multiple strands are crossed and interweaved over and under one another at right or other transverse angles to each other at intersections. Strands used in weaving are usually characterized as warp and weft yarns. Intertwining and twisting can include techniques such as knotting and braiding, where strands intertwine with one another. Generally, knitting can encompass intertwining and twisting herein. Such machines are capable of producing knitted materials with a high degree of precision and reproducibility. With a pocket constructed from a unitary textile material as described herein, a particular pocket and its configuration can be reproduced or replicated with extreme precision. For example, from one pocket to the next, the dimensions elasticity, stretchability, contours are virtually identical when the pocket is installed in a lacrosse head. Further, where the unitary textile material pocket of the embodiments herein is molded directly into the material of a lacrosse head, it provides an advantage over pockets and heads of prior art. For example, almost all conventional mesh and traditional pockets over the years have been manually laced by a pocket stringer to the head. Depending on the stringer's talents, skills and preferences, the way that the pocket is strung to the head can vary considerably from one pocket to the next. With the current embodiments, that variability is overcome. Each pocket can be reconstructed and replicated precisely down to the same number of threads in every component of the lacrosse pocket. Further, where the pockets are molded into a head, the molding operation for the same can be precisely replicated from one head to the next. Thus, the variability in the head and pocket combination can be significantly reduced.

Due to this leap forward in pocket and head manufacturing capability, customers also can obtain lacrosse heads having a high degree of customization. For example, a particular player can have a preferred pocket profile. That profile can be determined and/or digitally captured or three dimensionally mapped into an automated pocket assembly machine. The automated pocket assembly machine, such as a knitting or weaving machine, can be programmed with data and/or code relating to or based on the preferred pocket profile. The machine can then precisely replicate that pocket profile in the form of a knitted or weaved lacrosse pocket which can then be installed in a lacrosse head. Generally, with the embodiments herein, a high degree of consistency can be achieved in manufacturing lacrosse pockets and complete heads, which can benefit players because they can know what to expect when they purchase a new lacrosse head with pocket.

Returning to FIGS. 1-16, the pocket 1310 can be installed in a lacrosse head 20. The pocket 1310 can extend from a scoop 28 toward the ball stop 23 and can be joined with the sidewalls 24 and 26. The pocket 1310 can be specially knitted and/or weaved in a particular manner on a knitting or weaving machine to create different zones.

The unitary textile material forming the lacrosse pocket 1310 and in particular the lacrosse pocket main body 1310B is in the form of a single material element having a unitary construction. This unitary construction encompasses a configuration where the different regions or portions of a unitary textile material are not joined together by seams, stitches, adhesives or molded features, but rather the primary joining of the different regions is via mechanical manipulation of the individual strands making up the unitary textile material in the different regions to join those different regions as explained further below. This mechanical manipulation can be performed with an automated pocket assembly machine, for example, a knitting machine is mentioned in the embodiments herein, and/or a weaving machine. Of course, other types of automated machines capable of manufacturing the pocket without any manual manipulation of the strands during the automated process are also contemplated.

While the pocket and pocket body 1310 and 1310B are constructed from a unitary textile material, each can include different regions having different physical and/or mechanical properties. These physical and/or mechanical properties from region to region can vary. For example, the different regions can have different elasticities, different stretch capabilities, different stiffnesses, different air permeabilities and/or pore sizes, different air flow through it due to the pore or opening structure, different support, different recovery and/or different rigidity. The physical properties described in connection with these embodiments, however, generally do not include aesthetic properties such as color, hue, shading or visual pattern differences.

Figure 8:
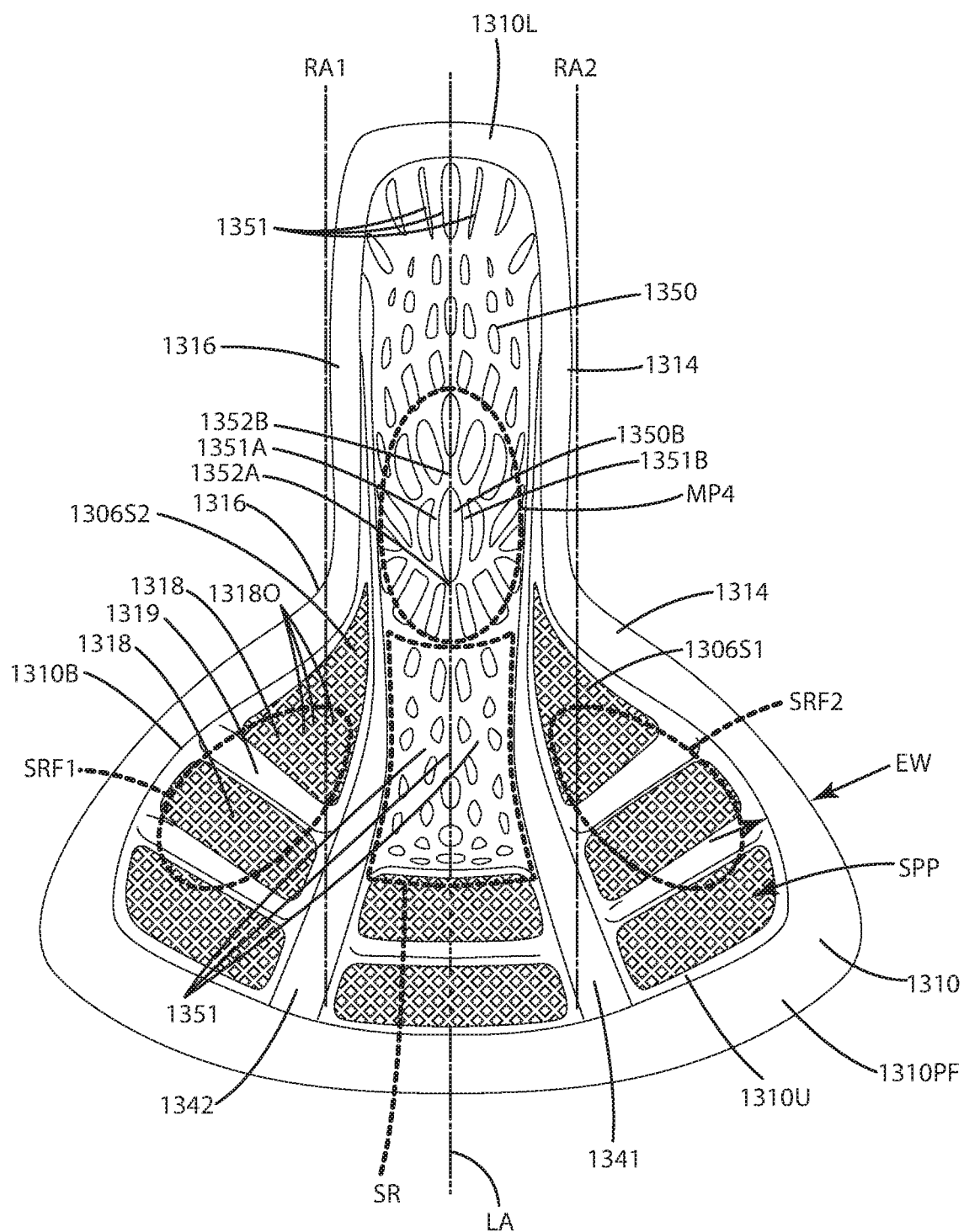
FIG. 8 is a front perspective view of the lacrosse pocket of the current embodiment in a free standing form.

As shown in FIG. 1, the lacrosse pocket body 1310B generally includes several different regions. As mentioned above, the pocket includes a middle pocket MP4 which transitions at a transition T to a shooting ramp SR. The shooting ramp SR is disposed between knitted or weaved runners 1341 and 1342. These runners are integral with the unitary textile material from which the lacrosse pocket 1310 is constructed. The runners can include a more densely knitted pattern to provide enhanced rigidity and generally taut structures to better guide a ball being shot from the head 20. The runners can be constructed so as to extend from a region adjacent or forward of the middle pocket MP4 outward toward the scoop 28 as shown in FIG. 1. Optionally, the runners can be constructed as shown in FIG. 8 to extend from an upper portion 1310U to a lower portion 1310L of the pocket, optionally stopping short of that lower portion 1310L as shown in FIG. 8. The runners can be constructed to be approximately 4-7 needles wide, further optionally about 3 to about 15 needles wide, depending on the particular knitting machine utilized to knit the pocket. The runners can generally transition directly to the upper edge 1310U of the lacrosse pocket 1310 which generally provides a solid mounting location for those runners, particularly given the amounts of force that the runners are under as a ball moves through the shooting ramp SR.

Optionally, if desired, the runners 1341 and/or 1342 can be specially constructed to be less elastic than the remainder of the main body of the pocket. In turn, this can provide a more defined shooting ramp, also referred to as a ball channel, for the lacrosse ball to exit from the lacrosse head. As one example, the runners can be more densely knitted (with more courses and/or wales) or weaved than other portions of the pocket, such as the perimeter flange, the middle pocket and/or the shooting ramp flanks. In such a case, the runners can include another knit pattern which is different from the knit patterns of the perimeter flange, the middle pocket and/or the shoot ramp flanks. As another example, the runners can include less openings defined therein as compared to other portions of the pocket body. As yet another example, the lacrosse pocket body can be formed of a single unitary knit pattern. In the regions of the first and second runners, the strands can be different from the strands and other regions adjacent those runners. The strands in the regions of the runners can be less elastic than the material and adjacent regions. As a more particular example, strands in the regions of the runners can be constructed from an inelastic material such as metal strands, carbon or composite strands, or high tensile strength polymeric strands, while strands in adjacent regions, while constructed from the same knit pattern, can be made of thermoplastic polymers or some material that is less elastic than that of the strands in the runners. Even in these other constructions, however, the lacrosse pocket body, and in particular the unitary material from which it is formed, can include the first and second runners integrally formed therein without the addition of separately and/or independently constructed structures to the lacrosse pocket body.

Further optionally, to construct runners with different materials than the remainder of the lacrosse pocket, one or more additional spools of material can be added to the automated assembly machine. In particular, the spools can include a continuous strand of material constructed from materials different from other strands used in other portions of the lacrosse pocket. Where it is desired that the runner be less elastic than the remainder of the pocket, the continuous strand can be constructed from a material that is less elastic than other strands used in other portions of the pocket. The continuous strand of different material can be pulled off the dedicated spools holding the same.

Even further optionally, due to the mechanical manipulation of the strands used to make the pocket, the knitting and/or weaving machine can be programmed to knit or weave the runners 1341 and/or 1342 in a particular direction. For example, most traditional constructions include runners that are parallel to a longitudinal axis of the pocket, and centered about the longitudinal axis. In the current embodiments, it is contemplated that the first and second runners can be disposed at a variety of angles relative to the pocket longitudinal axis LA. For example, although not shown, the first runner 1341 can be configured to diverge at an angle of about 5° to about 45° away from the pocket longitudinal axis LA as the runner transitions from the base toward the scoop. Conversely, the second runner 1342 can be configured to converge at an angle of about 5° to about 45° toward the pocket longitudinal axis as the runner transitions from the base toward the scoop. Further, the first and second runners can be configured so that they are not centered on the pocket longitudinal axis at the upper edge of the pocket. For example, the first runner 1341 can be configured to join with the upper edge of the pocket a distance to the left of the pocket longitudinal axis LA. The second runner 1342 however can be configured to join with the upper edge of the pocket at the pocket longitudinal axis LA. This construction can be reversed with the second runner 1342 offset a distance to the right of the pocket longitudinal axis, while the first runner 1341 passes through the pocket longitudinal axis LA adjacent the upper edge. These different types of offset runners can be customized to accommodate a player's shooting techniques and/or the desired exit location of the lacrosse ball.

Returning to the embodiment shown in FIG. 1, the upper edge 1310U can be adapted to attach directly to the scoop 28 of the head. This can be accomplished by adding large diameter lacing to the pocket and lacing the pocket directly to the scoop. Alternatively, as described below, the pocket edges and/or a perimeter flange can be molded directly into the frame of the lacrosse head. The lower edge 1310L can correspond to a portion of the pocket adapted to attach to a base or ball stop 23 of the lacrosse head 20 as shown in FIG. 1. The pocket can be bounded by first and second sidewall edges 1314 and 1316 as well. These sidewall edges 1314 and 1316 can be of the same general knit pattern as the upper edge 1310U and the lower edge 1310L. Generally, this knitting pattern can be constructed so that the respective edges and/or the perimeter flange 1310PF in general, are optionally 1.0 mm to 20.0 mm, further optionally 2.5 mm to 15.0 mm, further optionally 5.0 mm to 10.0 mm in overall edge width EW as shown in FIG. 8.

The edges, 1310U, 1310L, 1314 and 1316, which can form and/or be a portion of the perimeter flange 1310PF, as well as other regions of the pocket depending on the application, can be constructed from a first material, which can be less elastic, and/or more abrasion resistant and durable than the second material. Optionally, the first material can be at least one of an aromatic polyamide, a polyamide and an ultra-high molecular weight polyethylene. One suitable aromatic polyamide is poly-para-phenylene terephthalamide, sold under the commercial name of KEVLAR® by DuPont of Wilmington, Del. The first material optionally can have strands having: a tensile modulus of elasticity of optionally 400-1000 g/d, further optionally 500-900 g/d, and even further optionally at least 500 g/d; an elongation at break of optionally 1.0% to 10.0%, further optionally of 3.0% to 2.4%, further optionally 3.6%; a breaking tenacity of optionally 100-300 cN/tex, further optionally 150-250 cN/tex, even further optionally 203-208 cN/tex; and a tensile strength of optionally about 2,000-10,000 MPa, further optionally 3,000-6,000 MPa and even further optionally about 3,600 MPa. This first material can be less elastic (having a lesser modulus of elasticity) and more abrasion resistant and durable and tear resistant than the second material used in for example, the middle pocket shooting ramp or shooting ramp flanks.

Further optionally, the first material can be a polyamide, such as polyamide 6,6, which is commonly known as Nylon 66 thermoplastic resin or PA66, having a CAS Number of 032131-17-2. The polyamide can have a melting point in the range of 220° C.-250° C. and a specific gravity relative to water of 1.15 g/cc measured using ASTM D792. The polyamide can have the molecular formula $(C12 H22 N2 O2)n$, and a density optionally of 1.30 g/cm$^3$-1.60 g/cm$^3$, further optionally 0.90 g/cm$^3$-1.2 g/cm$^3$ at 20° C. as measured using EN ISO 1183-1. The polyamide can have a hardness of 80 Shore D measured using ASTM D2240, a tensile strength of about 82.7 MPa, measured using ASTM D638, and having a tensile modulus of optionally 2.0 GPa to 4.0 GPa, further optionally 2.5 GPa to 3.0 GPa using ASTM D638. The polyamide, when in the form of a multifilament yarn, can exhibit 30%-50% elongation at break, further optionally 39%-42% elongation at break, yet further optionally about 40% elongation at break measured using ASTM D638. The polyamide can exhibit thermal decomposition temperatures greater than 310° C. Thus, when the polyamide is used with the current embodiment, the molding temperatures to mold a head over a portion of the pocket can be optionally less than 350° C., further optionally less than 325° C., yet further optionally less than 310° C., even further optionally less than 280° C. Suitable polyamides can be optionally ULTRAMID® A3X2G5 Uncolored Plyamide commercially available from BASF of Florham Park, N.J., further optionally Emarex™ Polyamide Resin commercially available from MRC Polymers Inc. of Chicago, Ill., yet further optionally Polofil Nylon 66 commercially available from The Plastic Group of America of Woonsocket, R.I. Of course a variety of other polyamides can be suitable for the first material to construct the first strands and associated yarns in the edges, 1310U, 1310L, 1314 and 1316 as well as other regions of the pocket depending on the application.

Optionally, the perimeter flange 1310PF can be constructed from multiple first strands of the first material. Those first strands can be in the form of a first yarn having a plurality of first twisted filaments, similar to the ones shown in FIGS. 29-33, described in connection with the third embodiment in more detail below. Suffice it to say that the first yarn can be constructed to include three individual plies 1670S, each individual ply being twisted together in a counterclockwise CCW (or "S"), where those three plies are further twisted together in a clockwise CW (or "Z") manner. Of course, in other applications, 2, 3, 4, 5, 6 or more individual plies 1670S can be twisted together to form the first yarn. And in other applications, the relative clockwise and counterclockwise twisting can be reversed or otherwise modified depending on the particular use.

The first yarn optionally can be a high tenacity yarn, suitable for various industrial applications. Optionally, the first yarn can be of a particular denier, measured as the weight in grams of 9000 m of the yarn. The first yarn optionally can be between 150 denier to 300 denier, further optionally 175 denier to 250 denier, yet further optionally 200 denier to 225 denier. Of course other deniers can be selected for the first yarn that is included in the perimeter flange.

The first yarn can have an effective weight of optionally 400 g per 9000 m to 800 g per 9000, further optionally 500 g per 9000 m to 700 g per 9000 m, yet further optionally 600 g per 9000 m to 700 g per 9000 m, and even further optionally 650 g per 9000 m to 680 g per 9000 m, depending on the application. The first yarn can include a tenacity of optionally 5 g-f/denier to 15 g-f/denier, further optionally 7 g-f/denier to 10 g-f/denier, and yet further optionally 8 g-f/denier to 8.5 g-f/denier. The first yarn can have a density of optionally 0.75 g/cm$^3$ to 3.10 g/cm$^3$, further optionally 0.80 g/cm$^3$ to 1.25 g/cm$^3$, yet further optionally 1.00 g/cm$^3$ to 1.1 g/cm$^3$. The first yarn also can have a yard radius of optionally 0.001 cm to 0.1 cm, further optionally 0.01 cm to 0.02 cm, yet further optionally 0.016 cm.

Figure 8A:
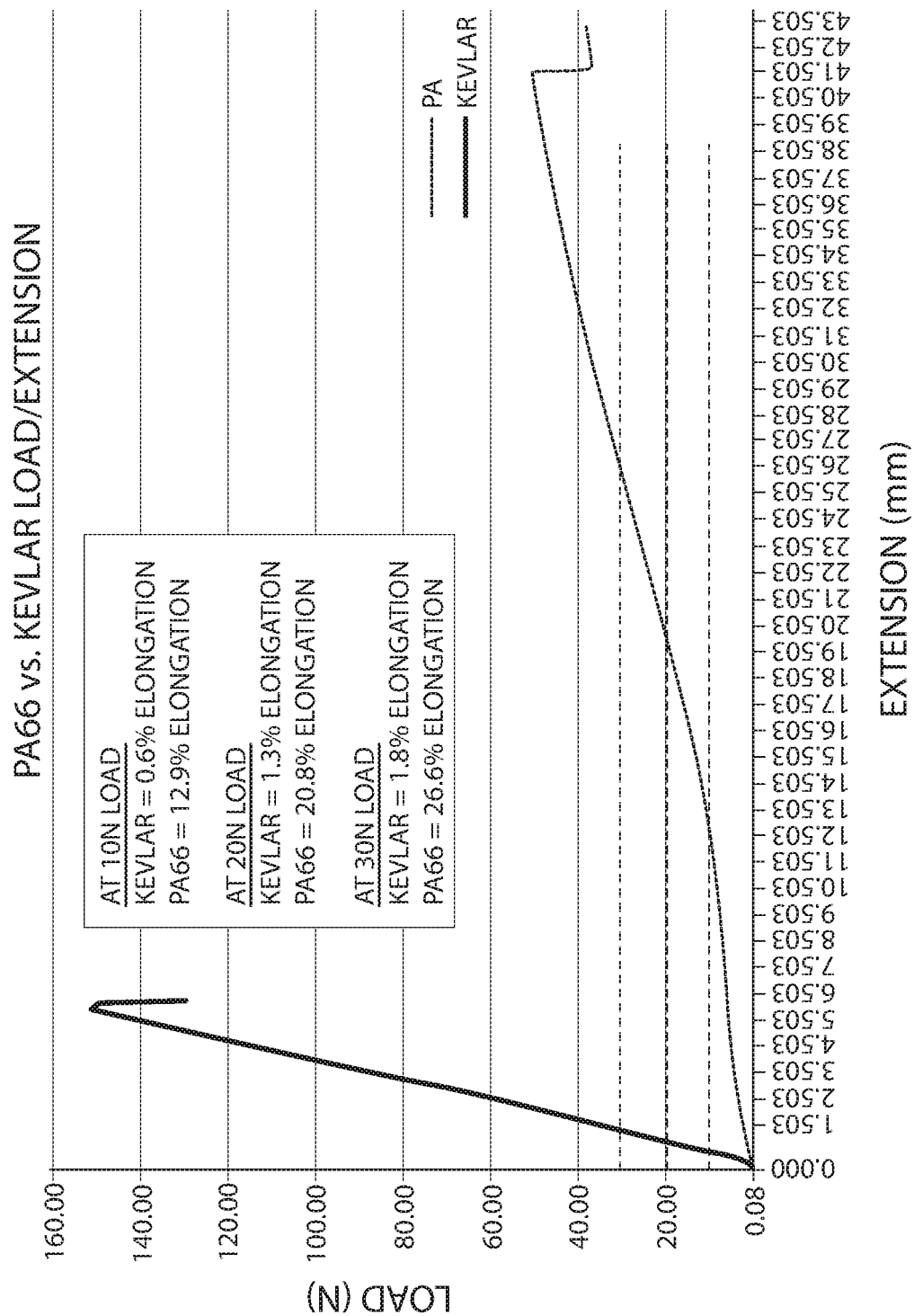
FIG. 8A is a graph comparing the elongation of different textile materials.

Certain testing was performed with regard to different types of the first material utilized in the first yarn or generally the strands of the perimeter flange and/or edges of the lacrosse pocket body. In particular, three ply yarn constructed from Kevlar was compared to physically identical three ply yarn constructed from polyamide 6, 6. This comparison was performed given certain traits of the Kevlar yarn, for example its generally yellow or "dirty" white appearance, which in some cases could highlight minor molding imperfections, as well as the general inelasticity and inability to elongate under certain forces. In effect the perimeter flange can act as a suspension and/or dampening element between the lacrosse head and the remainder of the pocket. Thus, it was discovered that the latter trait in some applications or configurations of certain pockets can cause the pocket to have less dampening characteristics when a load is placed on the remainder of the pocket adjacent the perimeter flange. To compare the Kevlar and polyamide 6,6 yarns, individual yarns were loaded under different forces to test their elongation under those forces. FIG. 8A illustrates the comparison between the Kevlar and polyamide 6,6 (PA 66) yarns. As noted there, under a 10 N load, the Kevlar exhibited 0.6% elongation, whereas the PA 66 exhibited 12.9% elongation. Under a 20 N load, the Kevlar exhibited 1.3% elongation, while PA 66 exhibited 20.8% elongation. Under a 30 N load, the Kevlar exhibited 1.8% elongation, and the PA 66 exhibited 26.6% elongation. Thus, comparatively, the PA 66 exhibits greater elongation than the Kevlar. Where the PA 66 is incorporated into yarns that are further incorporated into the perimeter flange, that perimeter flange can exhibit its own elongation or increase in with when loads are placed in the remaining portion of the lacrosse pocket, for example when a ball is caught, passed and/or shot from the pocket and associated head. This momentary elongation and stretching of the perimeter flange in turn provides a dampening effect so that the pocket and associated head responds smoothly, more quietly, and more naturally to a player catching, passing and/or shooting the ball. Of course, in certain applications, yarns constructed from the other first materials herein, such as Kevlar are also well suited for incorporation into the lacrosse pocket.

The second material can be a thermoplastic polymer, for example high density or high strength polyethylene, polypropylene and/or a polyethylene multi-fiber yarn. The second material optionally can have: a modulus of elasticity of optionally 0.1-2.0 GPa, further optionally 0.5-1.0 GPa, yet further optionally 0.8 GPa (when the material is polyethylene) and still further optionally 1.5 GPa to 2 GPa (when the material is polypropylene); an elongation at break of optionally greater than 50%, further optionally greater than 100%, even further optionally greater than 500%; and a tenacity of optionally 20-350 kN/tex, further optionally 30-320 kN/tex, and even further optionally 50-100 kN/tex, and even further optionally less than 150 kN/tex. The second material can include strands optionally in a range of 100 denier to 1000 denier, further optionally 150 denier to 840 denier, even further optionally 210 denier to 750 denier, yet further optionally 300 denier and/or 420 denier.

Optionally, the portions of the lacrosse pocket body inside the perimeter flange 1310PF, for example the middle pocket portion MP4, the shooting ramp flanks SRF1, SRF2, the shooting ramp SR, the respective first and second runners 1341 and 1342 and/or the shooting strings 1319 can be constructed from multiple second strands of the second material. In the lacrosse pocket body, the first and second strands can mechanically manipulated so that those strands are interlooped with one another, for example, they can be knitted or weaved together to form a unitary textile material. Some of the second strands forming certain portions of those elements can be in the form of a second yarn having a plurality of second twisted filaments, similar to the ones shown in FIGS. 29-33 and described above in connection with the first strands and yarns, and below. In some cases, the second yarn can be constructed from multiple second twisted filaments of polypropylene. The second yarn itself, when constructed from polypropylene filaments, can exhibit an elongation at break optionally of 10% to 30%, further optionally 12% to 25%, yet further optionally 12% to 18%. In other cases, the second yarn can be constructed from multiple third twisted filaments of polyethylene. The second yarn itself, when constructed from polyethylene filaments, can exhibit an elongation at break optionally of 10% to 30%, further optionally 5% to 25%, yet further optionally 5% to 10%. The second yarn, when constructed from polyethylene filaments, can be in the form of linear polyethylene, for example high density polyethylene. This type of yarn can be have a tenacity of optionally 2.0 g/denier to 5.0 g/denier, further optionally 2.5 g/denier to 4.5 g/denier, yet further optionally 2.6 g/denier to 4.2 g/denier.

In some applications, certain portions of the lacrosse pocket body inside the perimeter flange 1310PF can be constructed to include second yarns, some of which include the second twisted filaments of polypropylene, and others of which include the third twisted filaments of polyethylene. Again, these yarns can be mechanically manipulated so that they are joined with the yarns of the perimeter flange, or other yards inside the perimeter flange, for example by knitting or weaving those yarns. One example of this, shown in FIG. 8, is where the third twisted filaments of polyethylene, which form the third yarn, are utilized to produce the first and second runner elements 1341 and 1342, which again can be disposed on opposite sides of a longitudinal axis of the lacrosse pocket body, and where the second twisted filaments of polypropylene, which form the second yarn, are utilized to produce a first side portion 1306S1 between the first runner element 1341 and the perimeter flange 1310PF disposed laterally outside that runner relative to the longitudinal axis LA, and a second side portion 1306S2 between the second runner element 1342 and the perimeter flange 1310PF disposed laterally outside that runner relative to the longitudinal axis LA. With this strategic placement of the polyethylene yarn and the polypropylene yarn, the pocket can exhibit exceptional playing capabilities. For example, because the runners are constructed from the more rigid, less elastic and more durable polyethylene, they are well suited to repeatedly and directly engage a lacrosse ball rolling across those elements. Due to their rigidity as well, these elements can operate to trap and channel or guide the ball exiting the pocket, transitioning from the middle pocket portion through the shooting ramp. In contrast, the regions of the pocket, such as the first and second side portions, the middle pocket MP4 and/or the shooting ramp SR inside the runner elements, constructed from the less rigid, more elastic and slightly less durable polypropylene are well suited to stretch and deform around the runner elements, and optionally between the runner elements and the lacrosse head when the pocket is installed in the lacrosse head. Thus, the polypropylene elements can operate to stretch slightly upon catching and/or throwing, while enabling the polyethylene elements to provide support to the lacrosse ball and to guide the ball.

If desired, the first and second materials can include a UV inhibitor to protect the strands when the pocket is used in direct sunlight. Of course, the entire pocket can be constructed from the first material and second material, only one of the two materials, and/or other additional materials depending on the application.

As mentioned above, within the boundaries of the edges described above, the pocket body 1310B can include other features or components. As shown in FIG. 8, the pocket body can include runners 1341 and 1342, as well as shooting strings 1319. Again, optionally these components can be constructed from the second material, such as polyethylene, and/or the first material, such as polyamide, in some applications. The pocket body also can include shooting ramp flanks SRF1 and SRF2. These can be disposed laterally of the longitudinal axis LA shown in FIG. 8, and further laterally of the shooting ramp SR and respective runners 1341 and 1342. Again, optionally these other components can be constructed from a second material, such as polypropylene in some applications.

Figure 9:
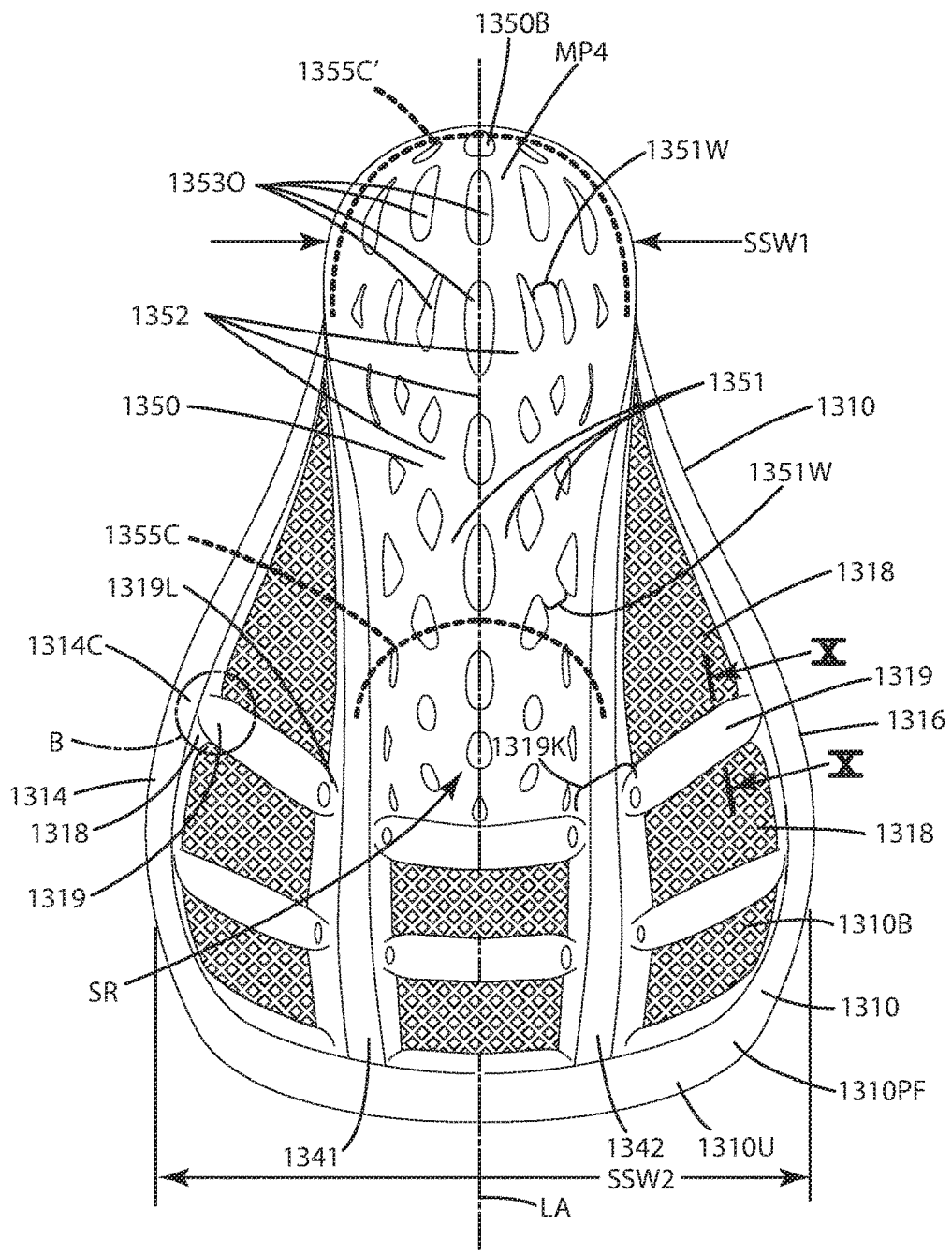
FIG. 9 is a rear perspective view of the lacrosse pocket of the current embodiment in a free standing form.
Figure 10:
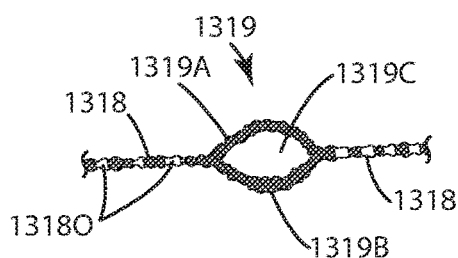
FIG. 10 is a section view of a shooting string tubular member taken along lines 10-10 in FIG. 9.

The shooting ramp flanks SRF1 and SRF2 can be constructed from the second material mentioned above as well. The shooting ramp flanks can include one or more knit patterns that are different from knit pattern of the edges. For example, the first and second shooting ramp flanks SRF1 and SRF2 can include a second knit pattern 1318 and a third knit pattern 1319. The pattern 1318 can be more open yet relatively thick and three dimensional, forming large openings 1318O within that knit region 1318. The thickness of this region, however, can be such that it can render this region relatively taut even when placed under tension, for example, when disposed or molded into a lacrosse head. With reference to FIGS. 9 and 10, the shooting ramp flanks SRF1 and SRF2 can include region 1319, which can be a layered knit pattern. For example, as shown in the cross section of the third knit pattern 1319, the unitary textile material within that third knit pattern can define an optional tubular structure or channel 1319C. This tubular structure can be formed from a first knitted layer 1319A and a second knitted layer 1319B which are joined with immediately adjacent knitted pattern 1318. In particular, the tubular structure can be formed by knitting a ripple stitch in the pocket. Within this structure, the layers 1319A and 1319B include a plurality of strands that extend outward and are interlooped with portions of the immediately adjacent knitted pattern of 1318. Likewise, the plurality of strands that make the knit pattern 1318 also extend into and are interlooped with strands in the first and second layers 1319A and 1319B. These layers themselves are integrally formed with one another and within the unitary textile material. They are separated a distance, which in turn forms the tubular structure or internal channel 1319C.

Optionally, the third pattern 1319 can be deleted, and in which case the second pattern 1318 can be continuous and uninterrupted by the third knit pattern making up its respective layers. Of course, where the third pattern is included, it can provide an additional functionality. First, it can exert different mechanical properties in the region. As illustrated in FIGS. 8 and 9, the third knitted pattern 1319 can extend transversely across the width of the pocket. In so doing, it can provide additional mechanical properties in this region, for example, it can make the pocket in the region more taut than other regions surrounding the third pattern, for example, the second pattern 1318.

If desired, the tubular structure 1319C also can be interrupted in regions 1319K and 1319L as shown in FIG. 9. In this construction, the tubular structure can extend from one sidewall edge 1314 to the opposing sidewall edge 1316, but can be interrupted and open in preselected areas. In those areas, the runners 1341 and 1342 however are generally contiguous and uninterrupted. Given their ability to form and guide the ball in the shooting ramp, in the embodiment illustrated, it sometimes is more helpful to have the runners uninterrupted than the tubular structures 1319C formed within the knitted textile. Of course, in certain applications, this can be reversed if desired.

Figure 16:
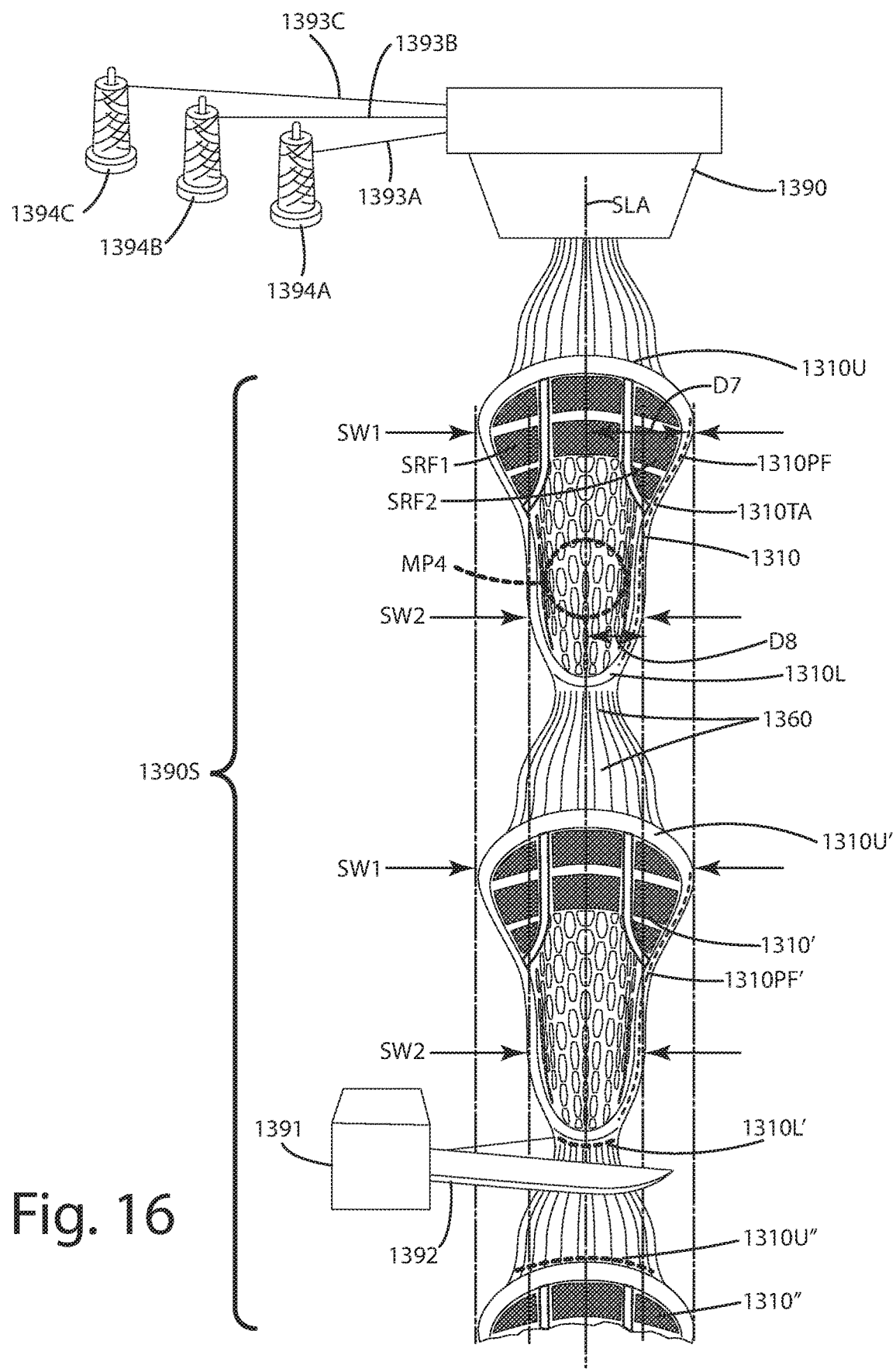
FIG. 16 is a schematic illustrating a strip of lacrosse pockets of the current embodiment being manufactured with a knitting machine or weaving machine in a knitting process or weaving process.

As shown in FIG. 16, in a finished head, the tubular structures 1319C can include a large diameter (greater than 2.0 mm) lace threaded through them to act as defined shooting strings that are precisely located within the lacrosse pocket due to the tubular structures 1319C. With the tubular structures, there also leaves little room for error when precisely locating the laces within the lacrosse pocket body.

Figure 15:
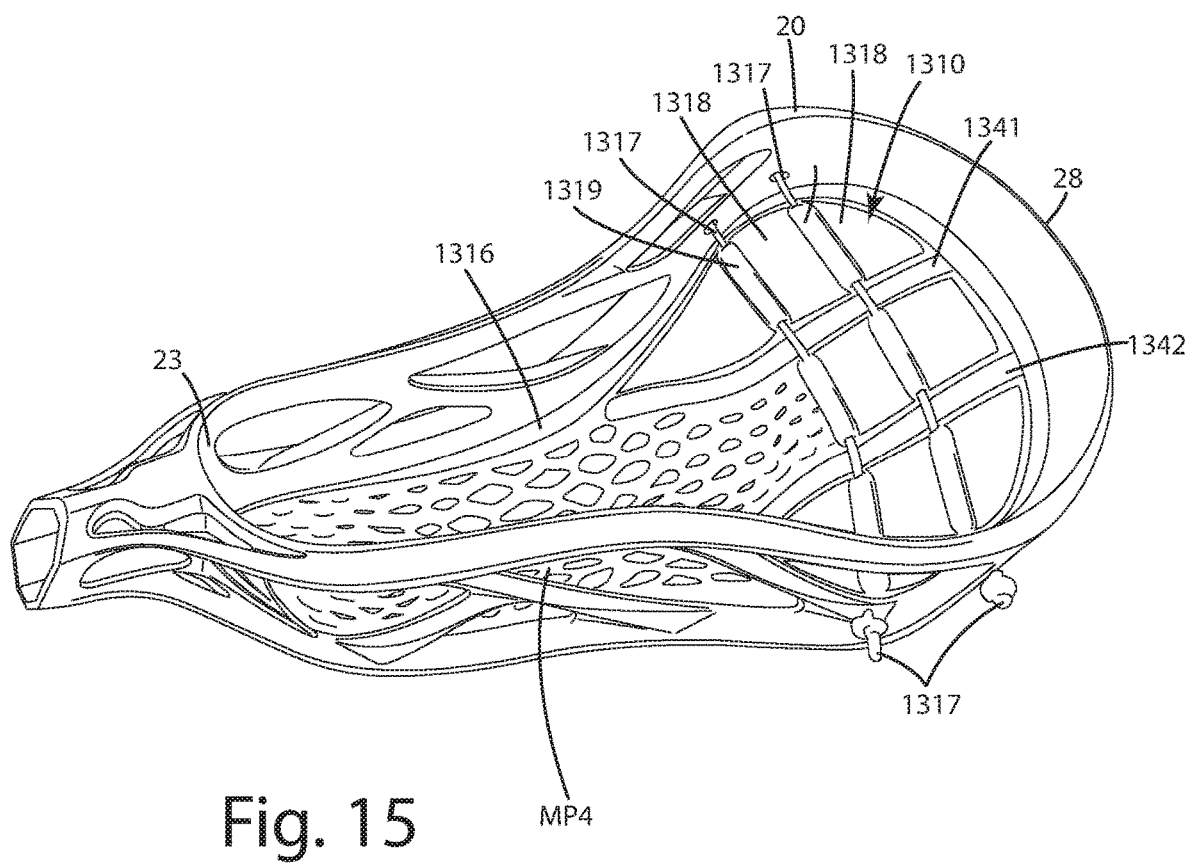
FIG. 15 is a perspective view of the lacrosse pocket of the current embodiment mounted to a lacrosse head and including secondary laces inserted in tubular structures.

The large diameter laces 1317 can extend transversely through and across the lacrosse pocket, being partially concealed within the tubular structure 1319 and optionally intermittently exposed in certain regions, for example, adjacent the runners 1341 and 1342. Of course, alternatively, the large diameter laces can be completely sealed within the tubular structures or reversed so that they are only exposed intermittently on the rear of the lacrosse pocket 1310. Optionally, additional third knit pattern 1319 can be included in the head, for example, another shooting string element can be disposed closer to the base or ball stop 23 of the head as shown in FIG. 15. Another lace 1317 can be threaded through the respective tubular structure and intermittently exposed in certain areas. The laces 1317 or some other type of elongated element can be placed within the tubular structure 1319C. The elongated element is generally free floating relative to the tubular structure. However, in some cases, the elongated element can be stitched, adhered or hot melted to the tubular structure surrounding it so that relative movement between the two structures can be limited.

The tubular structure 1319C in the third pattern 1319 can include a plurality of strands that are interlooped via knitting, or weaved with strands of the adjacent second pattern 1318. Indeed, many of the strands of the third pattern can extend into and are interlooped with the strands of the second pattern. Further, some of the strands are continuous, with one of a plurality of strands extending through the second knit pattern 1318 also extending through the third knit pattern 1319, and/or other knit patterns. Accordingly, the different knit patterns can be contiguous and/or continuous with one another, being integrally sewn and connected via a plurality of continuous strands extending through both.

The precise interlooping of the knitting pattern or the precise weave of the weave pattern can vary depending on the strands and the desired patterns and their interfaces. Generally, however, as illustrated in FIGS. 9 and 10, the transition between the different knit patterns, for example, 1318 and 1319 are imperceptible due to the extension of the strands of each of those respective patterns extending into both. Of course, this is accomplished via the special techniques implemented via the associated knitting and/or weaving machine associated with the knitting and/or weaving process used to construct the entire pocket. As illustrated, there are no defined "edges" that form the terminating boundaries of the respective regions or patterns, for example patterns 1318 and 1319. Further, there is no separate stitching, gluing, over molded portions or large diameter (greater than 2.0 mm) laces, thongs or webs that join the different patterns of the pocket.

Optionally, a plurality of knit patterns can come together and be contiguous and continuous with one another, integrally formed in the single, unitary textile material. As shown within the circle B in FIG. 9, the first pattern 1314C of the edge 1314 is joined and transitions seamlessly to the second pattern 1318, as well as the third pattern 1319, which itself includes the tubular structure 1319C. These different patterns are capable of merging into one another seamlessly, without having to join different edges or structures, other than the interlooped or interweaved strands of each pattern. Further, each of these different knit patterns are formed as an integral unit by the knitting and/or weaving process on a knitting machine and/or weaving machine. Thus, when the machine is done knitting, no further components or structures need be added to the pocket to join these different knitting patterns. This can eliminate human interface with the construction of the pocket via manual manipulation of different parts of the pocket.

Figure 13:
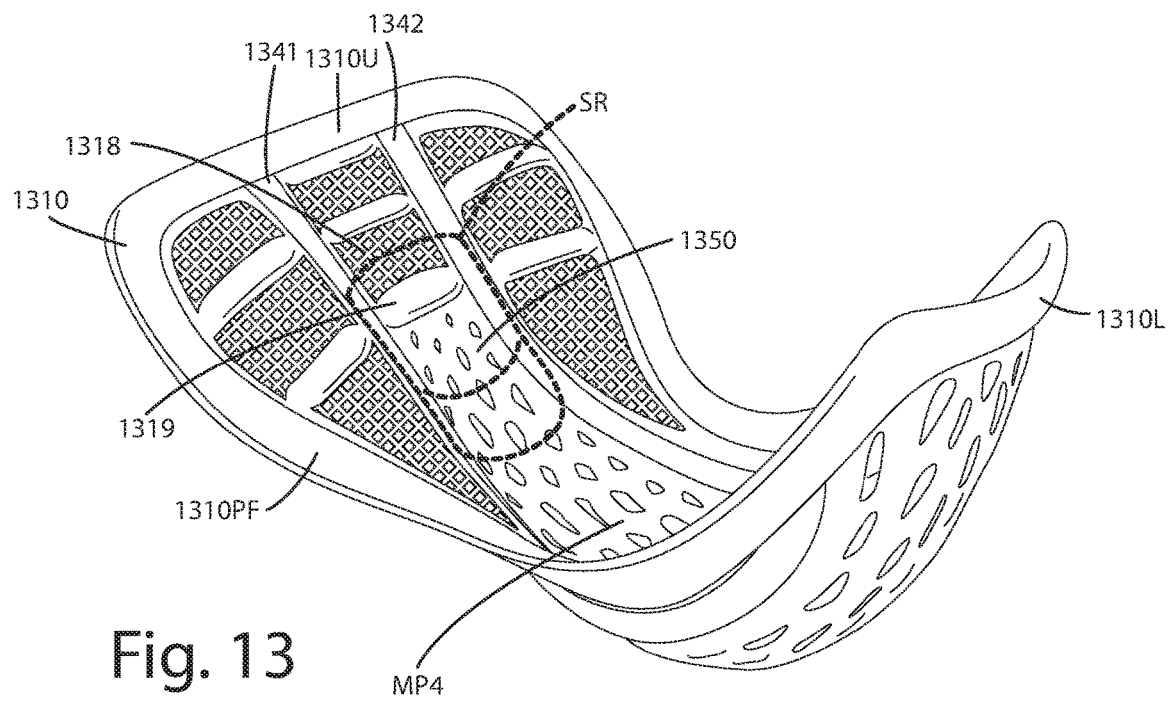
FIG. 13 is a front perspective view of a lacrosse pocket of the current embodiment in free standing form.
Figure 49:
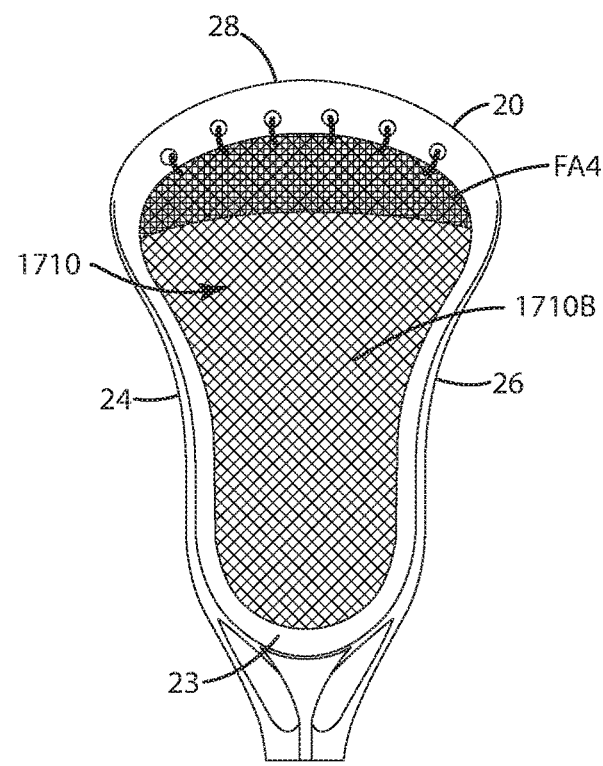
FIG. 49 is a front view of the lacrosse pocket of the fourth alternative embodiment having a fused scoop pocket area.

Turning to FIGS. 1, 9 and 13, the pocket can be constructed to include a shooting ramp SR as mentioned above. Again, this shooting ramp can be flanked by the shooting ramp flanks SRF1 and SRF2. When initially formed by the knitting or weaving machine in any of the respective knitting and/or weaving processes, the respective shooting ramp flanks SRF1 and SRF2 can include a generally planar or convex configuration. By convex, it is meant that the respective shooting ramp flanks SRF1 and SRF2 generally bulge or bow upward when the pocket is placed in the generally horizontal configuration as shown in FIG. 49.

As shown in FIG. 13, the shooting ramp SR can include several different knit and/or weave patterns in the unitary textile material from which the pocket 1310 is constructed. For example, the shooting ramp SR can include and be partially bounded by the first and second shooting ramps 1341 and 1342. Again, these ramps can be constructed from a certain type of knit pattern, for example, a knit pattern including the generally contiguous surface being approximately 5-10 needles wide. Optionally, these ramps can be constructed from interlooped strands or interweaved strands of a different color than surrounding knit patterns so that a user can visually perceive the runners.

The shooting ramp SR also can include a portion of the second knit pattern 1318 toward the end of the shooting ramp, near the upper edge 1310U. The shooting ramp also can include a portion of the third pattern 1319, further optionally with its tubular structure 1319C. Of course, where an elongated element, such as a large diameter lace is placed through the tubular structure, that elongated element can also pass transversely through the shooting ramp SR. As the shooting ramp transitions rearwardly, and the middle pocket MP4 and the lower edge 1310 of the pocket, yet another knit pattern can be included. This knit pattern 1350 can be different from the first, second and third knit patterns described above. This knit pattern 1350 can transition to the respective runners 1341 and 1342, as well as the patterns 1319 and/or 1318.

As shown in FIGS. 9-13, the pattern 1350 defined within the shooting ramp SR can be part of the unitary textile material from which the pocket 1310 is constructed. This knit pattern 1350 can include a plurality of vertical elements 1351 intermittently joined via a plurality of join elements 1352. The vertical elements 1351 (FIG. 9) can generally be somewhat parallel with one another, extending generally parallel to the longitudinal axis LA of the lacrosse pocket 1310. These vertical elements 1351 can extend from the portion of the shooting ramp SR closer to the upper edge 1310U of the pocket and generally rearwardly toward the lower edge 1310L (FIG. 8). Certain ones of the vertical elements 1351 can be joined with the lower edge 1310L and integrally, continuously knitted and/or weaved to that edge.

The vertical elements 1351 can be constructed so that they will expand away from one another, generally providing a supple and elastic region as they transition closer to the middle pocket MP4. The width of any of the vertical elements, particularly when knitted on a knitting machine, can be adjusted to provide desired mechanical and physical properties of the knit pattern 1350. For example, in some cases, where the pocket is weft knitted on a tubular knitting machine, the vertical elements 1351 can be optionally less than 15 needles wide, further optionally less than 10 needles wide, even further optionally less than 8 needles wide when knitted on a knitting machine. Incidentally, as used herein, the term needles can be interchangeable with the term wales, which is known in the knitting arts. In some cases, the vertical elements are less than 7 needles wide so that the vertical elements do not begin to merge with one another, forming a continuous knit pattern that generally does not include any of the knit pattern apertures 1353, for example, as shown in FIG. 9. When that occurs, sometimes the knit pattern 1350 can become too rigid and stiff, which can affect the ability of the middle pocket MP4 to effectively grip a ball disposed therein. Generally, each of the respective vertical elements 1351 maintains a constant width 1351W as it transitions from the shooting ramp SR rearward through the middle pocket MP4 into the rear edge or lower edge 1310L. This can enable the plurality of strands making up each of the respective vertical shooting elements 1351 to be continuous and extend throughout the entire respective vertical elements.

Figure 12:
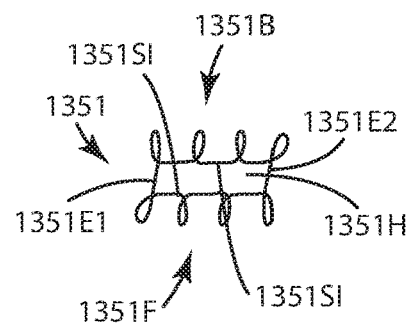
FIG. 12 is section view of a tubular vertical element taken along lines 12-12 in FIG. 11.

Optionally, the vertical elements 1351 can be knitted in the form of tubular elements. A cross-section of a vertical element 1351 is shown in FIG. 12. There the vertical element is constructed in the form of a knitted tubular structure. The knitted tubular structure includes a front face 1351F and a rear face 1351B. Each of these individual faces are constructed from respective front and rear needle beds during the knitting process. These faces also can be connected and joined with one another at the respective sides 1351E1 one and 1351E2. The front and rear faces are, however, separated from one another on their interiors which face one another. Thus, the faces cooperatively form a cavity or chamber 1351H. This chamber 1351H extends along the length of the vertical element a preselected distance, optionally along the entire vertical element. It is this interior chamber, bounded by the front and rear faces that gives the vertical elements the generally tubular structure. It is to be noted that in some cases, the front and rear faces in particular their interior facing surfaces 1351SI can engage and contact one another. In such a configuration, the chamber 1351H can appear collapsed and can have minimal to no volume.

Further optionally, depending on the pocket and desired features, other structures of the pocket can be knitted in the form of tubular elements. For example, the runners 1341 and 1342, the perimeter flange 1310PF or other elements of the pocket can be constructed in a similar manner to include the knitted tubular structure described above. Indeed, the pocket can be constructed from a variety of different or similar tubular structures, combined with other flat knit patterns or other knit patterns as desired.

As mentioned above and as shown in FIGS. 8-14, the vertical elements 1351 can be joined with one another with a plurality of join elements 1352. These join elements 1352 can be constructed from a plurality of strands that are interlooped with the respective strands of the respective vertical elements 1351. Optionally, the joins can be constructed with an Intarsia knitting process or technique, further optionally by knitting two adjacent areas in an overlapped manner with a knitting machine. Even further optionally, the joins 1352 can be constructed by overlapping the rows, also referred to as courses herein, that form adjacent vertical elements. As an example, a join 1352a can be formed by at least partially overlapping a row of knitting of the vertical element 1351C1 with another row of adjacent vertical element 1351C2. In some cases, another row from vertical element 1351C2 can overlap another row of the vertical element 1351C1. This can be repeated multiple times, overlapping certain portions of rows from adjacent vertical elements, until a join of desired dimension is achieved.

Referring to FIGS. 8-14, the join elements 1352 can extend laterally of each of the respective vertical elements 1351 joining adjacent ones of those vertical elements 1351. The spacing of the joins can be varied in transitioning from the shooting ramp SR rearward toward the middle pocket MP4 and further toward the rear edge 1310L of the pocket 1310 or pocket body 1310B.

Figure 48:
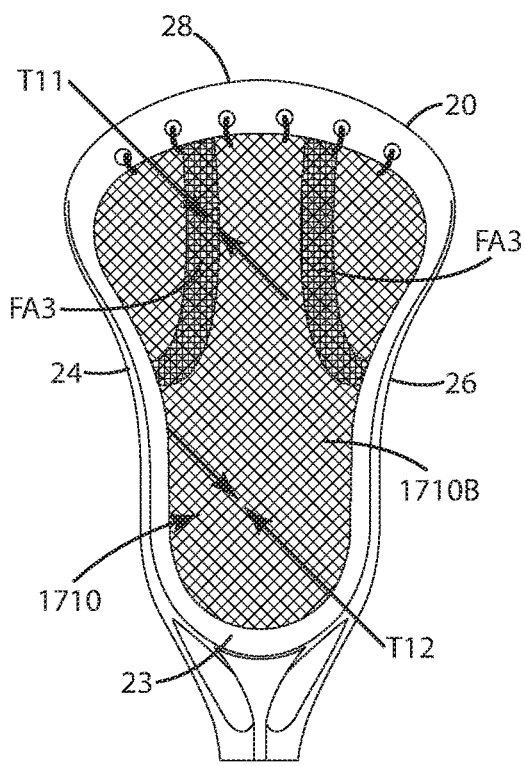
FIG. 48 is a front view of the lacrosse pocket of the fourth alternative embodiment having a pair of fused runner pocket areas.

For example, as shown in FIG. 48, the join elements 1352 can be more widely spaced or distanced from one another along a respective vertical element 1351 in some areas than in others. Optionally, knitted rows from adjacent vertical elements can overlap one another at more frequent intervals to form more frequent joins. As shown in FIG. 48, the joins near the middle pocket MP4 can be spaced from one another so as to form openings 1353O. These openings can be of different sizes and shapes from the openings 1353S near the shooting ramp SR. In some cases, the openings 1353O near the middle pocket MP4 can be 2, 3, 4, 5, even 10 times longer or larger than the openings 1353S near the shooting ramp. In turn, this enables the vertical elements 1351 near the middle pocket MP4 and/or the apex 1355A of the pocket.to more easily spread apart from one another, and thus become more supple and pliable to accommodate and optionally restrain a lacrosse ball disposed in the middle pocket MP4. This also can provide a greater sag in the middle pocket MP4 to better grip the ball. In contrast, with the smaller apertures 1353S there is an increased number of join elements 1352 in the shooting ramp SR, or there are more join elements per unit of distance in that region, so that the vertical elements 1351 cannot generally expand as much or distance themselves from one another as easily as in the middle pocket MP4. In turn, this creates a more rigid and/or taut knit pattern within the shooting ramp SR, which can be conducive to the ball easily rolling off or through that shooting ramp.

Optionally, as shown in FIG. 48, two or more vertical elements, for example 1351C1 and 1351C2 can extend continuously from the shooting ramp SR all the way to the lower edge 1310L. These vertical elements 1351C1 and 1351C2 can be attached to one another via a plurality of joins 1352. The frequency of the joins can decrease nearing the bullseye opening 1350B from either or both the shooting ramp direction or the direction of the upper edge of the pocket. With such a construction, the openings within the pattern of the middle pocket become progressively larger in area as they near the bullseye opening 1350B. Accordingly, the openings within the pattern of the middle pocket, and in particular those between the vertical elements 1351C1 and 1351C2 become progressively smaller in area as they increase in distance from the bullseye opening and/or the apex of the pocket. This progressive decrease in the overall area of the openings can occur in any direction emanating outward from the bullseye opening 1350B. The bullseye opening 1350B can be the largest dimensioned opening defined by the lacrosse pocket, and can have the largest area of any opening defined therein. Further optionally, the middle pocket can define multiple different sized openings formed as the pocket is produced via an automated assembly machine, such as a knitting machine. Each respective opening of the middle pocket can be bounded by at least one vertical element in at least one join element. The distances between the joins along the adjacent vertical elements can vary, depending on the desired area of the opening and its location within the middle pocket.

Figure 11:
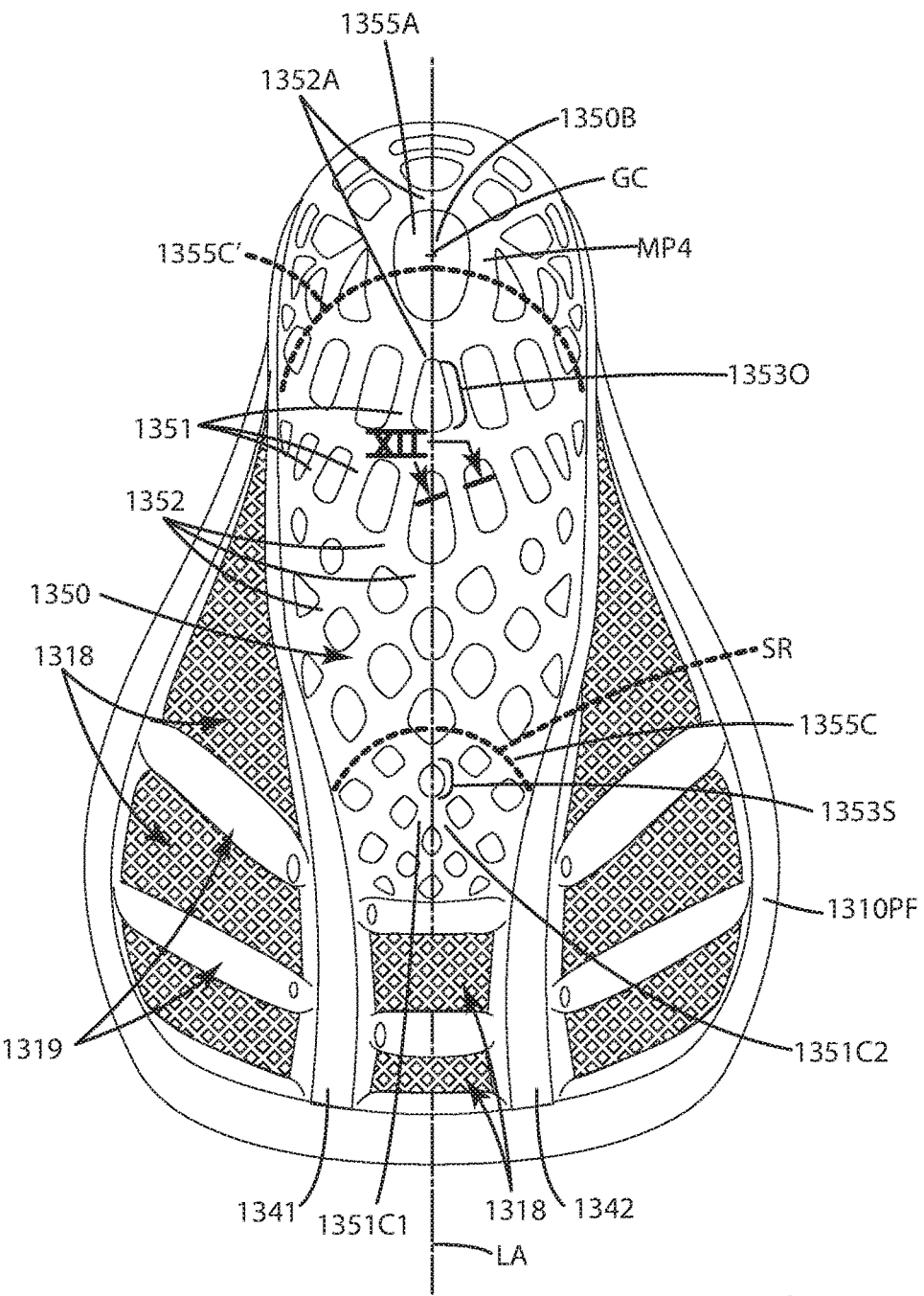
FIG. 11 is a rear perspective view of the lacrosse pocket of the current embodiment placed on a contoured fitting structure.

As shown in FIGS. 9-11, the unitary textile material from which the pocket 1310 is constructed can be specifically knitted and/or weaved by a respective knitting and/or weaving machine to include a predefined three dimensional concave shape integrally formed in the single type of textile. By predefined, it is meant that the machine, whether a knitting or weaving machine, automatically manipulates the plurality of strands in such a manner so that they achieve the respective three dimensional and/or planar shapes. These parameters can be preprogrammed into the machine.

Figure 14:
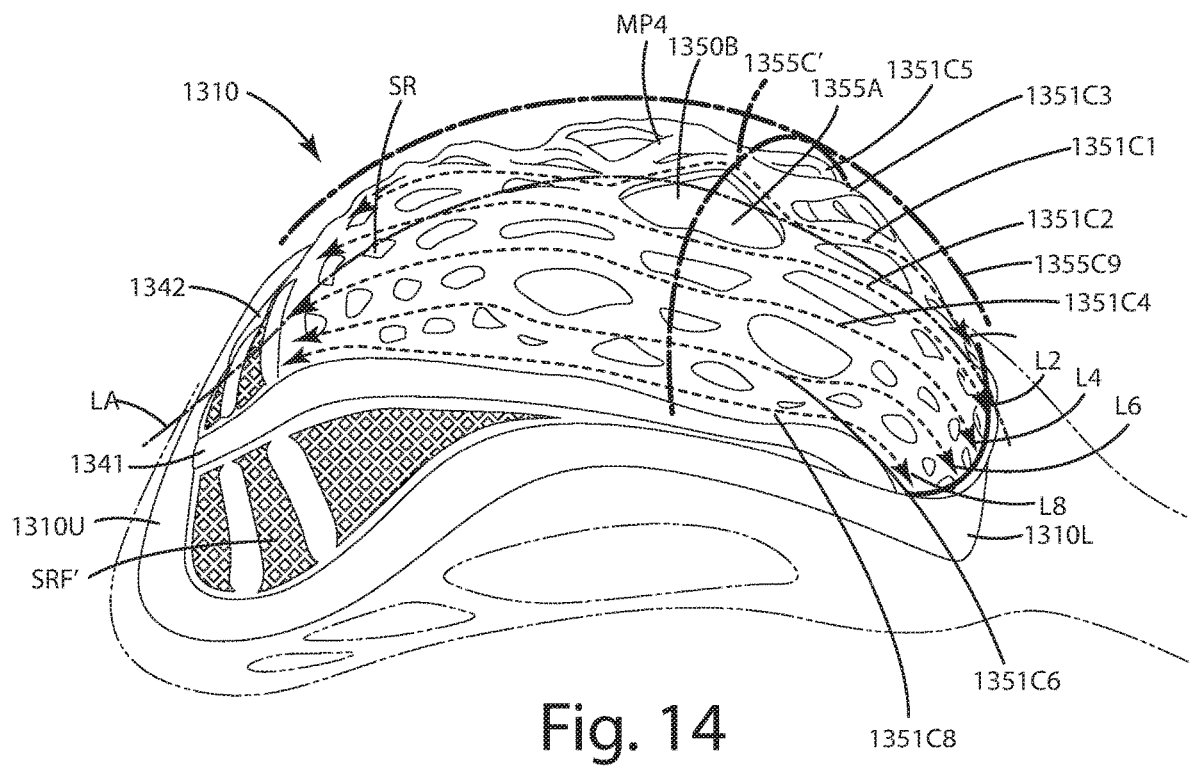
FIG. 14 is a perspective view of a lacrosse pocket of the current embodiment illustrating the three dimensional contours of the pocket.

Referring to FIG. 14, the three dimensional contours of the pocket 1310 optionally can be formed by manipulating the plurality of strands to form vertical elements having varying numbers of rows, and thus varying lengths. More particularly, as mentioned above, the middle pocket MP4 and shooting ramp SR can be comprised of multiple vertical elements spanning from or adjacent the lower edge 1310L toward the upper edge 1310U of the pocket 1310. These vertical elements can collectively cooperate to form the side to side curvature, for example 1355C', as well as the longitudinal curvature 1355C9 of the pocket. These curvatures as well as other features, whether flat, planar, convex or concave or some other configuration, can collectively form the three dimensional contour of the pocket. The vertical elements can become progressively shorter in length the farther they are laterally disposed from the longitudinal axis LA.

For example, the vertical element 1351C2, which can form at least a portion of the bullseye opening 1350B, can be longer than the vertical element 1351C8 that is adjacent the runner 1342. As a more specific example, the length L8 of vertical element 1351C8 can include approximately 100 rows of knitted stand, whereas the length L2 of the vertical element 1351C2 can include approximately 300 rows of knitted strand. With more rows, the respective vertical elements become longer in their respective lengths. Optionally, the central vertical elements near or adjacent the apex or bullseye opening can include 50, 100, 150, 200, 250, 300, 350, 400, 450 or 500 more rows than the lateral vertical elements near the sides of the pocket. The other intermediate vertical elements 1351C4 and 135106 can include lengths L4 and L6 having a number of rows between the number of rows of the vertical elements 1351C8 and 1351C2. For example, 1351C4 can include 250 rows and vertical element 1351C6 can include 150 rows. The precise ratio of rows in one vertical element relative to another vertical element can vary depending on the intended contour and curvatures 1355C9 and 1355C'. In some cases the number of rows in the vertical elements can increase by at least 5%, 10%, 25%, 50% or more as the vertical elements are disposed farther laterally from the longitudinal axis LA. Likewise, depending on the particular depth and desired curvatures 1355C' and 1355C9 of the pocket, the number of rows in each vertical element can be varied. Further, it is to be understood that the vertical elements 1351C1, 1351C3, 1351C5 etc. on the other side of longitudinal axis LA, can be of a decreasing length, as the vertical elements are disposed farther from a longitudinal axis LA.

The vertical elements or other features within the shooting ramp SR can be constructed so that when the pocket 1310 is knitted and/or weaved, it forms a three dimensional concave contour 1355C. This concave contour 1355C can extend through and laterally across at least a portion of the shooting ramp SR. As shown in FIGS. 9 and 11, this concave shape or contour 1355C can gradually increase in depth as is transitions toward the middle pocket MP4. Of course, the precise concavity within this third pattern of the unitary textile material can vary depending on the location in the pocket. For example, in the shooting ramp SR, the concavity can be generally less than the concavity in the middle pocket MP4. Optionally, this concavity can be controlled by the number of joins between respective vertical elements.

Again, for example, with more joins 1352 joining the adjacent vertical elements, those vertical elements 1351 can be closer to one another and less prone to expanding away from one another. This, in turn, can reduce the concavity of the third knit pattern 1350 within the shooting ramp. The overall width between the respective runners 1341 and 1342 also can be decreased due to increased number of join elements. Thus, a ball exiting the pocket can begin to ride up onto the runners 1341 and 1342, generally, coming up and out from the middle pocket MP4 onto the shooting ramp SR.

As shown in FIGS. 8-14, the knit pattern 1350 can transition to and/or include a middle pocket MP4. This middle pocket MP4 can be configured and specifically knitted and/or weaved so that it is generally supple and can hug a lacrosse ball when disposed therein. This can enable a player to better cradle the ball, keeping it within the pocket during a particular maneuver.

Optionally, the middle pocket MP4, like the shooting ramp SR, can include a plurality of vertical elements 1351 and joins 1352 generally extending between those vertical elements. All of these components can be constructed from a plurality of strands which are interlooped and/or interweaved with one another in a continuous manner.

As explained above, the middle pocket MP4 can include joins 1352 that are spaced farther from one another to create larger openings 1353O. Optionally, with reference to FIG. 11, the joins 1352A can be spaced a sufficient distance from one another, for example, ¼ inch to 2 inches, further optionally ½ inch to 1½ inches, even further optionally 3/4 inch to 1¼ inch away from one another along the longitudinal axis LA of the pocket. This allows the immediately adjacent vertical elements 1351 to spread apart from one another, particularly when a lacrosse ball is placed in the pocket. In turn, this produces a large bullseye opening 1350B within the pattern 1350. This bullseye opening can be configured so that at least a portion of a lacrosse ball centers on or within, or is at least partially restrained in the bullseye opening 1350B within the pattern 1350. This centers the ball in the middle pocket MP4, providing a consistent location for the ball to rest within or to be snugly held within the pocket. With such a consistent resting location, which can be precisely replicated from one manufactured pocket to the next a player can be confident that the ball will begin to roll out of the same location within the middle pocket onto the shooting ramp in a consistent and reproducible manner.

Optionally, the bullseye opening 1350B is disposed within the pattern 1350 at the center of the middle pocket MP4. More particularly, the bullseye opening can have a geometric center GC as shown in FIG. 11. This geometric center GC can be aligned with and coincident with an apex 1355A of the middle pocket MP4. As mentioned above, the apex can be associated with the deepest depth of the pocket, and can correspond to the lowermost portion of a horizontally disposed lacrosse pocket when viewed from a side profile. The precise location of the bullseye opening 1350B can vary depending on the location of the apex and pocket profile. For example, where a high pocket is desired, the apex will be located relatively close to the shooting strings. Thus, the bullseye opening will likewise be located closer to the shooting strings than to the base or ball stop of the head. Where a middle pocket is desired, the apex will be located about midway between the shooting strings and the ball stop or base of the head. Thus, the bullseye opening will likewise be located and generally centered about midway between the shooting strings in the ball stop. Where a low pocket is desired, the apex will be located closer to the ball stop or base of the head than to the shooting strings. Thus, the bullseye opening will likewise be located closer to the ball stop or base of the head than to the shooting strings.

As shown in FIG. 11, within the middle pocket MP4, the vertical elements and joins can appear to emanate and project radially outward from the bullseye opening 1350B. This configuration of the verticals and joins appearing to project radially outwardly or otherwise surround the bullseye opening 1350 can be referred to as a starburst or flower pattern. This starburst or flower pattern can assist in orienting a lacrosse ball in the pocket to settle within that particular pattern, generally centered on the bullseye opening 1350B. Again, with this consistent resting location of the ball within a pocket, a user can typically manipulate the ball with the pocket and associated head more consistently.

Optionally, as shown in FIG. 8 the bullseye opening 1350B can be bounded by a first vertical element 1351A on a first lateral side of the pocket longitudinal axis, and a second vertical element 1351B on a second lateral side of the pocket longitudinal axis LA opposite the first lateral side. The bullseye opening also can be bounded by a first join 1352A and a second join 1352B. These joins can extend transversely or generally perpendicular to the longitudinal axis LA. These joins also can connect the first vertical element and the second vertical element to one another to form the bullseye. Generally, the spacing or distance between the first join and the second join adjacent the bullseye opening can be the greatest spacing or distance between joins adjacent any opening within the lacrosse pocket 1310. Again, the bullseye opening can generally include the greatest open area of any opening within the lacrosse pocket.

As shown in FIGS. 10 and 11, the middle pocket MP4 can be constructed to include a predefined three dimensional convex shape 1355C'. This concave shape generally extends across a side to side width SSW1 of the lacrosse pocket in the middle pocket region, which width is taken perpendicular to the longitudinal axis of the pocket LA. The middle pocket MP4 as shown in FIG. 12 also can include a lengthwise predefined three dimensional concave shape 1355C". As also illustrated in FIG. 12, this three dimensional concave shape can enable the pocket 1310 and in particular the pocket body 1310B to have a predefined depth DD'. This depth can range from 30 mm to 65 mm, further optionally 62.7 mm to about 64.7 mm. This depth DD' can be located and/or defined at the apex 1355A of the pocket.

With this concavity and general three dimensional shape built into the unitary textile material, the pocket attains a concave, curved, rounded shape from side edge 1314 to side edge 1316, as well as a concave, curved, rounded shape in and adjacent the middle pocket MP4 and sometimes the shooting ramp SR. This shape is effectively knitted and/or weaved directly into the strands of the pocket. Indeed, the plurality of strands, and in their particular knit or weave patterns, can support the pocket 1310 in its rough three dimensional shape as, for example, shown in FIGS. 9 and 13. In those figures, the unitary textile material, is self-supported in the predefined, three dimensional shape shown there by the network of a plurality of strands extending through the different patterns in that textile material. This shape approximates a final shape after the pocket is joined with a head, generally being stretched out and/or under tension, laterally and/or longitudinally, due to the attachment of the edges or perimeter flange to the lacrosse head. However, it is to be noted that after being produced by a knitting and/or weaving process, the pocket of this embodiment can approximate the final three dimensional shape of the pocket when it is placed on a lacrosse head.

Optionally, the middle pocket MP4 generally forms a rearward bulge or bulbous shape. As shown in FIG. 12, the apex 1355A of the middle pocket MP4 can generally be at the depth DD' of the pocket. The apex 1355A can also correspond to the location of the bullseye opening 1350B, and even further optionally to the precise geometric center GC of the bullseye opening. Further optionally, the middle pocket MP4 and shooting ramp SR can be constructed with a predefined three dimensional shape. This three dimensional shape can be concave as mentioned above, however alternatively, it can be arcuate, parabolic, rounded or generally bulging, when taken across a width of the pocket transverse to the longitudinal axis LA of the pocket 1310.

Due to the construction of the across pocket 1310 on an automated assembly machine, that machine can produce a pocket having varying overall widths from the upper edge 1310U to the lower edge 1310L of the pocket. For example, as shown in FIG. 9 and mentioned above, the middle pocket MP4 can include a side to side width SSW1, which is a side to side lateral measurement taken perpendicular to the longitudinal axis LA of the pocket at the widest portion of the middle pocket MP4 generally at the outermost portions of the perimeter flange 1310 PF. Near the upper edge 1310U of the pocket 1310, which is adjacent the scoop pocket portion SSP, the pocket can include a side to side with SSW2, which also is a side to side lateral measurement taken perpendicular to the longitudinal axis LA of the pocket at the widest portion of the pocket generally at the outermost portion of the perimeter flange 1310 PF near the scoop pocket portion. Of course, this side to side with SSW2 can also be taken immediately adjacent the shooting strings in the pocket. The side to side with SSW2 can be at least optionally 10 mm, further optionally at least 20 mm, and even further optionally at least 40 mm, yet further optionally at least 60 mm greater than the width SSW1. Due to this difference in the lateral side to side widths of the pocket along the longitudinal axis, the perimeter flange and/or the pocket outer when included perimeter curves outwardly in transitioning from the middle pocket toward the scoop pocket portion of the pocket or upper edge. Thus, when viewed from above, the outer pocket perimeter or perimeter flange appears to be slightly S-shaped or slightly reverse S-shaped as it extends from the lower edge to the upper edge of the pocket. Further optionally, the outer pocket perimeter or perimeter flange can be curved, rounded, undulating, sinusoidal, or generally nonlinear as it extends from the upper edge to the lower edge. The degree of undulation in the perimeter flange or outer pocket perimeter can vary depending on the particular application and configuration of the sidewalls of the head to which the pocket is to be joined.

As mentioned above, the middle pocket MP4 can be bounded by portions of the shooting ramps 1341 and 1342 as shown in FIG. 8. The middle pocket also can transition to and be integrally joined with the respective edges 1316 and 1314. Indeed, as mentioned above, a plurality of strands of the middle pocket and the pattern 1350 can be interlooped and/or interweaved with the corresponding strands of the edges 1314 and 1316 so that the textile remains a unitary single piece. As further illustrated in FIG. 8, the edges 1314 and 1316 can extend on opposite sides of the middle pocket MP4 and/or the shooting ramp SR from the lower edge 1310L forward toward the upper edge 1310U of the pocket 1310.

Optionally, the side edges 1314 and 1316 can be aligned with and follow in parallel the reference axes RA1 and RA2 which are generally parallel to the longitudinal axis LA of the pocket 1310. The side edges, however, can flare outward and deviate laterally away from the longitudinal axis and thus the respective reference axis RA1 and RA2 as they progress toward the upper edge 1310U. A portion of the shooting ramp SR can remain disposed between those reference axes RA1 and RA2. The shooting ramp flanks SRF1 and SRF2, however, can extend outwardly and laterally beyond the reference axes RA1 and RA2 on opposite sides of the longitudinal axis. Likewise, the side edges 1316 and 1314, near the upper edge 1310U can extend or flare laterally away from those reference axes RA1 and RA2. After being knitted or weaved on a knitting or weaving machine, respectively, this outward flaring of the respective shooting ramp flanks and edges of the pocket beyond the reference axes RA1 and RA2, the finished pocket 1310 approximates the three dimensional shape of the pocket when installed on a lacrosse head.

Upon completion, the pocket 1310 can have a particular weight. As an example, the pocket can weigh about 5 grams to about 50 grams, further optionally about 10 grams to about 25 grams.

A method of manufacturing the lacrosse pocket of the current embodiment will now be described in further detail with reference to FIGS. 1-14. As mentioned above, the lacrosse pocket is constructed from a unitary textile material. Generally, the pocket is formed completely via a mechanized manipulation of a plurality of strands. The mechanized manipulation can be performed by a knitting or weaving machine 1390. Although described herein in connection with a knitting process on a knitting machine, it will be appreciated that the pocket can be weaved on a weaving machine using a weaving process. Thus, all the steps, configurations, structures and operations applied to knitting herein apply by analogy to weaving. Therefore, any description of the knitting process can be applied equally to the weaving process description here.

The knitting process can be any of a variety of different knitting processes, for example circular knitting, tubular knitting, flat knitting, Jacquard knitting, Intarsia knitting, weft knitting, warp knitting and other types of knitting. When a weaving process is utilized, the process can be any one of multiple weaving processes, including processes that construct a leno weave, a twill weave, a hatch weave, a slit weave, a plain weave, a baskets weave, a Jacquard weave, a Rib weave and an Oxford weave or other types of weaves.

As mentioned above, the knitting machine can be any type of sophisticated knitting machine. Suitable knitting machines include a Kauo Heng knitting machine, commercially available from Kauo Heng Precision Machinery Industrial Co. Ltd. of New Taipei City, Taiwan; a Shine Star knitting machine, commercially available from Zhejiang Shine Star Machinery Co. Ltd. of Jiaxing City, China; a Stoll knitting machine from H. Stoll AG & Co. KG of Reutlingen, Germany, commercially available in the U.S. from Stoll America Knitting Machinery, Inc., of New York, N.Y.; a Protti knitting machine, commercially available from Protti S.p.A. of Asola, Italy, or other comparable knitting machines. Optionally, the knitting machine can mechanically manipulate a plurality of strands of the unitary textile pocket and/or pocket body during a knitting process to form a predefined, three dimensional shape in the pocket 1310 and/or pocket body 1310B, for example, via a tubular knitting process in which multiple tubular elements are knitted and joined to form the various components and structure of the pocket 1310. If desired, the tubular knitting process can also implement a weft knitting technique.

The three dimensional shape of the pocket can include a concave shape disposed or located generally within the middle pocket MP4 and/or shooting ramp SR. The three dimensional shape also can encompass substantially planar and/or convex regions of the pocket, for example in the shooting ramp and/or shooting ramp flanks, which optionally does not include knitted tubular elements. The machine itself can be configured to interloop a plurality of first strands with a plurality of second strands, and any number of additional strands, so as to form that predefined, three dimensional shape in the pocket and/or pocket body. The machine also can mechanically manipulate other strands, or optionally the same strands, but different portions thereof, of the unitary textile material with a knitting machine during the knitting process to form the above mentioned predefined generally flat planar shapes in the pocket body and/or predefined three dimensional convex shapes in the pocket body. The latter shapes can correspond generally with the shooting ramp flanks SRF 1, SRF2 and/or the respective edges 1310U, 1310L, 1314 and/or 1316 or other portions of the pocket.

During the knitting process, the knitting machine knits a unitary textile pocket and body so as to form the respective components of the pocket and pocket body. For example, the knitting machine knits the upper edge, the first and second sidewall edges, the lower edge, the shooting ramp, the middle pocket and the shooting ramp flanks which have their respective predefined shapes and patterns. All of these different knitted components of the pocket body are contiguous and continuous with one another, being formed from the plurality of strands that make up the unitary textile material. Indeed, many of the individual strands can span the length of the pocket from the upper edge 1310 U to the lower edge 1310L and can be interlooped in specific regions of the pocket, thereby forming and becoming integrated with the different knit patterns of the pocket. Thus, as one example, a knitting machine can interloop a first strand with a second strand near the lower edge 1310L. The first strand can continue into a vertical element through the middle pocket and shooting ramp SR. In the shooting ramp SR, that strand can be interlooped with additional strands within the knit pattern 1350. The same strand can extend into and be interlooped with yet other strands in the knit pattern 1318. The same strand can extend along and be interlooped with yet additional or similar strands in the pattern 1319. The strand can extend and be further interlooped with yet other strands in the upper edge 1310U of the lacrosse pocket.

Figure 43:
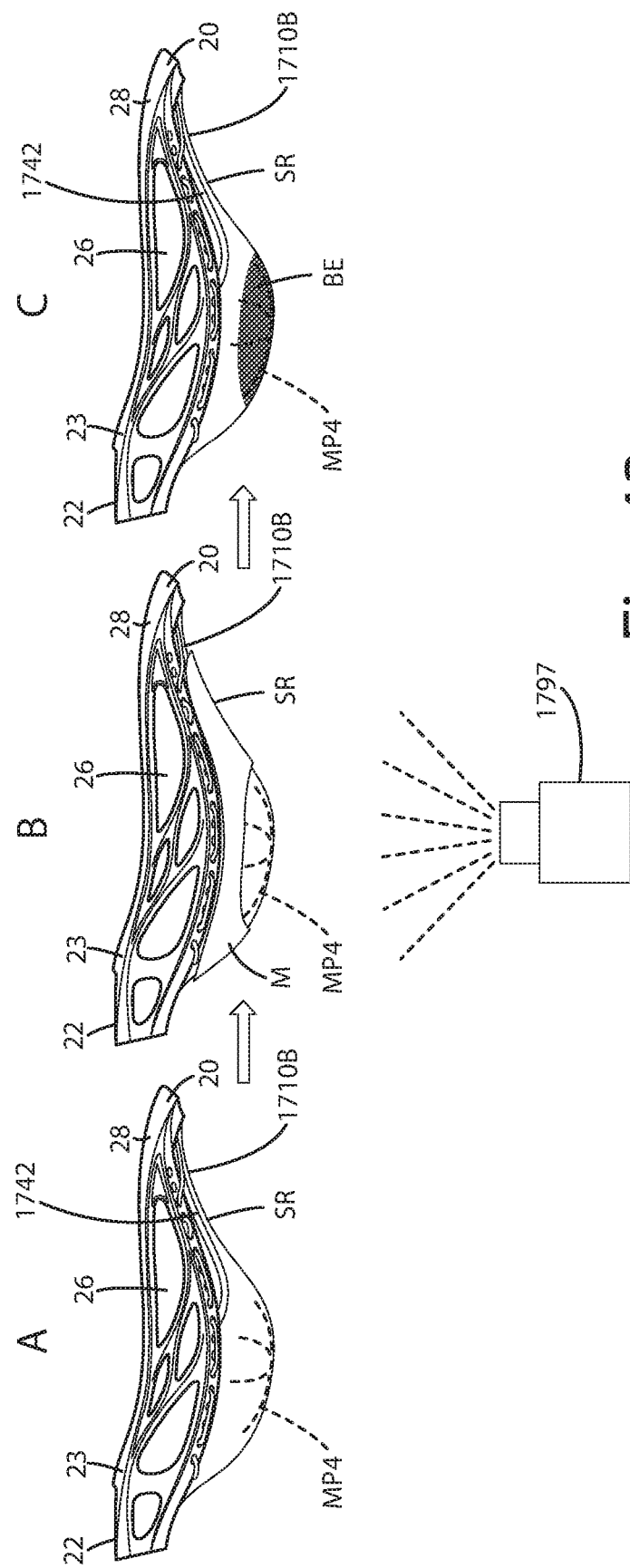
FIG. 43 is a flow diagram illustrating an exemplary process of forming a fused pocket area according to the fourth alternative embodiment.

As mentioned above, the knitting during the knitting process knits the unitary textile body so that it forms in that body the shooting ramp SR, middle pocket MP4, respective shooting ramp flanks SRF1 and SRF2 as well as the different components of the pocket in the zones A-E as shown in FIG. 43. It does all this in a mechanized manner, without direct manual, human manipulation of any strands in the pocket.

The unitary textile material of the pocket 1310 and/or pocket body 1310B, and in particular its multiple strands, can be mechanically manipulated to provide different knit patterns. During the knitting process, the knitting machine 1390 effectively knits a plurality of strands individually and/or collectively so as to form the different regions of the pocket, for example, the first knit region 1318, the second knit region 1319, the runners 1341, 1342, the edges 13U, 1310L, 1314 and/or 1316, as well as the region 1350 in which the middle pocket MP4 and the portion of the shooting ramp SR are disposed. Optionally, a majority of the middle pocket region MP4 can be weft knitted, and can include multiple tubular elements, such as tubular vertical elements as described above. The knitting machine creates all of these different components and patterns in a mechanized process using multiple needles through which the thread is dispensed and included in the pocket body. Effectively, the plurality of strands are put in place via mechanical manipulation of the respective needles of the knitting machine, within the pocket body. None of the strands are subject to direct manual human manipulation to form the pocket body, let alone any of its three dimensional shapes or components.

As shown in FIG. 16, the knitting machine 1390 can be configured to receive multiple different strands 1393A, 1393B and 1393C that are spooled on respective cones 1394A, 1394B and 1394C as shown in FIG. 16. The different cones, also referred to as spools herein, and different strands can be constructed from different materials as further explained below, depending on the particular attributes and mechanical and/or physical properties of the pocket in certain regions. The respective cones 1394A, 1394B, 1394C each can be rotatably mounted on an axis so that the knitting machine 1390 can draw in stands of the material from the respective cones.

Optionally, the knitting or weaving machine can include 200-1,200 needles, further optionally about 400-1,000 needles, even further optionally about 500-800 needles. These needles can be manipulated and controlled by actuating mechanisms further controlled by a controller. The controller can have preprogrammed knitting or weaving patterns in memory. A user can select and/or program the controller so that it directs the actuating mechanisms and thus the respective independent needles to knit and/or weave the strands in a particular pattern and/or within a particular region.

Throughout the knitting process, the knitting machine knits different regions and different patterns. As mentioned above, it can knit the first pattern 1318, the second pattern 1319 forming the tubular structure therein, as well as the runners 1341 and 1342 as well as the pattern 1350 near the middle pocket. In constructing the different patterns, the knitting machine can change the density, that is the number of strands, courses and/or wales in a given region as well as in different regions of the pocket. For example, the knitting machine can manipulate the strands so that the density of strands in the perimeter flange 1310PF is greater than the density in the first pattern 1318. The density of strands in the third pattern 1319 can likewise be greater than the density in the pattern 1318. The runners 1341 and 1342 can have a strand density that is greater than the region 1318 but perhaps similar to the density in the edges and/or vertical elements of the middle pocket and/or shooting ramp. With these different densities, some regions of the pocket can be more or less densely knitted than other regions. This can provide desired mechanical and/or physical properties of the pocket in those specific regions, and/or across the pocket. For example, where it is more densely knitted, the pocket can be more robust and rigid. Where it is less dense, the pocket can be more supple. Optionally, however, these characteristics of suppleness and rigidity can be altered when the pocket is connected to a head. In some cases, the pocket can be stretched more in certain regions than in others, which can either increase or decrease the rigidity and/or suppleness of the pocket in the different regions and within the different knit patterns.

The pocket and pocket body can include different components and regions that are constructed from strands of different materials having different properties. To create such a pocket, the knitting machine 1390 can be set up so that the different spools 1394A, 1394B and 1394C include appropriate amounts of continuous, elongated strands of a first material and a different second material. In some cases, the first material 1393A can be less elastic and more abrasion resistant and durable than the second material 1393B and 1393C. Of course, the different materials can be constructed so that they have other different mechanical and/or elastic properties. As an example, a strand of a first material, for example an elongated aromatic polyamide can be placed on the first spool 1394A. Strands of a second material, for example thermoplastic polymer can be placed on spools 1394B and 1394C. The knitting machine 1390 can pull strands 1393A from the first cone or spool 1394A and construct at least one of the sidewall edges 1314, 1316, the upper edge 1310U and/or lower edge 1310L of the first pocket body 1310B with this plurality of strands. The knitting machine 1390 can separately pull the strands 1393B and 1393C of the second material off the cones or spools 1394B and 1394C, respectively, and interloop certain ones of those strands with the strand 1393A. Thus, the strands in certain regions can be of one material, and can be interlooped and connected directly with strands of the second material in predefined locations.

Optionally, the knitting machine, or any automated pocket assembly machine described herein, can be configured to mechanically manipulate a strand drawn or pulled from a particular spool to form a predefined three-dimensional shape in a first unitary textile lacrosse pocket body. This first strand can be constructed from the second material, for example a thermoplastic polymer. The machine also can make a second lacrosse pocket body joined with the first lacrosse pocket body, where both the first and second lacrosse pocket bodies are constructed primarily from the strand of the second material. If desired, the machine can be coupled to spools of other types of elongated strands such as those constructed from the first material, for example an elongated aromatic polyamide strand. The automated machine also can interloop or otherwise join one or more strand of the first material with one or more strand of the second material.

All the strands 1393B and 1393C can be used to form the patterns 1318 and 1319, as well as the pattern 1350, including the middle pocket MP4 and a portion of the shooting ramp SR. The strands of the first material, however, as mentioned above, can be used to manufacture the respective edges around those components. Where the edges, constructed from the plurality of strands 1393A of the first material interfaces or transitions to the other components such as the second pattern 1318, third pattern 1319 or pattern 1350, the strands 1393A of the first material can be interlooped and interlaced directly with the knitted strands 13948, 1394C of the adjacent region of the second material. To achieve this, different needles of the machine can feed and interloop the different materials in the respective different locations. After a lacrosse pocket 1310 is knitted and completed by the knitting machine 1390, it can be removed from the knitting machine and later joined with a lacrosse head in a desired manner as described herein.

Where the pocket 1310 includes one or more tubular structures, such as tubular members in the location of shooting strings, an additional large diameter lace, web or thong can be placed through the tubular structure and joined with the pocket and/or an associated lacrosse head. Where the runners 1341 and 1342 optionally include a tubular structure (not shown) knitted in a similar fashion to the tubular structures 1319C above, elongated runner elements constructed from polymers, rubber or other synthetic materials can be placed in those tubes of the runners to further accentuate and raise the runners relative to the shooting ramp SR.

Optionally, the machine 1390, whether a knitting or weaving machine, can be programmed or otherwise controlled so as to generate a strip of lacrosse pockets including first, second, third and more complete lacrosse pockets, each knitted, weaved or otherwise constructed in a manner similar to that described above. As an example, with reference to FIG. 16, the machine 1390 can knit a first pocket 1310, second pocket 1310' and third pocket 1310", or any other number of pockets. These pockets can all be disposed on a pocket strip 1390S that exits the machine 1390. These pockets can be joined end for end to one another along the strip 1390S. For example, the first pocket 1310 can be joined at its lower edge 1310L with an upper edge 1310U' of a second pocket 1310'. These edges can be joined together at an edge interface 1360. This edge interface 1360 can be a relatively long structure, approximately 1-6 inches in length, or it can be a single strand that connects the lower edge 1310L directly to the upper edge 1310U'. Optionally, the edge interface 1360 can comprise a knit pattern that is different from the patterns of the respective pockets. Of course, the patterns can be changed to be similar to those of the respective pockets if desired within the edge interface as well.

Further optionally, the knitting or weaving machine, or other automated pocket assembly machine, can be controlled by the controller to produce the strip of pockets. The controller can be any conventional processor, computer or other computing device. The controller can be electrically coupled to the machine, and can be in communication with a memory, a data storage module, a network, a server, or other construct that can store and/or transfer data. That data can be particular type of data related to lacrosse pockets. For example, the data can be first lacrosse pocket data pertaining to one or more particular knitting patterns, weaving patterns or other patterns associated with and/or incorporated into the lacrosse pocket. The lacrosse pocket data can be implemented, accessed and/or utilized by the machine, in the form of a code, program and/or other directive. The lacrosse pocket data, when utilized to form the pocket with the assembly machine, ultimately can generate in the pocket features such as: the predefined three-dimensional shape; the position, dimension and/or depth of a middle pocket; the position of an apex of the pocket; the length and location of an outer pocket perimeter; the position and dimension of various edges of the pocket; the position and dimension of a shooting ramp, also referred to as a ball channel; the position and dimension the runners and/or shooting strings of the pocket; the side to side lateral width of the pocket; the minimum width of the pocket; the side to side curvature of the middle pocket and the like.

The controller and/or the automated assembly machine can access the lacrosse pocket data to thereby control the assembly machine and produce a strip of lacrosse pockets in a desired number and configuration. Each of the lacrosse pockets can include a substantially identical predefined three-dimensional shape, and can have virtually identical physical features, such as those enumerated above in connection with the lacrosse pocket data. Alternatively, where the machine is set up to produce only a single lacrosse pocket, the machine can be controlled by the controller, which can utilize the first lacrosse pocket data to produce a lacrosse pocket having features that correspond to the first lacrosse pocket data.

When producing a strip 1390S of lacrosse pockets, the individual lacrosse pockets can be separated from one another in a variety of manners. In one example, the respective edges, for example, 1310L and 1310U' can be joined with the edge interface 1360 in the form of a single pull stitch or strand. This pull stitch can be pulled by a machine or a human operator so that the respective edges separate from one another and/or the edge interface, thereby allowing the pocket 1310' to be removed from or dissociated from the pocket 1310. Likewise, the edge 1310L can include one or more pull strands that can be pulled via a machine or human operator to separate the lower edge from the edge interface.

In some cases, where the lower edge 1310L of one pocket is joined directly with the upper edge 1310U' of another pocket, a pull strand at the edge interface 1360 can be pulled to separate the second pocket 1310' from the first pocket 1310.

Another manner of separating the pockets from the strip can include the use of a decoupling element 1391. This decoupling element 1391 can decouple one pocket from the next, optionally at the edge interface or respective edges of the pockets. As shown in FIG. 16, the decoupling device 1391 can include shears or hot melt tongs that close across the lower edge 1310L' of the pocket 1310'. In so doing, the shears cut, melt or burn off the next adjacent or third lacrosse pocket 1310". The decoupling element 1391 can make multiple cuts, one adjacent the upper edge 1310U'" of the third pocket 1310" and/or adjacent the lower edge 1310L' of the second pocket 1310'. Optionally, the decoupling element can be a laser cutting device or a die cutting mechanism. In cases where the edge interface element is only a strand or a couple strands wide, the decoupler can cut or hot melt across this edge interface, thereby separating the respective edges of the third and second pockets. From there, the pockets can be dropped into a bin or other container for further processing on an individual basis. Optionally, a continuous strip of multiple pockets can be rolled on a spool and delivered to a manufacturer who can then mechanically or manually disassociate the individual pockets from the pocket strip 1390S.

Upon the decoupling of the individual lacrosse pockets and/or lacrosse pocket bodies, each of the lacrosse pockets generally retain their predefined three dimensional shapes. For example, even upon decoupling, the individual pockets will retain the concavity of the concave shape and/or contour of the middle pocket and shooting ramp. Likewise, the shooting ramp flanks can maintain a generally planar and/or convex three dimensional configuration.

The method of making the lacrosse pocket 1310 of the current embodiment in strip form can also generate a lacrosse pocket strip 1390S having varying widths. For example, as shown in FIG. 16, the machine 1390, can vary the widths of the pocket strip 1390S and/or individual pockets of the strip. For example, the machine 1390 can mechanically manipulate strands to generate pockets along the strip that have a width at their outermost lateral boundaries of SW1. This is generally the maximum width of the strip 1390S, along its length. This maximum width can correspond to the region of the pocket adjacent shooting strings and are close to the scoop. It also can be the maximum of width of any individual pocket that is formed along the strip. The machine 1390 also can mechanically manipulate the strands and the overall width of the strip so that the lacrosse pocket strip 1390S includes a second width SW2, which is less than the first width SW1. The second width SW2 can correspond generally to the region of the pocket near the middle pocket MP4 and/or rearward thereof. This width SW2 can be approximately half to three-quarters the maximum width SW1. By precisely knitting the strip 1390S in the respective pockets therein, minimal waste is generated from the process. This is true even where the individual pockets and strip width varies. Without the knitting and/or weaving machine 1390, the material between the maximum width SW1 and the smaller width SW2 would otherwise be removed and discarded as waste. Further, to remove this material would typically require additional machinery and/or human intervention or manipulation.

Optionally, the machine 1390 can mechanically manipulate the strands of each lacrosse pocket constructed on it so that an outer lateral perimeter along the strip of pockets undulates toward and away from longitudinal axis of the strip. Referring to FIG. 16, the strip 1390S includes a strip longitudinal axis SLA. The first pocket 1310 includes a first pocket perimeter flange, also referred to as a pocket edge or perimeter 1310PF disposed laterally of the strip longitudinal axis SLA. The second pocket 1310' includes a second pocket perimeter flange 1310PF'. Each of the respective first and second pocket perimeter flanges 1310PF and 1310PF' can undulate toward and away from the strip longitudinal axis SLA along the length of the strip. For example, near the upper edge 1310U and or a shooting ramp flank SRF2 of the first pocket 1310, the perimeter flange 1310PF can be a distance D7 from the strip longitudinal axis SLA. Near the middle pocket MP4, the perimeter flange 1310PF, can be a distance D8 from the strip longitudinal axis SLA. This distance D8 can be less than the distance D7. Optionally, the distance D8 can be about ¾, ½, ¼ or some other proportion of the distance D7. Further, in transitioning from the different distances D7 to D8 from the strip longitudinal axis SLA, the perimeter flange or pocket edge can transition smoothly along a nonlinear, curved and/or rounded transition area 1310TA. This transition area 1310TA can mimic or follow the curvature of sidewalls of a particular lacrosse head as desired.

Figure 44:
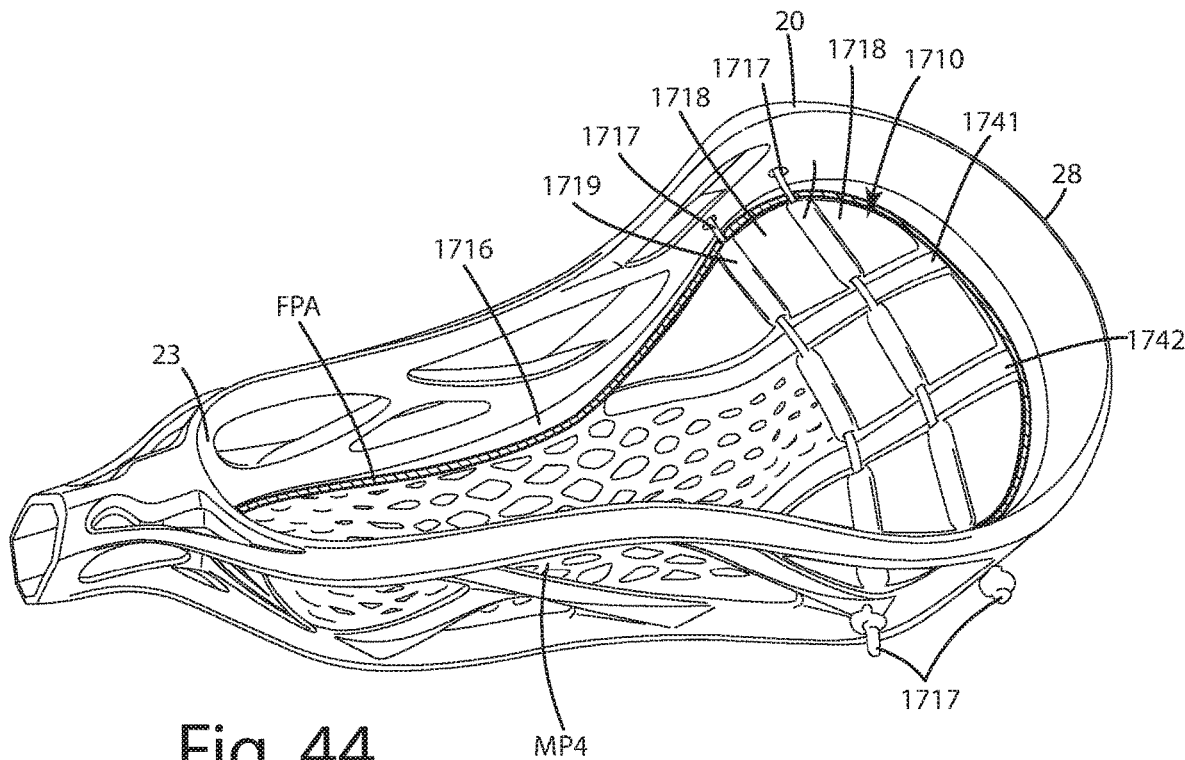
FIG. 44 is a perspective view of the lacrosse pocket of the fourth alternative embodiment mounted to a lacrosse head and including a fused perimeter pocket area.

After the lacrosse pocket of the current embodiment 1310 is constructed, it can be joined with a lacrosse head 20 as shown in FIG. 44. The lacrosse pocket 1310 can be joined in a variety of different manners. For example, the respective edges 1310L, 1310U, 1314 and 1316 can each be configured to and include a plurality of lace holes. A large diameter lace (greater than 2.0 mm) can be fitted through those respective holes. This lace can then be tied directly to respective sidewalls 24, 26, ball stop 23 or base 22 and scoop 28 of a lacrosse head 20. In particular, the respective side edges 1314 and 1316 can be connected to respective sidewalls 24 and 26. Likewise, the lower edge 1310L can be joined with the ball stop and/or base 23, 22. The upper edge 1310U can be joined directly with the scoop 28 using the large diameter (greater than 2.0 mm and/or greater than 3.0 mm) laces. The lacing can be performed manually by human.

Optionally, this connection can be achieved via a computer guided robot with a computer guided lace needle that installs the large diameter lace through the pocket holes 27H of the head and corresponding holes defined and integrally knitted into the edges of the pocket. During the connection of the lacrosse pocket to the head, the lacrosse pocket can undergo a certain amount of stretch in the lateral and longitudinal directions. This, in turn, can add tautness and rigidity to the respective zones as described above in connection with FIG. 43. During the connection, however, the general three dimensional shapes of the respective components as described above are retained, and in some cases augmented via the connection of the pocket to the lacrosse head. For example, the middle pocket MP4 and portions of the shooting ramp SR retain the three dimensional concave shapes. The respective shooting ramp flanks SRF1 and SRF2 also can be configured so that they retain their generally convex and/or planar three dimensional configurations.

While the pocket 1310 constructed from a unitary textile material can be joined directly with a lacrosse head 20 using laces, that pocket optionally can be integrally formed with the lacrosse head via a molding process. On a high level, the edges of the lacrosse pocket are placed in a mold that is in the shape of the desired lacrosse head. The material from which the lacrosse head is constructed, for example, thermoplastic polymers, such as nylon or other suitable material, is injected into the mold cavity. Upon such injection, the injected material engages, encapsulates and becomes embedded within the edges of the unitary textile material and the pocket in general. The material is allowed to cure and the lacrosse head is removed from the mold, with the lacrosse pocket being integrally molded and embedded within the components of the lacrosse head. With this particular construction, the lacrosse head and associated lacrosse pocket can be precisely reproducible. In turn, consumers of this integral, combined lacrosse head and lacrosse pocket can experience a virtually identical mechanical performance and feel from one head to the next, upon initial use of the same. With this combination as well, there is no separate manual stringing of the head, which can lead to inconsistency and undesirable break-in periods for the pocket to achieve a desired shape and profile. With the current embodiments, that desired profile can be included in the pocket so that the head performs as desired by the user.

In addition, a plurality of different profiled pockets can be molded into one head or multiple heads. In turn, a user can experiment with those different pocket profiles and/or heads, and select the one that best suits their preferences. In addition, if a user has a particular profile preference, that profile of a particular lacrosse pocket can be stored in a database. When the user wears out their first head and pocket, they can go and request another pocket and head, identical to the first pocket and head are produced again. Thus, the player can start again with virtually the same pocket and associated feel as they had with the previous pocket and head. This can enhance the confidence of the player. Also, the player need not go through extensive break-in periods to make the pocket perform as desired. Instead, upon purchase of the new head and pocket combination, the pocket will consistently perform as expected.

Figure 3:
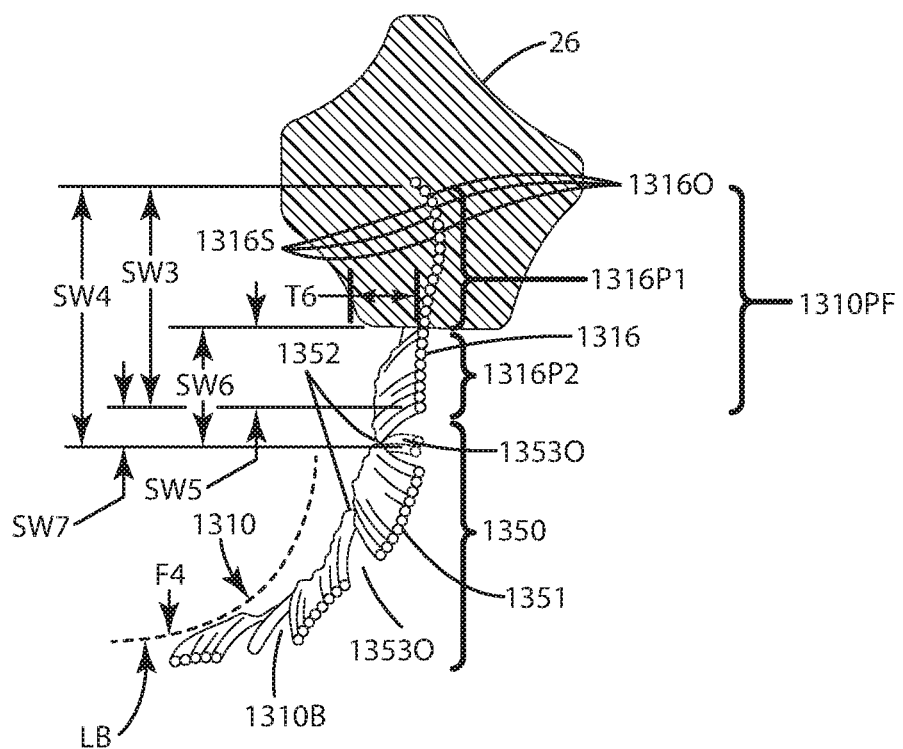
FIG. 3 is a section view of a portion of a lacrosse head over molded and encapsulating a portion of the unitary textile material of the lacrosse pocket of the thirteenth alternative embodiment, taken along lines 3-3 of FIG. 1.
Figure 4:
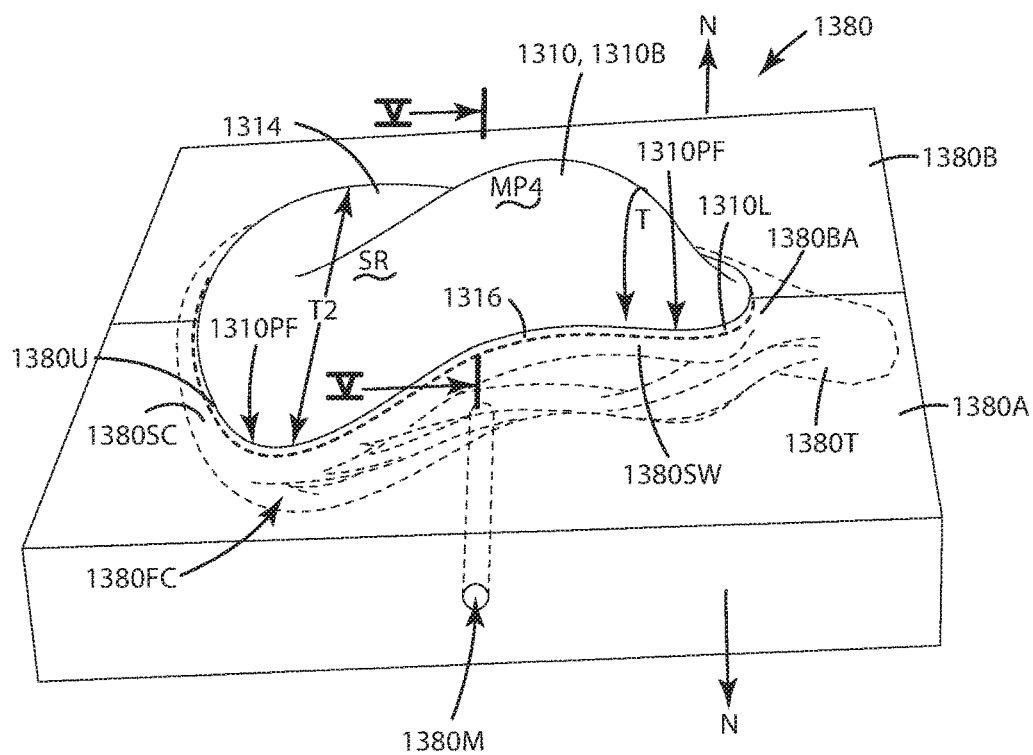
FIG. 4 is a perspective view of a lacrosse pocket of the current embodiment being molded to a lacrosse head in a mold.
Figure 5:
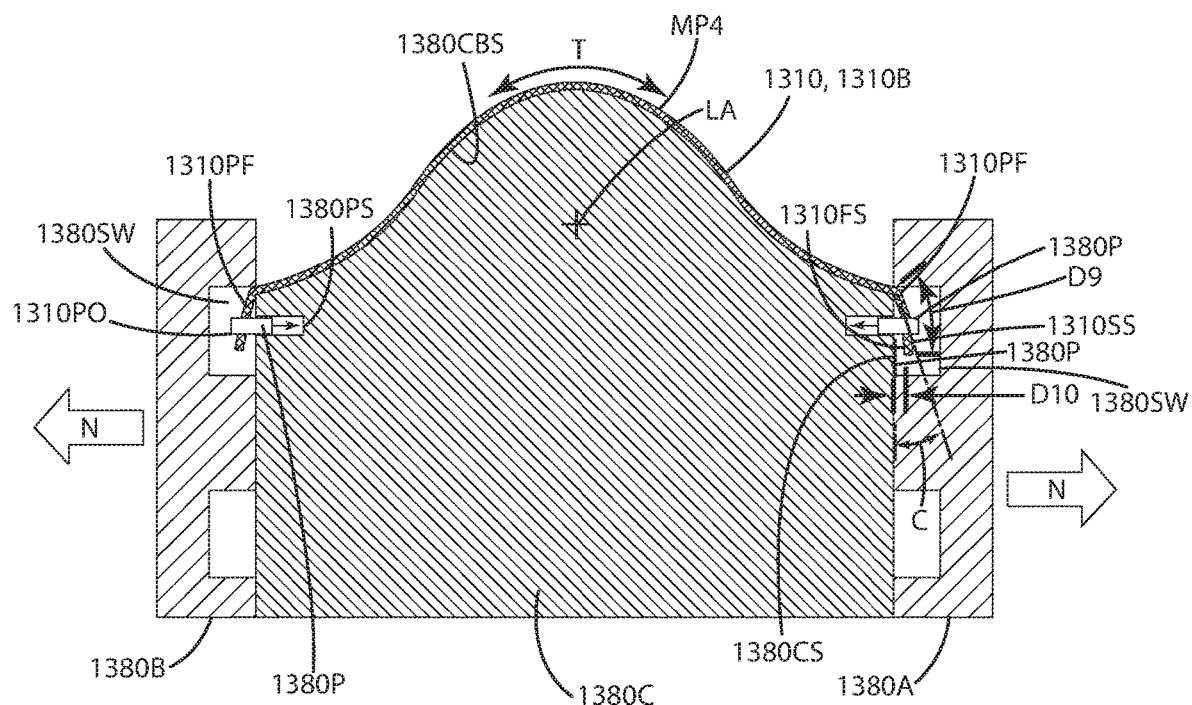
FIG. 5 is a section view of a lacrosse pocket of the current embodiment being molded to a lacrosse head in a mold, particularly showing mold pins.

Referring to FIGS. 3-5, a lacrosse pocket 1310/lacrosse body 1310B is placed adjacent a mold 1380. The mold 1380 can include multiple mold portions 1380A, 1380B and 1380C. As shown in FIGS. 4 and 5, the mold portions 1380A and 1380B can generally be first and second laterally moving mold slides that assist in completing cavities as described further below. The mold portion 1380C, as shown in FIG. 5 can be a central stationary mold portion. This central mold portion can include an upper surface 1380CBS that is configured to directly engage an inner surface of the lacrosse pocket 1310 when the pocket is readied for molding. As can be seen, the surface 1380CBS can be in the shape of a convex, upwardly extending bulge. This bulging mold surface can be shaped three-dimensionally to mimic the desired or intended roundness, three-dimensional contour, and/or apex of the finished pocket. The bulging mold surface also can be shaped three dimensionally to mimic the longitudinal and lateral curvatures and angles of the shooting ramp SR. Further, the bulging mold surface can mimic the convex and/or planar shapes of respective shooting flanks adjacent the shooting ramp and/or ball channel of the pocket. Because the pocket is already specially constructed to include a concave, three-dimensional contour and other geometric features, the pocket readily conforms to and lays over the bulging mold surface 1380CBS.

Referring to FIG. 4, the mold 1380 can define a mold cavity 1380FC that is configured to mirror the sidewalls 24, 26, scoop 28, base 22 and/or ball stop 23 of the lacrosse head 20, for example, shown in FIG. 1. In particular, the mold cavity 1380FC can comprise multiple different cavities to make different portions of a lacrosse head. For example, the mold cavity 1380FC can include a scoop mold cavity 1380SC, one or more sidewall mold cavities 1380SW, a base mold cavity 1380BA and/or a throat cavity 1380T. These different cavities are configured to form the respective scoop, sidewalls, base and/or throat depending on the particular construction of the lacrosse head. With the exception of the perimeter flange 1310 PF and any optional long locator pins 1380P, shown in FIG. 5, these cavities, that is, the scoop mold cavity, sidewall mold cavity and base mold cavity, can be substantially empty or void of other structures before the introduction of molten material within those cavities. Of course, if it is desired to insert mold reinforcement elements, such as those described in U.S. Pat. No. 7,749,113 to Morrow or U.S. Pat. No. 8,282,512 to Winningham, both of which are hereby incorporated by reference in their entirety, then those elements can be placed in the respective cavities before the molding operation.

The lacrosse pocket 1310 can be placed so that its edges 1310U, 1316, 1310L, 1314 and 1316, which can be joined with one another in a continuous manner optionally to form the perimeter flange 1310 PF, are disposed at least partially within the cavity 1380FC of the mold 1380. In particular, the upper edge 1310U can be placed in the scoop mold cavity 1380SC, the sidewall edges 1314, 1316 can be placed in the sidewall mold cavities 1380SW, and the lower edge 1310L can be placed in the base mold cavity 1380BA. These edges and the perimeter flange can extend in a continuous manner through each of the respective cavities, so that the perimeter flange and associated edge or edges effectively circumferentiates and/or surrounds the entire pocket 1310. Further, all of the respective different edges of the perimeter flange, and the pocket outer perimeter in general can be simultaneously disposed within each of the scoop mold cavity, the sidewall mold cavities and the base mold cavity. The perimeter flange and the pocket outer perimeter can extend continuously within the sidewall mold cavities from a first end thereof near the base, to a second end thereof near the scoop. The perimeter flange and the pocket outer perimeter can extend continuously within the base mold cavity from a first end adjacent the first sidewall to a second end adjacent the opposite second sidewall. The perimeter flange and pocket outer perimeter also can extend continuously within the scoop mold cavity from a first end adjacent the first sidewall to a second end adjacent an opposite second sidewall.

Optionally, the edges and/or perimeter flange can be secured in the respective mold cavities during a molding operation using optional locator pins 1380P, which are shown in FIG. 5. These locator pins can be movably disposed within locator pin slots 1380PS. The locator pins can be movable so that they can be removed from the respective sidewalls, scoop and/or base after formation of those components of the lacrosse head. Upon their removal, the lacrosse head can be released more easily from the mold 1380. In cases where the lacrosse head after formation is relatively flexible, the pins can be constructed so they are not movable. In which case, the head can be removed with some additional force, flexing or give to expand and allow the head to pop off the locator pins and the remainder of the mold.

As shown, the locator pins 1380P can be in the form of small cylindrical pins. The pins can be of a length sufficient to extend into the respective cavities. For example, the pins can extend into the sidewall mold cavity 1380SW a sufficient distance to enable the perimeter flange 1310PF or edge to be placed or secured to those pens, thereby suspending the perimeter flange sufficiently within the sidewall mold cavity, so that when the sidewall components are molded, the perimeter flange is well anchored within the resulting, cured lacrosse head. The pins also can be sized so that they fit through respective optional locator pin openings 1310LPO that are defined within the perimeter flange 1310PF and/or respective edges of the lacrosse pocket 1310, 1310B, constructed by the automated pocket assembly machine. These locator pin openings can be the result of a particular knit or weave pattern of the pocket where the textile is interrupted to form those openings. If desired, the locator pin openings can be located only within the perimeter flange and/or edges of the pocket. Of course, they can be located elsewhere depending on the particular attachment points of the pocket to the mold as desired during the molding process.

The optional locator pins 1380P can be constructed so as to hold the perimeter flange 1310PF, or generally an edge or perimeter of the pocket body, a preselected distance D9 within the respective sidewall mold cavities 1380SW, scoop mold cavity 1380SC and/or base mold cavity 1380BA. This preselected distance D9 can be at least about 1.0 mm, further optionally about 2.0 mm, even further optionally 2.5 mm, or yet further optionally 3.0 mm or more, depending on the particular application and desired anchor strength. The locator pins and mold cavities also can be constructed so that a perimeter flange first surface 1310FS faces generally toward the pocket longitudinal axis LA when the perimeter flange is secured within the mold cavity. Accordingly, a perimeter flange second surface 1310SS faces generally away from the pocket longitudinal axis LA. Although FIG. 5 shows the perimeter flange first surface 1310FS and second surface 1310SS being generally vertical, or parallel to and interior cavity surface 1380CS, it is contemplated that the surfaces can be offset at an angle C of about 1° to about 45° or more relative to that cavity surface. Other angles can be selected depending on the textile material for which the pocket is constructed, the ease of embedding and/or encapsulating the pocket material with molten material, the cavity configuration and/or the desired anchor strength. Further optionally, the perimeter flange can be folded over toward and/or upon itself, or partially bent in a V-shape or U-shape within the respective mold cavities. This can be accomplished with more specialized locator pins and/or locator pin openings.

Optionally, the mold 1380 can include mechanisms different from the locator pins shown in FIG. 5 to properly position the perimeter flange within the mold cavity. For example, the mold cavity can include clamps that clamp the pocket immediately adjacent the perimeter flange or some other portion of the pocket. These clamps can hold the pocket, and in particular the perimeter flange, within the respective cavities. The mold portions themselves can in some cases act as clamps when closed, holding the perimeter flange within the respective mold cavities. As another example, the perimeter flange can include an adhesive that secures the perimeter flange to a desired surface within the respective mold cavities.

Figure 6:
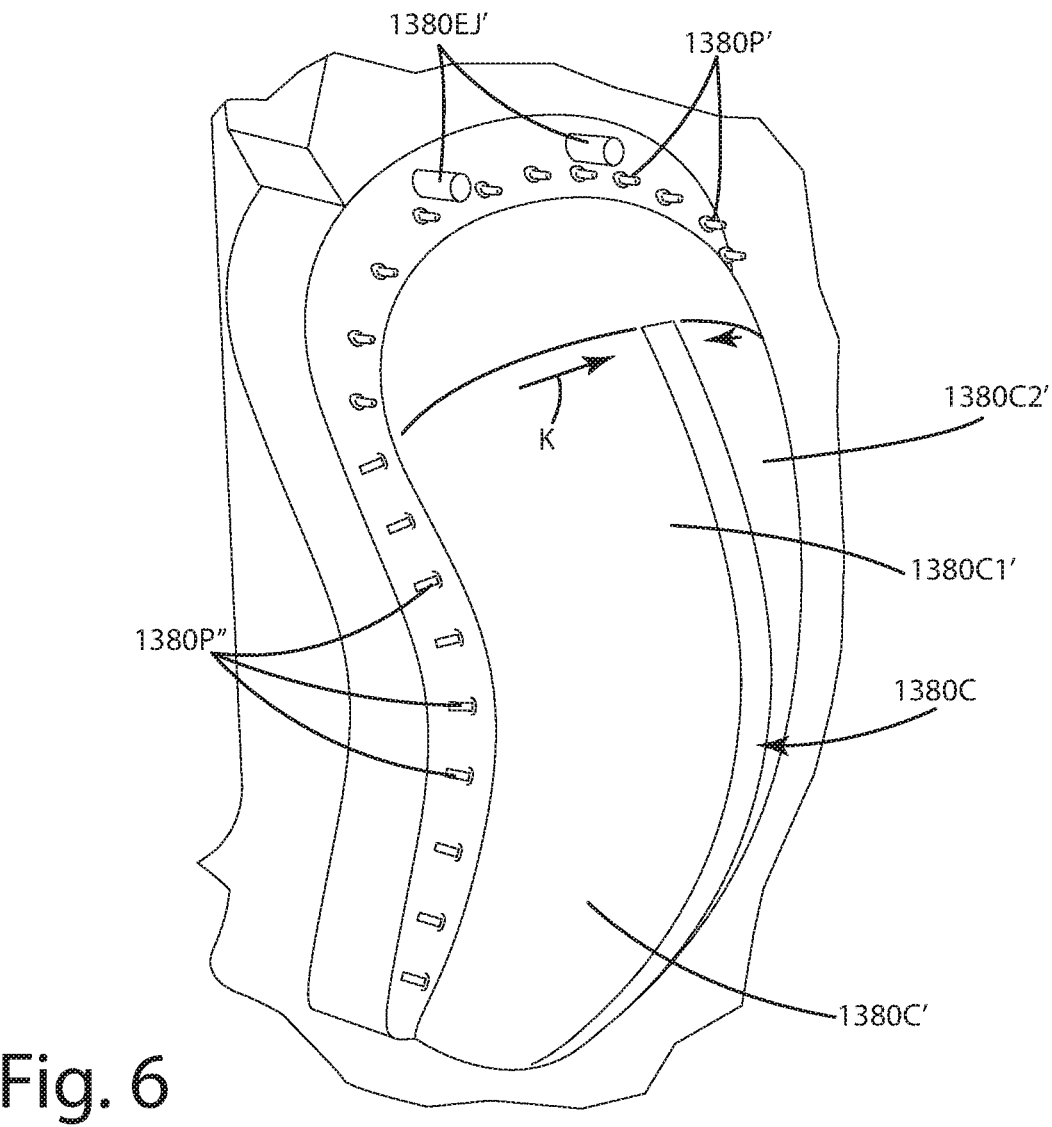
FIG. 6 is a perspective view of an alternative mold including ejectors of the current embodiment.
Figure 7:
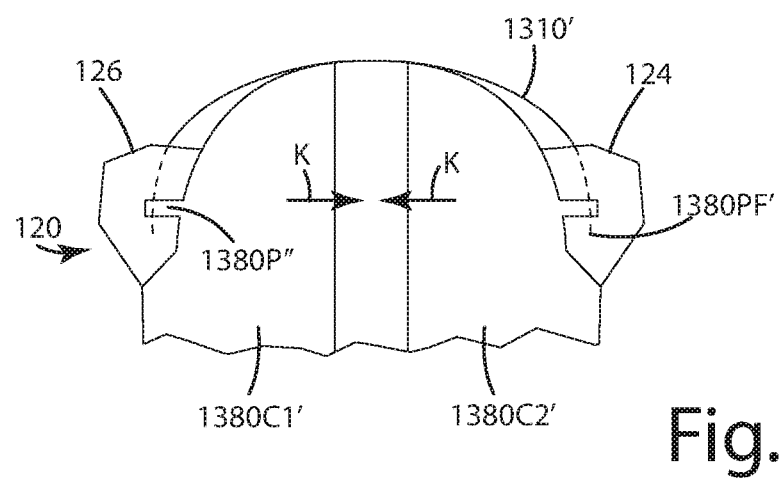
FIG. 7 is a section view of the alternative mold after a lacrosse head is molded over a perimeter flange of the lacrosse pocket of the current embodiment.

Optionally, the mold can include different mechanisms to move the locator pins and/or eject a molded lacrosse head. For example, as shown in FIGS. 6-7, the mold portion 1380C' can be bisected into corresponding left and right portions 1380C1' and 1380C2'. Each of these portions can include locator pins 1380P''', which are oriented to hold the perimeter flange 1380PF' during the molding process. The mold portions 1380C1' and 1380C2' are movable in the direction of the arrows K selecting toward and away from one another. The pins 1380P' can be immovable relative to the mold portions. When the mold portions move in direction K toward one another after the molding process, the pins 1380P' withdraw from the formed sidewalls 124 and 126. Thus the cured head can be easily removed from the mold. Further optionally, the mold can be outfitted with ejectors 1380ES'. These ejectors can push on the scoop of the head after it is formed to assist in popping the completed lacrosse head and pocket off the mold. Of course, these ejectors can be configured to engage other parts of the head and/or pocket to assist in the ejection from the mold.

As shown in FIG. 5, the perimeter flange 1310PF can be held a preselected distance D10 away from the outwardly facing cavity surface 1380CS. The perimeter flange also can be held a similar or different distance away from an opposing cavity surface on the opposite side of the cavity. The distance D10 can be selected so that the perimeter flange 1310PF is not visible through the respective overmolded components of the lacrosse head. For example, the distance D10 can be optionally at least 1.0 mm, further optionally at least 2.0 mm, even further optionally at least 4 mm, and even further optionally at least 5 mm. The distance D10 from which the respective perimeter flange, first and second surfaces are held from adjacent cavity surfaces can also vary. For example, the first surface 1310FS can be held 2 mm from the cavity surface 1380CS, while the second surface 1310SS can be held 3 mm from an opposing cavity surface. Other distances can be selected depending on the particular application.

Further optionally, the locator pins 1380P and/or convex bulging surface 1380CBS can be used individually or in combination to apply a tension T shown in FIG. 5 to the pocket 1310. For example, when the perimeter flange 1310PF is joined with the locator pins 1380P, the main body 1310B of the pocket 1310 can stretch, thereby acquiring a tension T within it in the stretched state. This tension T can be exerted in the pocket so that when the components of the lacrosse head are joined with a perimeter flange and the lacrosse pocket in general, the pocket maintains a desired tension, or some degree of that desired tension, thereby retaining its intended contoured three-dimensional shape. Of course, in some embodiments, it may not be desired to include a tension in the pocket during the molding process. In such cases, the concave bulging surface can be reduced in size, or the pocket can be sized larger so that the pocket does not stretch under tension in a portion of the mold.

Even further optionally, the tension T applied to the lacrosse pocket can vary across the pocket. As an example, tension can be applied to a first portion of lacrosse pocket while at least partially maintaining the predefined three-dimensional concave shape in a second portion of the lacrosse pocket so that the entire lacrosse pocket does not become entirely planar. One example of this is illustrated in FIG. 4. There, the pocket can be under a first tension T in the location of the middle pocket MP4. The pocket can also be under a second, different tension T2 near the scoop, shooting strings or upper edge 1310U of the pocket. That tension T2 can be greater than the tension T. In such a case, the tension T2 can form the pocket near the upper edge, scoop and/or shooting strings in a more planar or convex configuration than the remainder of the pocket. Likewise the relatively lower tension T in the middle pocket portion MP4 does not unduly distort or modify the three-dimensional concave contour of the pocket in that region, nor the associated lateral and longitudinal curvature.

As shown in FIGS. 3-5, during the mold process, a material 1380M, optionally in a molten, fluid and/or liquid state, is injected under pressure into the mold cavity 1380FV, also referred to as a head frame cavity. Of course, molding techniques other than injection molding can be used, such as pour molding or casting. The molten material permeates throughout the cavity and fills each of its component cavities, for example the scoop mold cavity, the base mold cavity and the sidewall mold cavities. As it flows through these cavities, the material also comes into intimate contact with respective edges of the pocket, and/or the perimeter flange that are disposed within the mold cavity 1380FC, and optionally simultaneously disposed in the different component cavities. As mentioned above, one or more of these edges and/or the perimeter flange can form the outer perimeter of the pocket. If desired, all of the edges can collectively form a continuous perimeter flange or outer perimeter 1310PF that extends around the lacrosse pocket body. The perimeter flange optionally can be at least 2.0 mm, or at least 2.5 mm wide or wider. The perimeter flange 1310PF can be the portion of the lacrosse pocket 1310 that is over molded by at least a portion of the lacrosse head in joining the lacrosse pocket 1310 to the lacrosse head 20. Where the perimeter flange is at least the width mentioned above, it has been discovered that there is enough structure of the pocket to satisfactorily embed and securely join the pocket body with the portion of the head into which the perimeter flange is molded. With widths of the perimeter flange that are significantly less than those mentioned above, it is possible that without extra reinforcement or the use of special materials, the perimeter flange and pocket can rip or tear out from the overmolded polymeric material from which the head is constructed. This can be due to not enough pocket being satisfactorily anchored within the overmolded head material.

When the material contacts the respective edges and/or generally the perimeter flange disposed in the cavity 1380FC, the material, optionally under pressure, encapsulates the individual strands, coating their surfaces on front and back. The material also can extend from a front or first surface 1310FS of the perimeter flange that faces generally toward the pocket longitudinal axis LA, to a second surface 1310SS or outside of the perimeter flange that faces generally away from the pocket longitudinal axis. In many cases, the material also permeates through small spaces between the individual strands, connecting the injected material from one side of the flange or edge to the other. This, in turn, embeds the material within the edges and/or perimeter flange. Where the strands are knitted within the perimeter flange, those strands are typically interlooped with one another, or a single strand is interlooped with itself, in multiple columns. In these cases, the strand or strands form one or more loops in the perimeter flange. The molten or liquid material can permeate through and/or flow through the openings at the interlooped portions of the strand(s), in some cases impregnating the strands and/or spaces between the strands with the material in the perimeter flange. Optionally, the pocket is placed within the mold so that the molten material or liquid material is prevented from entering openings adjacent the perimeter flange, for example openings 1353O in FIG. 3. This can be accomplished simply by not positioning those openings within the respective mold cavities. Accordingly, these larger openings, which can contribute to the functionality of the middle pocket or other components of the pocket, are not filled with the molten or liquid material.

As shown in FIG. 3, after the injected material cures to form the sidewall portion 26, it embeds within and extends through the openings 1316O of the portion of the edge that was within the mold. Again, these openings can be formed between adjacent interweaved strands, or between loops formed from one or more continuous strands in a knit pattern. The material also can encapsulate one or more of the plurality of individual strands 1316S, surrounding or circumferentiating each substantially entirely so that all outer surfaces of the strand are within the molten material. With the above embedding, the edge 1360 is sufficiently trapped and molded within the sidewall to hold it in place under the rigors of use during a lacrosse activity.

As mentioned above, all or a portion of the respective edges and/or perimeter flange can be constructed from a first material, such as an aromatic polyamide and/or an ultra-high molecular weight polyethylene. These strands of this first material can be included in a first portion 1316P1 of the edge 1316. The edge 1316 can also include a second portion 1316P2, which can be constructed from a plurality of strands constructed from a second material, such as a thermoplastic polymer, or some other material different from the first material. This second portion 1316P2 can be joined with the pattern 1350, which is also constructed from a plurality of strands of the second material. Within the edge, more of the plurality of the strands constructed from the first material are embedded and encapsulated or otherwise over molded by the portion of the lacrosse head, for example, the sidewalls, scoop and/or base or ball stop.

Optionally, only the portion of the edges and the pocket constructed from the first material can be embedded in and encapsulated by the respective lacrosse head portion. If desired, a majority of the plurality of first strands incorporated into the lacrosse pocket can be embedded within the lacrosse head. Similarly, a minority of the plurality of strands constructed from the second material can be free from, and generally not encapsulated by or embedded within the portions of the lacrosse head. Further optionally, either a majority (greater than 50%) or a minority (less than 50%) of the width of the edge or perimeter can be embedded within the lacrosse head.

Further optionally, with the embedding of the edge 1316 and/or other portions of a perimeter flange 1310PF, such as the opposing side edge and/or upper or lower edges, the majority of that edge or perimeter flange can be concealed within the lacrosse head and not visible to a user. In some cases, the respective first and second materials can be so disposed in the edge that when the edge is placed within the mold 1380, the first material and associated knit structure is placed within the mold cavity, but the second material and associated second knit pattern is not placed in the mold cavity 1380FC. Further, one particular knit pattern or knit structure of the edge may be placed within the mold cavity, but a second knit pattern of the edge, or some other component such as the middle pocket, shooting ramp and/or shooting ramp flanks, is not disposed in the mold cavity. Even further optionally, more of a plurality of the first strands than the plurality of second strands can be placed in the mold 1380 and in particular the mold cavity 1380FC during the molding steps.

Yet further optionally, the thickness T6 of head material disposed over the perimeter flange can be varied to provide different aesthetic effects, as shown in FIG. 3. As an example, where it is desired to show a consumer that the perimeter flange is indeed embedded and encapsulated within the lacrosse head material, the thickness T6 of the molten and cured head material over the perimeter flange can be reduced to 0.1 mm to less than 0.7 mm, or some others thickness sufficient to allow the perimeter flange to visually show through the surrounding head material, generally in a somewhat translucent manner. On the other hand, in some cases the perimeter flange can be concealed within the material from which the head is constructed. In this case, the thickness T6 of the head material over the perimeter flange can be at least 0.5 mm, optionally 1.5 mm to 4.5 mm, and further optionally greater than 6 mm, on both the front and back sides of the perimeter flange. Sometimes, the thickness of the head material disposed over the perimeter flange can differ on the front and back sides thereof. As an example, in the scoop, the head material on the front, facing the interior of the pocket, can be of a thickness that is less than the thickness of the same had material on the back side of the perimeter flange. This can provide enhanced abrasion resistance on the back side and/or can provide a smoother transition from the pocket to the scoop when a lacrosse ball exits the head.

The edge width SW3 of the edge 1360 can be precisely selected so that the first portion 1316P1 of the edge 1316 is over molded and encapsulated by or embedded within the portion of the lacrosse head. The edge width SW3 also can be selected so that a small portion 1316P2 extends downwardly from the portion of the molded over lacrosse head and connects to the remainder of the lacrosse pocket 1310. In other constructions, the edges or in general the perimeter flange can be constructed in such a manner that a major portion (more than half) of the width SW3 of the edge or perimeter flange is embedded within the material from which the lacrosse head is constructed. In yet other constructions, the edges, or in general the perimeter flange can be constructed in such a manner so that a minor portion (half or less) of the width SW3 of the edge or perimeter flange is embedded within the material. Optionally, where the perimeter flange is constructed from a material such as a an aromatic polyamide, or other less elastic material, it can be yellow, having a wavelength of 570 nm to 590 nm. Further, this yellow material can project downward from the bottom of the scoop, sidewalls and/or base of the cured lacrosse head a preselected distance. With the material projecting from the bottom of the head, a user can visibly confirm the less elastic material, for example, the aromatic polyamide, is included in the head and pocket. On the other hand, in some cases such yellow material can highlight molding imperfections, particularly where a portion of the perimeter flange becomes trapped and formed in or adjacent an exterior surface of a molded Lacrosse head. Sometimes, to avoid this show through of the yellow aromatic polyamide material, a linear polyamide, such as polyamide 6,6, can be used to construct the perimeter flange in any of the respective edges.

As mentioned above, FIG. 3 illustrates the overall edge width SW3 of the perimeter flange 1310PF and/or an associated edge of the lacrosse pocket body 1310. This edge width SW3, however is the actual width of the perimeter flange or edge when the lacrosse pocket body 1310 is in an unloaded state. Typically the unloaded state is achieved when a lacrosse ball is absent from the pocket. In some cases however, when the ball is in the lacrosse pocket body but not exerting any forces on the lacrosse pocket body, that lacrosse pocket body still can be considered in an unloaded state. The edge width SW3 can be dynamically alterable depending on whether the pocket body is in a loaded state or an unloaded state. For example, the perimeter flange 1310PF can be constructed from a first material, such as a polyamide, and in particular the polyamide 6,6 as described above. More particularly, the perimeter flange and/or edge can include polyamide 6,6 in the form of a first yarn having multiple first twisted filaments as described above. This type of perimeter flange, with the first yarn, is configured to stretch, widen and/or elongate so that the edge with SW3 increases to an edge width SW4 when the lacrosse pocket body 1310 is in a loaded state. This loaded state can be achieved when the lacrosse ball LB shown in broken lines exerts a force F4 on the lacrosse pocket body 1310. In turn, this causes all of the joined strands of the lacrosse pocket body to react. The forces ultimately transfer through to the perimeter flange 1310PF which connects the remainder of the lacrosse pocket body to the lacrosse head. As a result of that force transfer, and the stretchable, elastic properties of the material of the strands and yarn in the perimeter flange 1310PF, that perimeter flange is able to stretch and increase in width from SW3 to SW4. In cases where the portion 1316P1 of the perimeter flange 1310PF is located within and molded over by the lacrosse head portion, that portion 1316P1 may remain at a static width, that is, the portion does not change in width because it is trapped in the polymeric material of the lacrosse head. In contrast however the second portion 1316P2 of the perimeter flange 1310PF can change its width from SW5 to SW6. Thus, part of the perimeter flange can remain a constant width, while the remainder of the perimeter flange below the head can vary in width such that the total edge width SW3 increases to a second width SW4. The difference between the edge width SW3 in the unloaded state and the edge width SW4 in the loaded state can be a distance SW7. This distance can be a proportion of the edge with SW3.

It is been discovered that the edge width of a perimeter flange, constructed from the first material, for example, polyamide 6, 6, can increase upon loading to a loaded state an amount that is suitable to provide dampening to the remainder of the lacrosse pocket body when the ball exerts the force on the lacrosse pocket body. In turn, the ball can be less likely to be deflected out of the pocket upon catching. The pocket also is provided with more elasticity so that an apex of the pocket can move away from the lowermost portions of the sidewalls, thereby giving the pocket a deeper feel to a player when the pocket is loaded with a ball. This extra elasticity in the perimeter flange also can eliminate excessive noise upon entry and/or exit of the lacrosse ball from the pocket.

To provide this dynamic edge width, the perimeter flange can be formed with the first material and a respective first yarn so that the perimeter flange stretches or elongates in a manner to increase the edge width, when transitioning from an unloaded state to a loaded state (or a more loaded state), optionally by at least 1%, at least 2.5%, at least 5%, at least 10%, at least 15%, 5% to 25%, 5% to 15% and/or 1% to 25%. Of course, other percentages of the increase in edge width can be selected. The foregoing percentages however have been found to provide good dampening for the lacrosse pocket body, without increasing the springiness or bounciness of the lacrosse pocket body, which could lead to the lacrosse ball being inadvertently ejected from the lacrosse pocket. It is to be noted that in transitioning from the loaded state to an unloaded state, the edge width can decrease by corresponding percentages.

After the material introduced into the mold cavity is allowed to cure, the lacrosse head and its components, for example the scoop, sidewalls and base as well as a throat, are fully formed. The mold portions 1380A and 1380B can be moved in direction N, generally away from the mold portion 1380C as shown in FIGS. 4-5. Any locator pins 1380P also can be withdrawn into the mold portion 1380C. Thereafter, the molded head and now integral pocket can be removed from the mold 1380.

After molding, the edge 1316, perimeter flange or outer pocket perimeter in general, of the lacrosse pocket 1310 are overmolded, and completely encapsulated by and concealed within the respective portions of the lacrosse head 20. The edge, perimeter flange or outer pocket perimeter project downwardly from the lowermost portion of the lacrosse head, without any other lacrosse head structure or component extending below the edge, perimeter flange or outer pocket perimeter. As an example, there optionally is no other structure under the edge or perimeter flange to secure or clamp the pocket to the head.

Generally, upon removal, the pocket is inextricably joined with the lacrosse head, and cannot be removed without damaging or destroying either the pocket and/or the head. Of course, in some other constructions, special removal mechanisms can enable nondestructive removal of the pocket from the head. With this construction, no part of the lacrosse pocket 1310 need be trimmed from the sidewall, scoop, base or other component of the lacrosse head when the lacrosse pocket and components of the lacrosse head are removed from the mold 1380. This can provide a clean appearing product, which need not be further manually or mechanically manipulated to trim off unsightly extra material of the pocket or otherwise modify the lacrosse head.

A first alternative embodiment of a lacrosse pocket is illustrated in FIGS. 17-20 and generally designated 1410. The pocket shown there is similar in structure, function and operation to the embodiments described above, for example, the current embodiment, with several exceptions. To begin, the first alternative embodiment 1410 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 1.0 mm, greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material.

Incidentally, large diameter or dimension (greater than 1.0 mm, greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

The pocket 1410 can include all the features and functions of the current embodiment pocket 1310 as well. In addition, the pocket can be integrally molded to a lacrosse head 120, where the head and pocket have the same structural and functional characteristics as those of the head and pocket in the current embodiment above. In addition, the head and pocket can be integrally combined and/or formed using the same structure or methods as described above in connection with the current embodiment, or any other embodiments herein for that matter.

Figure 52:
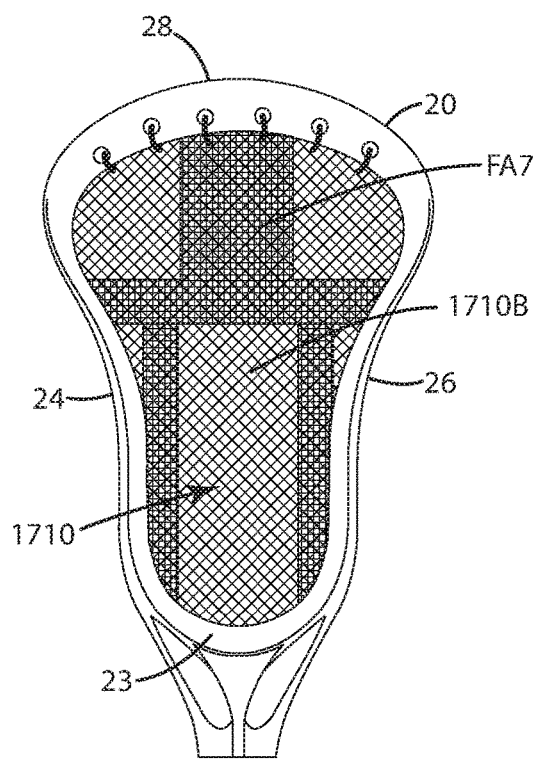
FIG. 52 is a front view of the lacrosse pocket of the fourth alternative embodiment having a fused "T" channel pocket area.

In this first embodiment, however, the head 120, with its integrally molded pocket, can be further integrally molded with a lacrosse handle 190 as shown in FIG. 52. To produce this construction, during a molding process in which the material of the head to 120 encapsulates and overmolds a portion of the pocket 1410, the handle 190 also can be simultaneously molded, formed. Accordingly this embodiment provides a true one piece integral lacrosse stick including the head, pocket and handle, all as one unit. There are no laces or strings joining the pocket to the head, nor is there a screw or other fastener joining the head to the handle.

With this combination of features, a complete one-piece stick including an integral pocket can be repeatedly and consistently manufactured and provided to consumers. This contrasts the inconsistency that plagues conventional multi-component, pieced together lacrosse sticks. For example, there has been inconsistency between individual manually formed pockets, as well as the manual attachment of those manually formed pockets to respective heads. As a further example, there also has been inconsistency in the attachment of a head to a handle. In some cases, the head and handle combination might not be a perfect fit, which can lead to a weak or wobbly connection between the head and handle. In other cases, with a removable head and handle, the plastic in the throat of the head can stretch out or become deformed. This can be problematic where the head is secured to the handle at a junction via a fastener such as a screw, bolt or pin. Over time, the fastener attached head can loosen relative to the handle, eventually becoming unacceptably wobbly with play over time. With the present embodiment, all of the above inconsistencies and problems can be eliminated. The present embodiment also provides a unitary lacrosse stick that addresses many of the fatigue issues associated with previous head to handle fastener connections. The one piece integral stick including the head, handle and integral pocket of the current embodiment also can be engineered and manufactured in a repeatable manner.

Figure 18:
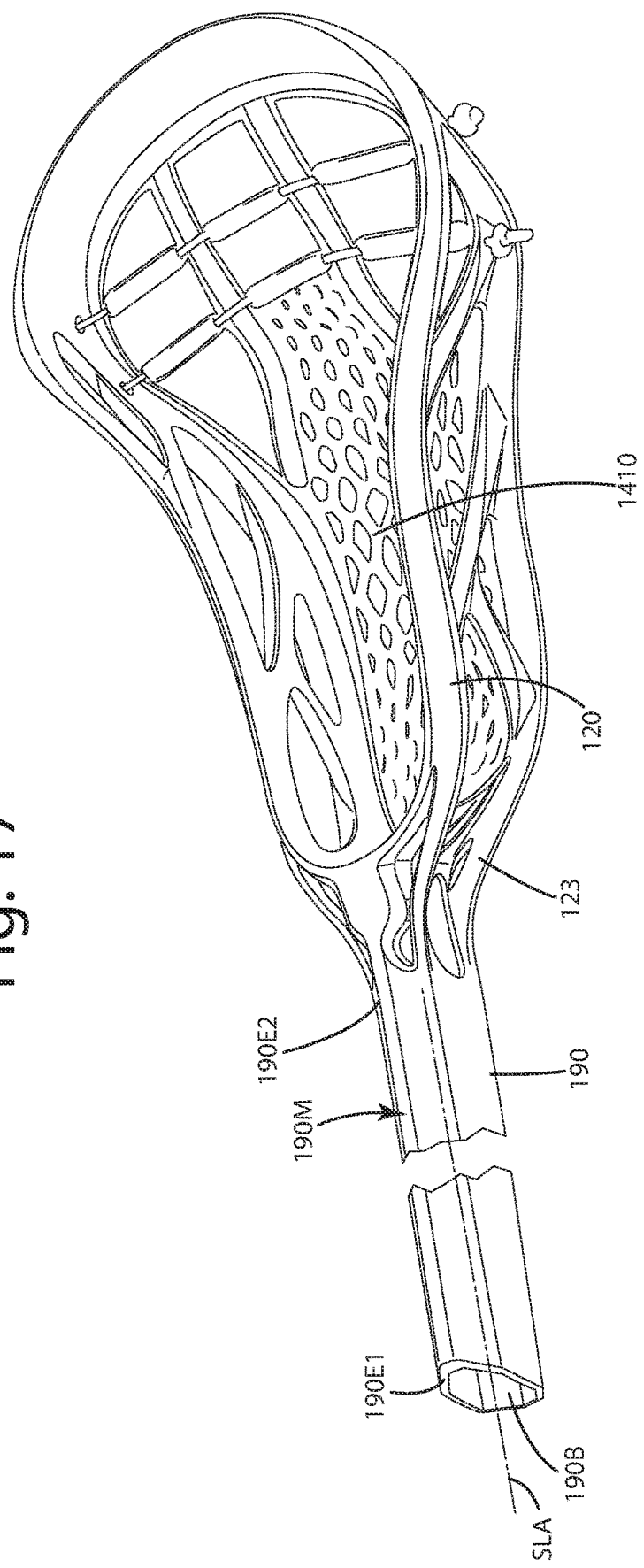
FIG. 18 is a perspective view of the lacrosse pocket of the first alternative embodiment integrally molded into a lacrosse head which is itself integrally molded with a lacrosse handle.

As shown in FIG. 18, the lacrosse handle 190 can be of a preselected cross sectional shape, such as an octagonal shape. Of course, in other constructions, the cross sectional shape can be circular, round, elliptical, polygonal or other shapes. The handle 190 can include a bore 190B. This bore can be of the same cross sectional shape as the exterior of the handle. This bore can also be specially formed during the molding process in which the head and handle are optionally simultaneously formed. The bore 190B can extend longitudinally along a shaft longitudinal axis SLA that extends from a first end 190E1 to a second end 190E2 of the shaft or handle 190. With this construction, the handle can generally be of a tubular configuration. In other optional constructions, the bore can be deleted, so that the handle is a solid continuous piece, without a bore on the interior. Further, if desired, the bore 190B can terminate at some location 190M between the first end 190E1 and second end 190E2. With such a construction, the handle between the termination portion 190M and the second end 190E2 can be solid. This can be helpful in some cases where it is desired to reduce flex or otherwise provide more rigidity near the base 123 of the head 120. Of course, the handle can be solid in other portions between the end 190E1 and the head 120, depending on the particular application.

Figure 17:
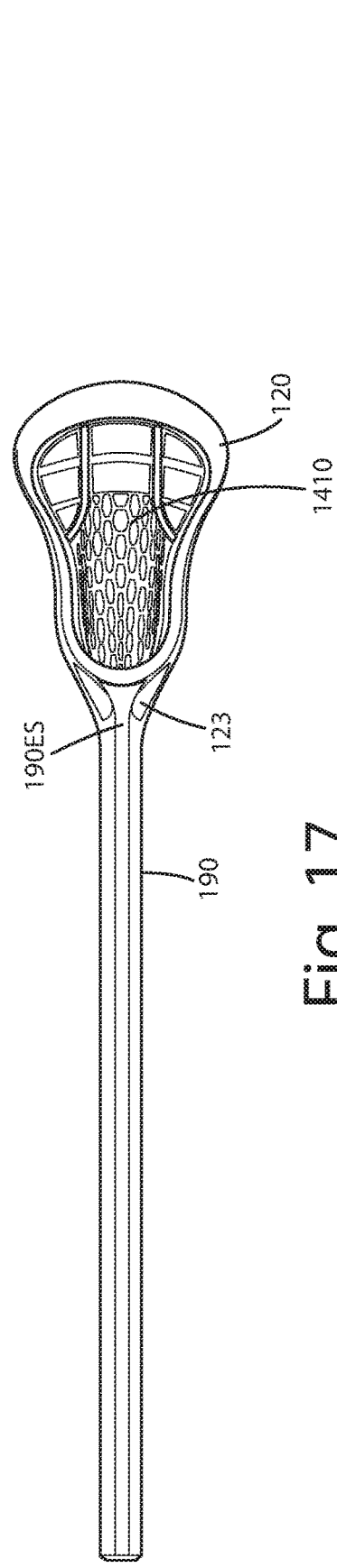
FIG. 17 is a front view of a lacrosse pocket of a first alternative embodiment integrally molded into a lacrosse head which is itself integrally molded with a lacrosse handle.

With reference to FIGS. 17-18, it can be seen that the end 190E2 of the handle 190 is integrally formed and joined with the lacrosse head 120, and particular its base 123. The base 123 and end 190E2 of the handle transition smoothly and cleanly to one another without any visible seams. Again this because material forming each of these components is intermixed and intermingled with one another during a molding process.

Figure 19:
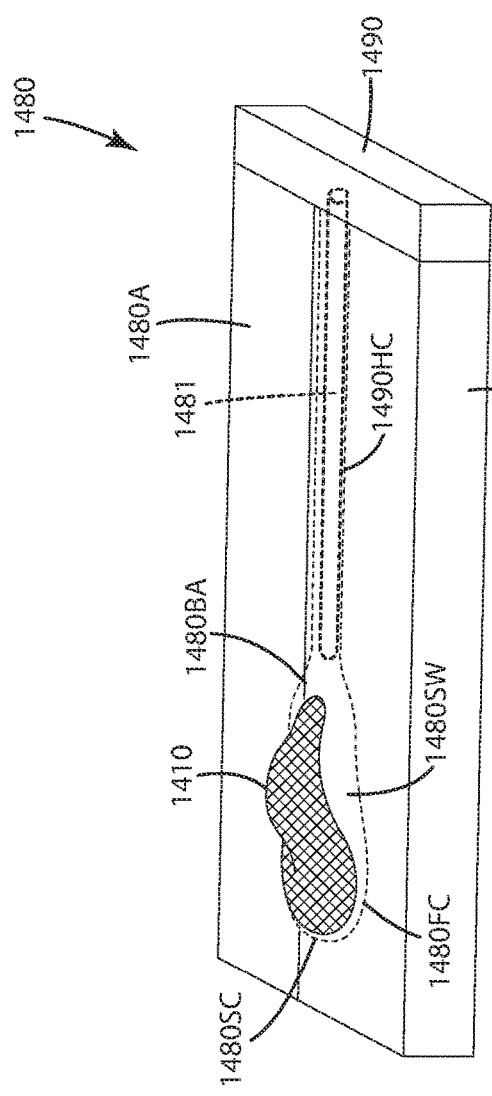
FIG. 19 is a perspective view of a mold used to integrally molded the lacrosse pocket of the first alternative embodiment into a lacrosse head and also to form a lacrosse handle integral with the lacrosse head.
Figure 20:
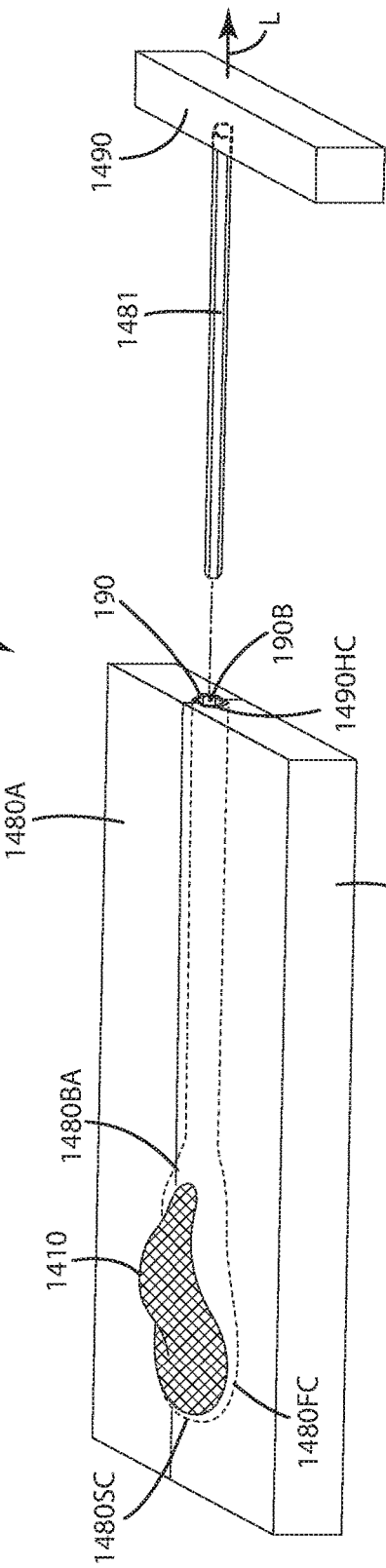
FIG. 20 is a perspective view of the mold showing a slide being removed from a bore of the molded handle.

The method of manufacturing the one-piece lacrosse stick including the integral lacrosse pocket, head and handle will now be described with reference to FIGS. 19-21. FIGS. 19 and 20 illustrate the mold 1480 that is used to construct the one-piece lacrosse stick. The mold can include opposing portions 1480A and 1480B. These respective portions can collectively define a head mold cavity 1480FC, which can include a base mold cavity 1480BA, a scoop mold cavity 1480SC and sidewall mold cavities 1480SW. These cavities and the head mold cavity can be substantially identical to the mold in the current embodiment described above. In addition, however the mold 1480 can include a handle mold cavity 1480HC in fluid communication with a head cavity 1480FC, and in particular the base mold cavity 1480BA. With this fluid communication, any molten material or liquid in the head cavity and handle mold cavity can intermingle and intermix with one another to some extent during a molding process.

As illustrated in FIGS. 19 and 20 the mold 1480 also can include a secondary handle slide 1490. This handle slide 1490 can include a bore producing extension 1481. This bore producing extension is typically in place within the handle cavity while the handle cavity 1490HC is filled with a molten material or liquid to form the handle 190. Thus, the bore producing extension 1481 can form the bore 190B in the handle. The length of the extension 1481 can be varied depending on the desired length of the bore in relation to the first end 190E1 and second end 190E2 of the handle. The exterior surfaces of the extension 1481 also can be modified depending on the desired cross section of the bore. Alternatively, a bore can be produced using a gas assist technique in which gas is introduced into molten material in the handle cavity to form the bore 190B. Of course, if no bore is desired in the handle, the handle slide 1490 can be deleted from the mold 1480.

Figure 21:
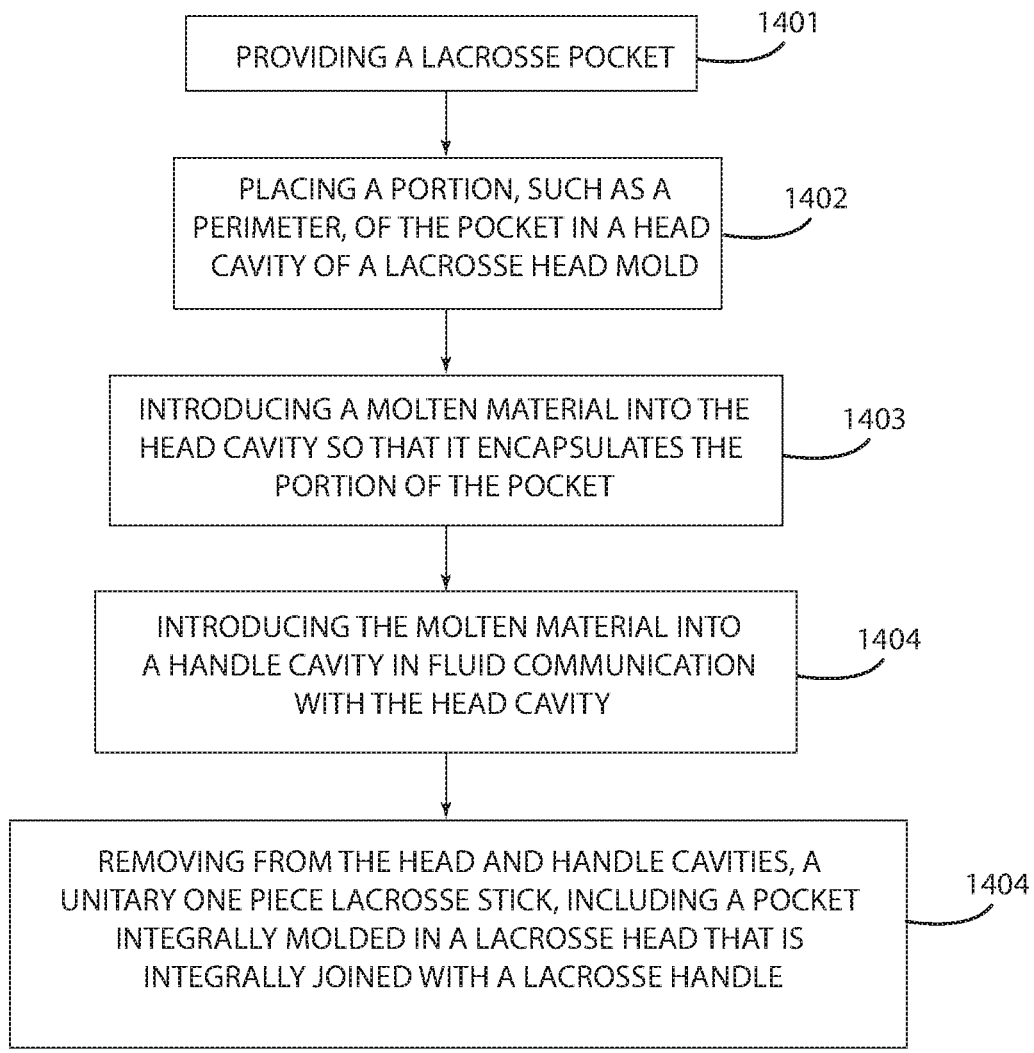
FIG. 21 is a flow diagram showing an exemplary method of manufacturing a unitary one piece lacrosse stick including a lacrosse pocket the first alternative embodiment.

The method of manufacturing the one-piece lacrosse stick can begin with step 1401 in FIG. 21 of providing a lacrosse pocket 1410, of the type described in any of the embodiments described above, for example, the pocket 1310 in the current embodiment. As with that embodiment, the outer perimeter, edge or perimeter flange of the pocket 1410 is placed within the respective mold cavities 1480SC, 1480BA and 1480SW, as shown in step 1402. Again these mold cavities make up the head cavity 1480FC. This head cavity is in fluid communication with the handle cavity 1490HC. If the handle is desired to define a bore, the bore producing extension 1481 is placed within the handle cavity 1490HC.

In step 1403, a molten material or liquid is introduced into the head cavity 1480FC so that it encapsulates a portion of the pocket 1410 as described in connection with the current embodiment above. Molten material is also introduced into the handle cavity 1490HC in step 1404, which can be simultaneous with step 1403. Because the handle cavity and head cavity are in fluid communication with one another, the molten material or and/or liquid forming the head and forming the handle can intermingle and/or intermix. Optionally, in some cases, different molten materials can be introduced into the head cavity versus the handle cavity. This can be helpful where different properties are desired of each of these components. Indeed, multiple different molten or liquid materials can be introduced into the mold cavities, depending on the particular performance characteristics of the one-piece lacrosse stick.

Where the bore producing extension 1481 is included in the handle cavity, it can effectively form the bore 190B in the handle during the introducing step 1404. After the molten material or liquid has sufficient time to cure, the mold 1480 can be opened. For example, the bore forming extension 1481 can be withdrawn from the handle cavity 1490HC in direction L as shown in FIG. 20. At this point, the bore 190B is effectively formed in the handle 190. The mold portions 1480A and 1480 B can be separated. In step 1404, the unitary one-piece lacrosse stick including a pocket integrally molded in the lacrosse head, which is itself integrally molded to the lacrosse handle 190, can be removed from the head and mold cavities.

Figure 22:
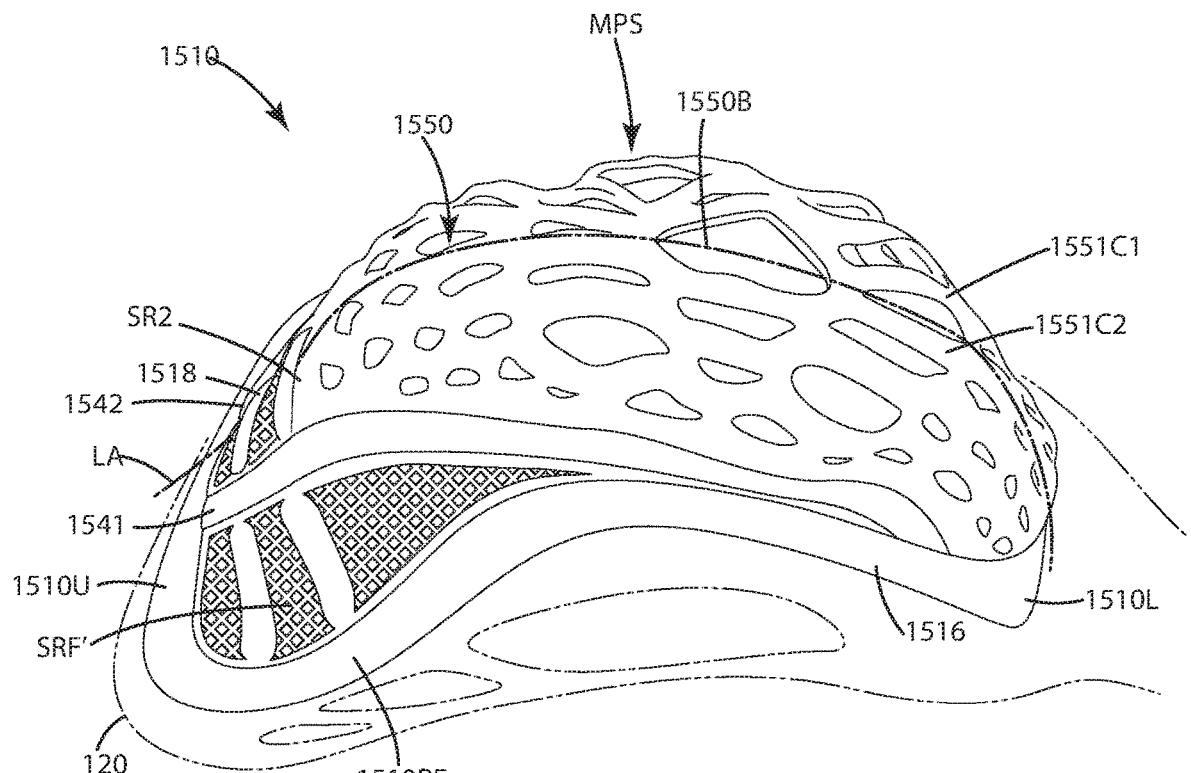
FIG. 22 is a perspective view of a lacrosse pocket manufactured according to a second alternative embodiment.
Figure 23:
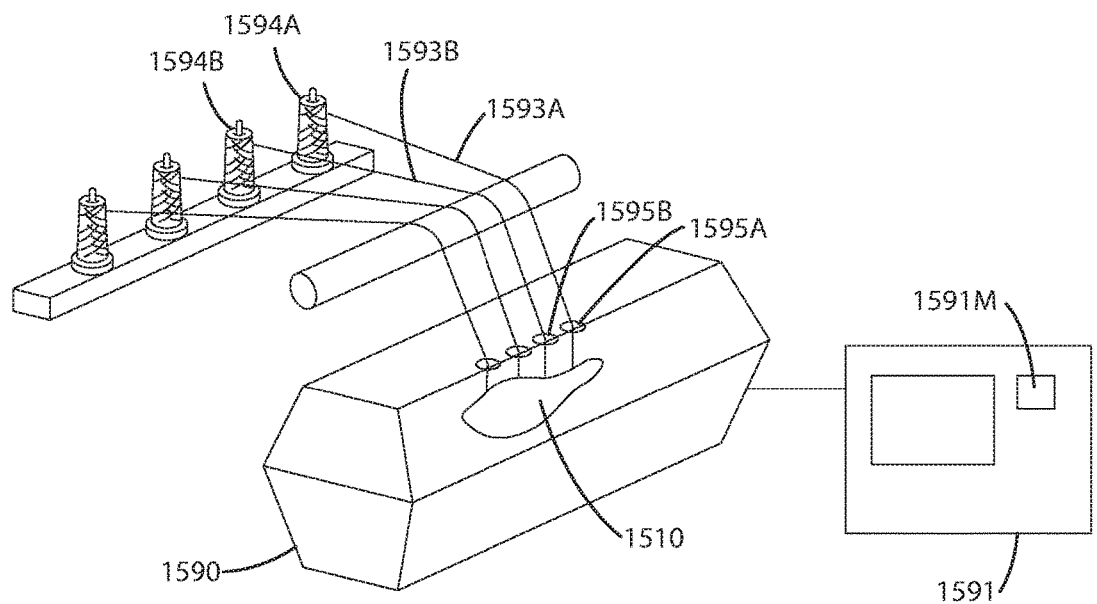
FIG. 23 is a perspective view of an automated lacrosse pocket assembly machine used to manufacture the lacrosse pocket of the second alternative embodiment.

A second alternative embodiment of a lacrosse pocket is illustrated in FIGS. 22-23 and generally designated 1510. The pocket shown there is similar in structure, function and operation to the embodiments described above, for example, the current embodiment, with several exceptions. To begin, the second alternative embodiment 1510 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material. Large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 2.0 mm and/or 3.0 mm) laces, webs, runners and thongs.

The pocket 1510 can include all the features and functionality of the current embodiment pocket 1310 as well. In addition, the pocket can be integrally molded to a lacrosse head 120 (shown in broken lines), where the head and pocket have the same structural and functional characteristics as those of the head and pocket in the current embodiment above. In addition, the head and pocket can be integrally combined and/or formed using the same structure and methods as described above in connection with the current embodiment, or any other embodiments.

In this second embodiment, however, a particular method of manufacturing a lacrosse pocket, for example, that of the current embodiment, that is integral with a lacrosse head is provided. In general, to perform the method, an automated pocket assembly machine is used to produce the lacrosse pocket from certain data that pertains to the pocket. A mold is used to join the produced lacrosse pocket with a lacrosse head by over molding portions of the lacrosse head over corresponding portions of the lacrosse pocket.

The method can provide an automatic pocket and head manufacturing method where a manufacturer can replicate pocket features, such as the location of the apex of the pocket, curvature of a ball channel shooting ramp and/or shooting strings, and the like, in a repeatable fashion, from one pocket to the next. This can provide previously unheard of consistency from one lacrosse pocket to another because the manual manipulation and connection of the pocket to the head is eliminated. With the method, there is no longer any need to manually lace a pocket to a head. Further, because the pocket is produced on an automated assembly machine, its features are precisely reproduced with each and every copy of the pocket output from the machine.

In addition, with conventional manufacturing processes, it is virtually impossible to create a performance pocket having an apex where the ball will naturally come to rest in a precise location that does not start to change after a player catches or shoots a ball several times. Current hand strung materials stretch and change as they are stressed in the activities of catching, throwing and shooting a lacrosse ball. It also is virtually impossible to produce a hand strung pocket with repeatable performance because as the pocket changes, the performance of it changes as well. With the current embodiments, it is possible to repeatedly and consistently manufacture a performance pocket having an apex, ball channel and/or shooting ramp curvature and other features in precise, predefined locations therein, where the pocket will last exponentially longer than conventional pockets, and will provide repeatable performance multiple times.

As mentioned in the embodiments above, the lacrosse pocket can be constructed from a unitary textile material on an automated pocket assembly machine. Generally, the pocket is formed completely via a mechanized manipulation of a plurality of strands, without any direct human manipulation of the strands during the method of the strands to incorporate them into the pocket. The mechanized manipulation can be via knitting and/or weaving for example on a machine. Although described herein in connection with a knitting process on a knitting machine, it will be appreciated that the pocket can be weaved on a weaving machine using a weaving process. Thus, all the steps, configurations, structures and operations applied to knitting herein apply by analogy to weaving; and any description of the knitting process can be applied equally by analogy to the weaving process.

The knitting process can be any of a variety of different knitting processes, for example circular knitting, tubular knitting, flat knitting, sweater knitting, Jacquard knitting, Intarsia knitting, weft knitting, warp knitting and other types of knitting. When a weaving process is utilized, the process can be any one of multiple weaving processes, including processes that construct a leno weave, a twill weave, a hatch weave, a slit weave, a plain weave, a baskets weave, a Jacquard weave, a Rib weave and an Oxford weave or other types of weaves.

The knitting machine can be any type of sophisticated knitting machine, such as the knitting machines described herein. The knitting machine can mechanically manipulate a plurality of flexible, elongated strands of the unitary textile pocket and/or pocket body during a knitting process to form the pocket 1510, and all its components and features, such as those explained above in connection with the current embodiment, which apply equally to this embodiment. As noted above, the automated machine can perform a tubular knitting process in which multiple tubular elements are knitted and joined to form the various components and structure of the pocket. If desired, the tubular knitting process can also implement a weft knitting technique.

The three dimensional shape of the pocket can include a concave shape disposed or located generally within the middle pocket and/or shooting ramp. The three dimensional shape also can encompass substantially planar and/or convex regions of the pocket, for example in the shooting ramp and/or shooting ramp flanks, which optionally does not include knitted tubular elements. The machine itself can be configured to interloop a plurality of first strands with a plurality of second strands, and any number of additional strands, so as to form that predefined, three dimensional shape in the pocket and/or pocket body. The machine also can mechanically manipulate other strands, or optionally the same strands, but different portions thereof, of the unitary textile material with a knitting machine during the knitting process to form the above mentioned predefined generally flat planar shapes in the pocket body and/or predefined three dimensional convex shapes in the pocket body. The latter shapes can correspond generally with the shooting ramp flanks SRF1, SRF2, the respective edges 1510U, 1510L, 1514 and/or 1516, perimeter flange, or outer perimeter 1510PF, or other portions of the pocket 1510 shown in FIG. 22.

During the knitting process, the knitting machine knits a unitary textile pocket and body so as to form the respective components of the pocket and pocket body. In doing so, the knitting machine shown in FIG. 23 draws a plurality of different strands 1593A, 1593B off of respective cones or spools 1594A and 1594B. Optionally, these strands can be constructed from different materials, for example materials having different elasticities or different mechanical properties as explained above in connection with first and second materials of the current embodiment. These strands are fed to respective needles and/or armatures 1595A, 15956 which perform the knitting operation to form the components of the pocket 1510. The needles and/or armatures can be driven by the machine and/or controller. Generally, the lacrosse pocket data from the controller can be transformed, translated or otherwise converted by the automated pocket assuming machine to a plurality of signals. The signals can be transmitted to or otherwise control the needle and/or armature to direct the needle and/or armature to perform their automated movements to selectively incorporate the respective strands within the lacrosse pocket at predefined locations in a predefined pattern.

As an example, the signals can direct the needles and/or armature to either interloop and/or weave one strand with another during the mechanical manipulation by the machine. As a more particular example, the knitting machine knits the upper edge 1510U, the first and second sidewall edges 1516, the lower edge 1510L, the shooting ramp SR2, the middle pocket MP5, the bullseye opening 1550B, the runners 1541, 1542 and the shooting ramp flanks SRF' which have their respective predefined shapes and associated knitting patterns. All of these different knitted components of the pocket body are contiguous and continuous with one another, being formed from the plurality of strands that make up the unitary textile material. Indeed, many of the individual strands can span the length of the pocket, back and forth in rows of each of the components, from the upper edge 1510U to the lower edge 1510L, and can be interlooped in specific regions of the pocket, thereby forming and becoming integrated with the different knit patterns of the pocket.

As one example, a knitting machine can interloop a first strand with a second strand near the lower edge 1510L. The first strand can continue in a plurality of rows into a vertical element 151C1 through the middle pocket MP5 and shooting ramp SR2. In the shooting ramp SR2, that strand can be interlooped with additional strands within the knit pattern 1550. The same strand can extend into and be interlooped with yet other strands in the knit pattern 1518. The strand can extend and be further interlooped with yet other strands in the upper edge 1510U of the lacrosse pocket. As will be appreciated, all of the same structures described above in connection with the other embodiments, for example the current embodiment above, can be formed with similar knitting or mechanical manipulation techniques.

As shown in FIG. 23, further optionally, the knitting or weaving machine, or other automated pocket assembly machine 1590, can be controlled by a controller 1591 to produce the pocket 1510. The controller can be any conventional processor, computer or other computing device. The controller can be electrically coupled to the machine, and can be in communication with a memory 1591M, a data storage module, a network, a server, a cloud or other construct, all of which are considered a memory herein. The memory can store and/or transfer lacrosse pocket data in various forms to or from the automated pocket assembly machine. Although shown as separate elements, the controller and machine can be integrated into one component.

The lacrosse pocket data can be a particular type of data pertaining to one or more lacrosse pockets and/or portions of lacrosse pockets. For example, the lacrosse pocket data can be data pertaining to one or more particular knitting patterns or stitches, weaving patterns or stitches, or other patterns or stiches associated with and/or incorporated into the lacrosse pocket. As one example, the lacrosse pocket data can be data that relates to the combination of particular knitting patterns used to construct different portions of a lacrosse pocket. As a more particular example, the data can be the precise location and type of knitting structure in a particular location of the pocket. While the data may not reflect or readily translate to a particular lacrosse pocket structure, such as an apex of the pocket, a bullseye opening, an outer perimeter or perimeter flange, pocket openings, shooting flanks, runners or the like, the fact that those components can be produced with the data means that the data pertains to those features and structures, or others, depending on the application.

The lacrosse pocket data can be implemented, accessed and/or utilized, all generally referred to as utilized herein, by the automated assembly machine, whether in the form of a code or a program or other directive. The lacrosse pocket data, when utilized to form the pocket with the assembly machine, ultimately can generate in the pocket, certain features (and therefore, the data pertains to those features), such as: the predefined three-dimensional shape; the position, dimension, curvature and/or depth of a middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like.

The controller can access the lacrosse pocket data to thereby control the automated pocket assembly machine and produce one or more lacrosse pockets in a desired number and configuration, optionally individually and/or in a strip of lacrosse pockets, depending on the application. Each constructed lacrosse pocket can include a substantially identical predefined three-dimensional shape, and can have virtually identical physical features, such as those enumerated above in connection with the lacrosse pocket data.

After the lacrosse pocket 1510 is formed with the automated pocket assembly machine 1590, it is removed from the machine and readied for overmolding with a lacrosse head to integrally join the pocket with the lacrosse head, as in the current embodiment above. The mold used to form the lacrosse head can be the same as that illustrated in FIGS. 4-7 of the current embodiment above, and the resulting output of the molding process can be the same as the construction shown in FIG. 3.

Figure 24:
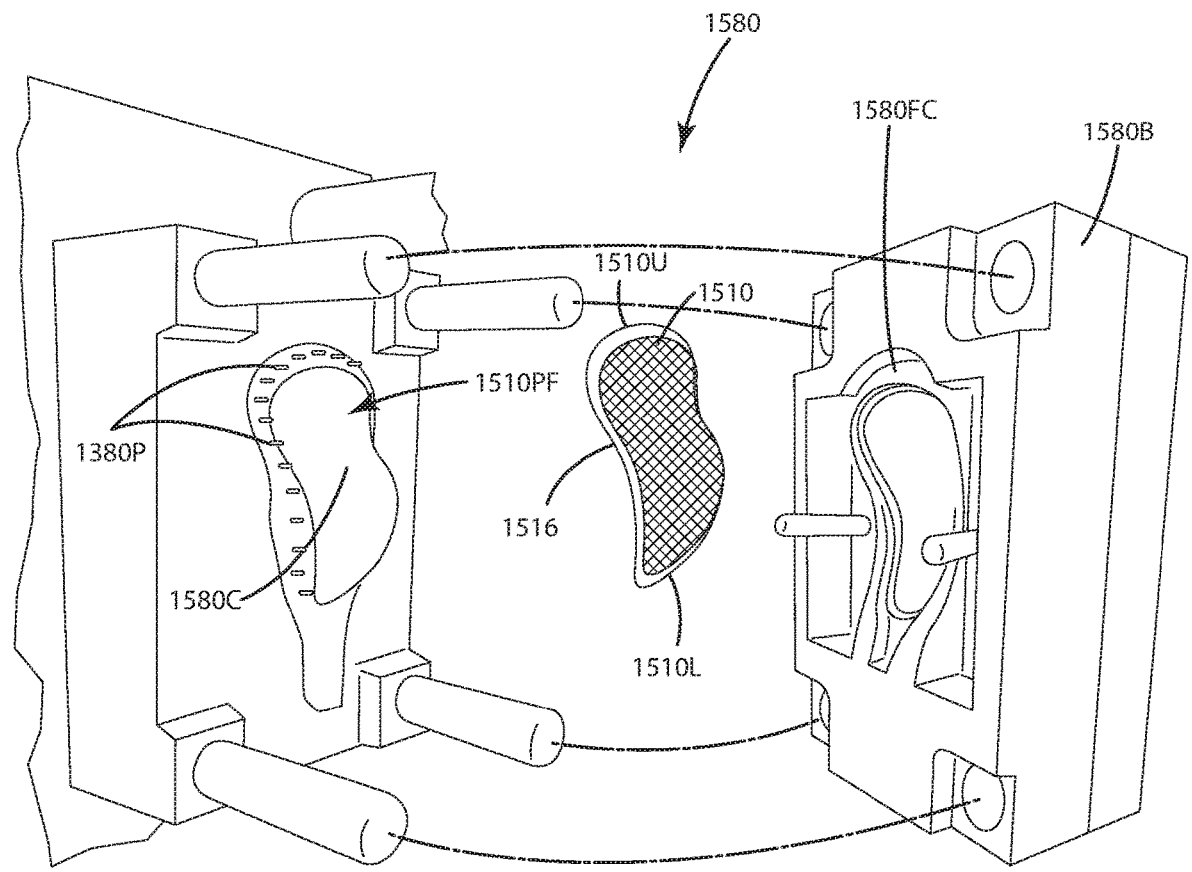
FIG. 24 is a perspective view of a mold used to overmold the lacrosse pocket with a lacrosse head of the second alternative embodiment.

An optional alternative mold 1580 that can be used to overmold the pocket is shown in FIG. 24. The mold 1580 includes first and second portions 1580A and 15806. The mold portion 1580A includes a three dimensional contour 1580C which is shaped similarly to the three dimensional contour of the already formed lacrosse pocket. The mold portion 1580A also can include a plurality of locating pins 1580P, which can be similar or identical in structure to the locating pins in the current embodiment above. The pins can function similarly to retain a lacrosse pocket over the three dimensional contour 1580C and adequately extend a perimeter flange 1580PF into the respective portions of the mold cavity 1580 FC which can be further defined in the second mold portion 1580B.

In operation, the mold portions 1580A and 1580B are moved toward one another to complete the head cavity 1580FC and its respective component portions, with the perimeter flange of the lacrosse pocket being located in the head cavity 1580FC, again similar to that of the current embodiment above. Molten or liquid material, for example polymeric material or other materials as described above in the other embodiments, is introduced into the head cavity. The lacrosse pocket, and in particular its perimeter flange, or perimeter can be embedded in and encapsulated by the material forming the respective portions of the head, for example the scoop, sidewalls and the base. As with the current embodiment, the head is allowed to cure to form a cured lacrosse head having a scoop, base, sidewalls and other components of the lacrosse head. The resulting structure of the pocket over molded by the head can be similar to that of the current embodiment described in connection with FIG. 3. The lacrosse pocket 1510 can be secured to the lacrosse head 120 without having been manually strong to the lacrosse head with laces or other structures manipulated by a human during the molding process or otherwise.

Exemplary methods of utilizing the knitting machine and mold to produce a lacrosse pocket that is integrally overmolded by a lacrosse head will now be further explained with reference to FIG. 25. Generally, the method includes the steps of: mechanically manipulating one or more strands within automated pocket assembly machine utilizing lacrosse pocket data to form a lacrosse pocket, step 1501; placing a portion of the lacrosse pocket in a mold cavity corresponding to a lacrosse head, step 1502; molding a material to the portion of the lacrosse pocket, step 1503; and removing a cured lacrosse head with the first lacrosse pocket attached to it from the mold cavity, step 1504.

Optionally, the method can include a step of storing lacrosse pocket data in memory and utilizing it to drive or operate the automated pocket assembly machine or otherwise produce the lacrosse pocket in an automated fashion. As mentioned above, the automated pocket assembly machine 1590 can be in communication with a controller 1591 which can access the lacrosse pocket data in a memory 1591M. The lacrosse pocket data, as mentioned above can be in various forms, and optionally can be implemented in code, programs or other directives. While the data may be in the form of particular knitting, weaving or other pattern data or code, without any specific identification of features of the pocket, such as the apex, the outer perimeter or perimeter flange, openings, shooting ramps or other structures, that data still pertains to those features of the pocket.

The method can include different ways to collect, compile and store the lacrosse pocket data in memory. For example, the lacrosse pocket data, or parameters that can be translated into the lacrosse pocket data, can be based on input to the controller provided by a user related to different features of a lacrosse head. For example, the user can input into the controller or store in memory specific characteristics of features, such as: an apex located between a scoop portion and a base portion of the lacrosse pocket; the length, location and boundaries of an outer perimeter or perimeter flange, the predefined three-dimensional shape of the pocket; the position, dimension, curvature and/or depth of a middle pocket; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like. All of these characteristics can be input into a program or code, which can then automatically translate the characteristics into lacrosse pocket data, such as data relating to knitting patterns, weaving patterns or other assembly patterns, pertaining to those characteristics.

Alternatively, these characteristics can be utilized to generate one or more sample lacrosse pockets, for example by providing those characteristics to an experienced technician of automated pocket assembly machines. The technician can translate the characteristics into a corresponding set of lacrosse pocket data. The lacrosse pocket data can be in the form of data and/or code relating to particular knitting patterns, weaving patterns or other assembly patterns that can, when read and/or received by the automated assembly machine, carry out operations to implement the characteristics in the form of a lacrosse pocket. In some cases, the technician can construct multiple iterations of samples via experimentation, until a preferred lacrosse pocket structure is identified and produced. When that preferred lacrosse pocket structure is so identified and produced, the related lacrosse pocket data used to generate that pocket can be stored in memory as a particular file, unique to that preferred lacrosse pocket structure. Optionally, the technician can select one or more particular characteristics of the pocket to program the controller and produce a pocket of a preferred profile. For example, the technician can identify a theoretical position of the bullseye opening and/or an apex based on the specific characteristics of those features stored in memory. The technician can then write a knitting program comprised of lacrosse pocket data based on the estimated location of the apex and/or bullseye opening (optionally, along an anticipated longitudinal axis of the pocket). The technician can then use the machine to produce the pocket, utilizing the lacrosse pocket data. The technician can review the constructed pocket and determine whether the bullseye opening and/or apex is where it is desired to be located relative to the related characteristics in the memory. If the bullseye opening and/or apex are in place, the produced pocket is a success and related lacrosse pocket data can be stored. If not, the technician will modify the lacrosse pocket data and associated program to move the bullseye opening and/or apex (e.g. longitudinally along the longitudinal axis) to thereby produce a modified new pocket. The technician will utilize that data to produce yet another pocket on the machine, and inspect it to see if it is a successful, and to see if production of the pocket, the bullseye and/or apex are where they should be. The technician can repeat this iterative process multiple times before producing a final pocket with all the desired characteristics. It should be understood that the iterative process utilized by the technician can include use of the automated translation process described herein. For instance, the technician can utilize an automatic translation processor to generate lacrosse pocket data. If the technician determines an adjustment is worthwhile, he can adjust one or more settings, including one or more characteristics of the lacrosse pocket data and one or more parameters used by the automated translation processor to generate the lacrosse pocket data, to thereby produce a modified new pocket.

Multiple lacrosse pocket data in multiple files can be generated for a variety of different lacrosse pockets having different characteristics. Because most of lacrosse pockets can be identified as low pockets, mid-pockets or high pockets, the different lacrosse pocket data can pertain to the structure and characteristics of those different low, mid and high pockets. For example, a low pocket generally includes an apex, corresponding to the greatest depth of the pocket located centrally on a longitudinal axis of the pocket, where the apex is disposed between a middle pocket and a lower portion or lower edge of the lacrosse pocket. First lacrosse pocket data can be stored in memory that pertains to this low pocket construction. As another example, a mid-pocket generally includes an apex disposed within the middle pocket, that is, about midway between the upper edge and lower edge of the pocket. Second lacrosse pocket data can be stored in memory that pertains to this mid-pocket construction. As yet another example, a high pocket generally includes an apex disposed between the middle pocket and the upper edge or scoop portion of the pocket. The third lacrosse pocket data can be stored in memory that pertains to this high pocket construction. The respective first, second and third lacrosse pocket data can be stored in different files and identified accordingly. When a user desires to manufacture a particular pocket, such as a low pocket, the user can access the data related to that pocket in a particular file in memory. This data can then be used to guide the mechanical manipulation of strands with the automated pocket assembly machine to form the particular pocket and its features including for example a three-dimensional contour, an apex located in a particular location and/or a ball channel curvature, all corresponding to the respective lacrosse pocket data.

Figure 26:
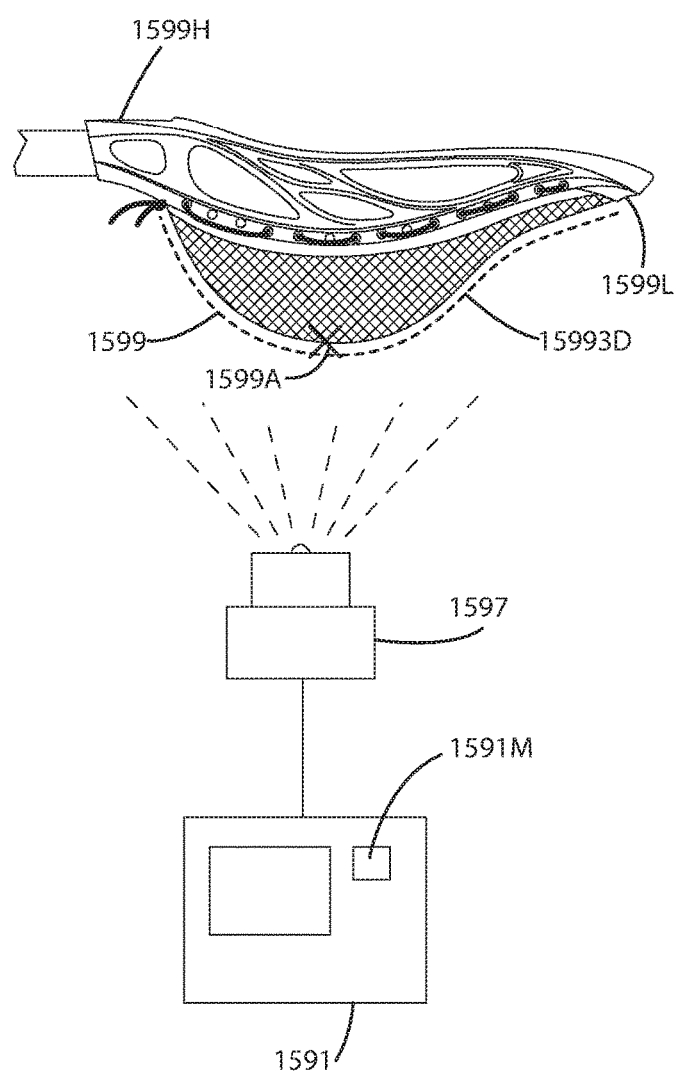
FIG. 26 is a side perspective view illustrating collection of an image of a hand strung lacrosse pocket used to generate lacrosse pocket data.
Figure 27:
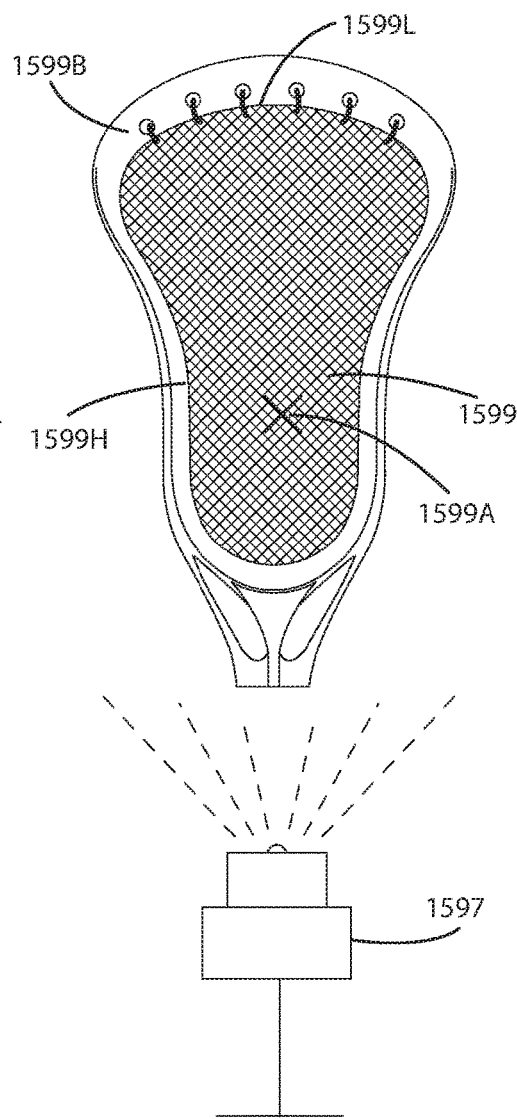
FIG. 27 is a top view illustrating collection of an image of the hand strung lacrosse pocket used to generate the lacrosse pocket data.

As mentioned above, the method can include different ways to collect, compile and store the lacrosse pocket data in memory. Another way to collect and store lacrosse pocket data is to start with an existing lacrosse pocket that is manually strung by a human to a lacrosse head. With reference to FIGS. 26-27, and imaging device 1597 can be used to capture an image of a first lacrosse pocket 1599 joined with a first lacrosse head 1599H, The first lacrosse pocket 1599 can be secured to the head with laces 1599L that are strung manually by a human between the pocket and the head. That lacrosse pocket 1599 can include a non-planar, three dimensional concave contour 15993D. Although shown only as extending in the plane of the drawing, the three dimensional contour can extend laterally across the width of the pocket as well. The lacrosse pocket 1599 can define an apex 1599A, which can be located within a bullseye opening, and can generally form the deepest depth of the pocket; and can include a pocket boundary 1599B. This pocket boundary can be the outermost extent of the pocket 1599. Because the pocket is hand strung, the boundary can be located adjacent the corresponding portions of the lacrosse head 1599H.

The lacrosse pocket 1599 can be imaged by the imaging device 1597, which can be a high-definition camera, a digitizing camera, or any other device capable of capturing images and/or data associated with an object. As an example, the imaging device 1597 can conduct a three-dimensional scan of an object to produce model information from which a three-dimensional digital model can be generated. A variety of three-dimensional models can be generated from the model information, including, for example, a polygon mesh mode, a surface model and a point cloud. The three-dimensional model or the model information, or both, may be editable by a user to enable modifications prior to translation of the model information to lacrosse pocket data for use in generating the lacrosse pocket 1510. Examples of such three-dimensional imaging devices include an active-scanner that actively emits radiation or light and detects the reflected radiation or light, and a passive-scanner that detects reflected ambient radiation.

The imaging device 1597 in the illustrated embodiment can be directly controlled by the controller 1591, and can communicate information to the controller 1591 relating to the scanned object. Optionally, the imaging device 1597 may be operated separate from the controller 1591, and may communicate information, such as scanned information or model information, to the controller 1591 to facilitate generation of lacrosse pocket data. For instance, a user or technician may utilize the imaging device 1597 to scan the pocket 1599 to generate scanned information from which a three-dimensional model of the pocket 1599 can be produced. This scanned information can be communicated, via a wired interface or a wireless interface, or both, to the controller 1591. The three-dimensional imaging device can be a portable device, such as a camera-enabled mobile phone. With such a mobile phone, a lacrosse player can generate scanned information relating to a three-dimensional model of the pocket 1599, and communicate the scanned information to a technician or the controller 1591, or both, to be used as a basis for generating the lacrosse pocket 1510.

The scanned information can be provided to the technician or the controller 1591, or both, in conjunction with a point-of-sale interface that allows the user to order a lacrosse pocket based on the pocket 1599. The point-of-sale interface can be provided by any type of device, including a web-enabled or a network-enabled device or a standalone device located at a retailer location. For instance, the point-of-sale interface can be communicated via a network to a point-of-sale terminal (e.g., a mobile phone or portable device), and enable selection and purchase of a manufactured lacrosse pocket, a lacrosse head, or an integrated lacrosse pocket and lacrosse head, or a combination thereof. The point-of-sale terminal can include the imaging device 1597 to scan the pocket 1599, or the point-of-sale terminal can receive scanned information relating to the pocket 1599 from another device. The scanned information or the model information of the pocket 1599 can be considered a digitized or digital form of the pocket 1599. Based on the scanned information or the model information of the pocket 1599, the point-of-sale terminal can suggest one or more options available for selection and ordering, including, for example, a lacrosse pocket based on the digital form of the pocket 1599, and an integrated lacrosse pocket and lacrosse head based on the digital form of the pocket 1599. Additionally, the point-of-sale terminal can enable selection and ordering of a substantial reproduction of a lacrosse pocket associated with a lacrosse head possessed by a professional lacrosse player, or an integrated lacrosse pocket and lacrosse head that is a substantial reproduction of the same possessed by the professional lacrosse player. The point-of-sale interface can also enable a user to adapt one or more features of a selected lacrosse pocket or a scanned lacrosse pocket, or both, to customize their order, including, for example, changing the location of the apex or the curvature of the shooting ramp. After a user has selected the desired options for their order, the point-of-sale terminal can communicate the order in the form of a point-of-sale request to a transaction processor for fulfilment.

After the image and/or associated data of the lacrosse pocket 1599 is captured with the imaging device, that image and its associated data can be digitized into a digital form that can be processed by the controller or some other computing device and then transferred to the controller. Based on the image of the first lacrosse pocket, and/or the digitized data relating to the image, either the controller or a machine technician can generate first lacrosse pocket data, as described herein alone. This lacrosse pocket data can be stored in memory, for example 1591M of the controller 1591. Generation of the first lacrosse pocket data from the digital form of the lacrosse pocket 1599 can be fully automated or manually performed. Optionally, the first lacrosse pocket data can be generated using automation in conjunction with manual input. Generation of the first lacrosse pocket data from the digitized form of the lacrosse pocket 1599 can be conducted completely or partially by a translation processor. The translation processor can form part of the controller 1591, or can be separate therefrom. The translation processor can be configured to perform instructions according to a translation module that is stored in memory or a computer readable medium and that can be accessed by a technician to generate the first lacrosse pocket data based on the digital form of the lacrosse pocket 1599.

The translation processor can process the digitized form of the lacrosse pocket 1599 or the digitized lacrosse pocket to identify one or more of the features described herein in connection with the lacrosse pocket data. For instance, the translation processor can use scanned information relating to the lacrosse pocket 1599 to identify the position, dimension, curvature and/or depth of the middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the maximum width of the pocket; the side to side curvature of the middle pocket and the like. To facilitate identification of these features, the translation processor may orient its frame of reference or determine a frame of reference based on identification one or more generally known points, locations, or qualities, or a combination thereof, of the lacrosse pocket 1599. For instance, the distance between the uppermost and lowermost edges of the lacrosse pocket 1599 likely corresponds to the longest distance between any two features, and generally defines the longitudinal axis LA of the lacrosse pocket 1599.

The leftmost and rightmost edges of the lacrosse pocket 1599 can be identified by projecting features of the digitized lacrosse pocket onto one or more test planes that contain the longitudinal axis LA. (In practice, there are an infinite number of planes that contain the longitudinal axis LA, but a subset of available test planes can be analyzed by the translation processor, such as using 360 test planes that are each about 1 degree relative to each other about the longitudinal axis LA.) The translation processor may identify a single plane within these one or more test planes that includes two points whose distance from each other, in a direction perpendicular to the longitudinal axis LA, is the largest among all points (in a direction perpendicular to the longitudinal axis LA) for all of the one or more test planes. These two points likely correspond to the leftmost and rightmost edges of the digitized lacrosse pocket 1599 as projected onto the identified plane. The identified plane can be considered the face plane and can be used as a reference plane for determining one or more of the features of the lacrosse pocket data described herein. The face plane in one embodiment may be determined using an iterative method or process of inspecting several test planes until the face plane is identified.

The translation processor can also orient the face plane to identify the front and rear faces thereof with respect to the digitized lacrosse head. A point farthest from the face plane along a direction perpendicular or normal to the face plane likely corresponds to the apex of the digitized lacrosse pocket. Because the apex is generally considered the rearmost feature of a lacrosse pocket relative to the face plane, identification of the apex relative to the face plane can aid in differentiating between the front and rear faces of the face plane. Further, identification of the apex can facilitate identification of a point of origin for the reference frame. The point of original can be identified as the intersection between (a) the longitudinal axis LA and (b) a line normal to the face plane and containing the apex. The translation processor can use the identified face plane and the point of origin as a frame of reference for determining one of more of the features of the lacrosse pocket data in a consistent manner. For example, the depth of the apex relative to the face plane has already been determined, but the translation processor can also determine, based on the frame of reference, the position of the uppermost and lowermost portions of the digitized lacrosse pocket relative to the point of origin. As another example, the side to side lateral width of the pocket can be determined based on point of origin, the identified frame of reference, or the location of the apex, or a combination thereof. In yet another example, the curvature and dimension of one or more features, such as the middle pocket and the shooting ramp, can be determined based on the frame of reference, the position of the apex and the uppermost edge of the digitized lacrosse pocket. The curvature or dimension, or both, of the shooting flanks can be determined based on the curvature and dimension of the middle pocket and the shooting ramp. The determined one or more features of the digitized lacrosse pocket can be stored in memory as the first lacrosse pocket data, or further processed to arrive at the first lacrosse pocket data. The first lacrosse pocket data, as described herein, can be used as a basis for automatically generating a new lacrosse pocket. Optionally, in addition to or alternative to determining the one or more features, the digitized lacrosse pocket can be stored in memory and used to directly generate a set of instructions for automatically generating a new lacrosse pocket that is substantially similar to the lacrosse pocket 1599.

Optionally, the translation processor described herein can be configured to identify a type or class of a lacrosse head associated with the lacrosse pocket 1599 based on the information provided by the imaging device 1597. For instance, the translation processor can identify a type of lacrosse head based on the lateral width, the longitudinal length, the apex, the ball channel, and the like, or a combination thereof, of the digitized lacrosse pocket. The translation processor can facilitate generation the lacrosse pocket 1599 to be constructed with a lacrosse head substantially identical to the identified head. It is noted there is a possibility that a particular type of lacrosse head that is scanned by the imaging device 1597 may no longer be in production, or may be different from those available from a particular manufacturer. In such circumstances, the translation processor can identify a nearest fit lacrosse head that is available or a plurality of similar but available lacrosse heads based on the information provided by the imaging device 1597. The translation processor can adjust one or more parameters of the lacrosse pocket data to generate a lacrosse pocket 1510 that is similar to the lacrosse pocket 1599 but tailored to fit a currently available or currently selected lacrosse head. For instance, the translation processor can adjust the curvature and dimension of the shooting ramp and the curvature and dimension of the shooting flanks based on the currently selected head having a wider or narrower overall lateral width. The point-of-sale interface can be configured to identify a scanned lacrosse head type based on the scanned information, and enable selection of a nearest fit lacrosse head or one of multiple identified and similar lacrosse heads for purchase in conjunction with the lacrosse pocket 1510.

The method can include a step of selecting particular lacrosse pocket data from the memory to implement the mechanical manipulation. This particular lacrosse pocket data can be incorporated into a lacrosse pocket data library. The lacrosse pocket data library can include various lacrosse pocket data for constructing complete, individual lacrosse pockets. These individual lacrosse pockets can be constructed according to user driven or user selected pocket profile preferences. For example, there can be multiple sets of lacrosse pocket data that pertains to first, second, third, fourth, etc. different pockets stored in the library, which can be associated with the memory. A user can use the controller to select one of the different sets of lacrosse pocket data from the library to manufacture selected ones of the different pockets. If desired, the lacrosse pocket data optionally can be alterable or selectable so that a user can generate a modified version of a particular lacrosse pocket based on manipulation of that pocket's lacrosse pocket data. For example, this can entail selecting lacrosse pocket data pertaining to a first lacrosse pocket and generating a modified version of the lacrosse pocket data pertaining to the first lacrosse pocket. The modified version of the lacrosse pocket data can include a particular knitting pattern, weaving pattern or other data that has been altered or modified to provide a slightly different configuration of the first lacrosse pocket. For example, when implemented to construct the pocket, the data can be utilized to generate a modified version of the first lacrosse pocket that has: an apex in a different location than the first lacrosse pocket; an outer pocket perimeter that is different from the perimeter of the first lacrosse pocket; edges of a pocket that are different from the first lacrosse pocket; a shooting ramp or ball channel is different from the first lacrosse pocket; runners, shooting strings and/or shooting flanks that are different from the first lacrosse pocket and the like. The differences between the modified version of the pocket in the actual first lacrosse pocket can be subtle or significant, depending on the level of modification to the first lacrosse pocket.

Alternatively, the lacrosse pocket data can be separated within the library into subsets of data that pertain only to lacrosse pocket components, for example, individual parts of the lacrosse pocket such as the middle pocket; an apex of the pocket; an outer pocket perimeter; various edges of the pocket; the position, a shooting ramp, also referred to as a ball channel; runners and/or shooting strings of the pocket; the shooting flanks and the like. Based on this library, a user, the machine or controller can mix and match different lacrosse pocket data pertaining to different parts of a lacrosse pocket thereby forming an entirely new or unique lacrosse pocket having preselected parts, the construction of which is driven by the different lacrosse pocket data pertaining to those different parts and combined to form the complete lacrosse pocket. Generally, because any number of lacrosse pocket data pertaining to individual components of a lacrosse pocket can be entered to the library, there is almost an infinite number of combinations of that lacrosse pocket data to produce an almost infinite number of different lacrosse pockets.

Figure 25:
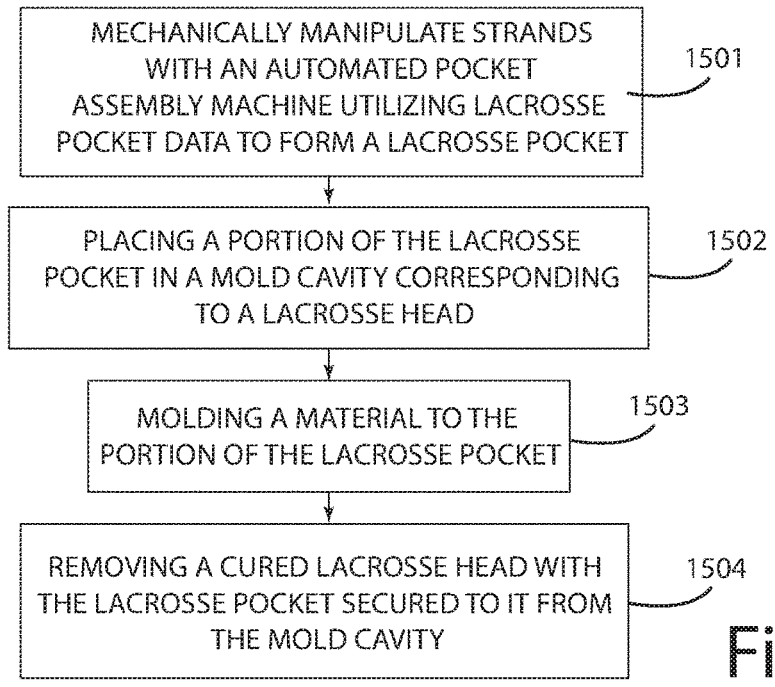
FIG. 25 is a flow diagram showing an exemplary method of manufacturing the lacrosse pocket of the second alternative embodiment and joining it with a lacrosse head.

Referring to FIG. 25, with further regard to step 1501, the controller 1591 and/or the automated pocket assembly machine 1590 are configured to utilize the lacrosse pocket data to guide mechanical manipulation of various strands 1593A, 1593B of material with the automated pocket assembly machine. This can be accomplished via pulling one or more different strands, from the spools and toward the needles and/or armatures 1595A, 1595B of the machine 1590. The needles and armatures are guided in movement by the machine 1590, which again is directed by the controller utilizing the lacrosse pocket data. Optionally, if the mechanical manipulation includes knitting, various strands can be interlooped with one another in courses and wales within the knitted pocket, where weft knitting is optionally implemented via the machine.

Optionally, the strands can be constructed from one or more different materials such as described in the embodiments above. For example, some strands can be constructed from a first material which can be less elastic and/or more abrasion resistant and durable than second strands constructed from another material. The first material can be at least one of an aromatic polyamide and an ultra-high molecular weight polyethylene. One suitable aromatic polyamide is poly-para-phenylene terephthalamide. Other relatively inelastic, durable, high-strength materials are also contemplated. The second material can be a thermoplastic polymer, for example high density or high strength polyethylene, polypropylene and/or a polyethylene multifiber yarn. Others synthetic or natural materials also can be included as the second material.

As a result of the mechanical manipulation in step 1501 as described above, the lacrosse pocket 1510 including the strands is formed. This lacrosse pocket can include features as described above, including but not limited to the predefined three-dimensional shape; the position, dimension, curvature and/or depth of a middle pocket; the position of an apex of the pocket; the length, curvature and location of an outer pocket perimeter; the position, curvature and dimension of various edges of the pocket; the position, curvature and dimension of a shooting ramp, also referred to as a ball channel; the position, curvature and dimension the runners and/or shooting strings of the pocket; the side to side lateral width of the pocket; the minimum width of the pocket; the side to side curvature of the middle pocket and the like. The pocket 1510 also includes the various knitted elements that form each of the above features, for example the join elements, vertical elements, edges, perimeter flange, etc., each of which can be constructed as described above and in connection with the current embodiment.

As with the current embodiment, the perimeter flange 1510PF optionally can be at least 2.0 mm, at least 2.5 mm wide, at least 4.0 mm, at least 5.0 mm or wider. The perimeter flange can be the portion of the lacrosse pocket 1510 that is over molded by at least a portion of the lacrosse head in joining the lacrosse pocket 1510 to the lacrosse head 120. Where the perimeter flange is at least the width mentioned above, it has been discovered that there is enough structure of the pocket to satisfactorily embed and securely join the pocket body with the portion of the head into which the perimeter flange is molded. With widths of the perimeter flange that are significantly less than those mentioned above, it is possible that, without extra reinforcement or the use of special materials, the perimeter flange and pocket can rip or tear out from the overmolded polymeric material from which the head is constructed. This can be simply due to not enough pocket being satisfactorily anchored within the overmolded head material.

If desired, the mechanical manipulation step 1501 can optionally output multiple individual but substantially identical lacrosse pockets formed along a common strip of pockets. These lacrosse pockets can be joined end for end with one another along the strip, in a manner similar to that described in the current embodiment above. The individual pockets can be separated from one another as mentioned in that embodiment, for example by shearing, hot melt cutting, die cutting and/or laser cutting, or otherwise removing a connecting strand or interface portion to separate pockets.

With the lacrosse pocket produced in step 1501, that pocket can then be readied for overmolded in step 1502. In general, step 1502 can include placing the lacrosse pocket 1510 over the mold portion 1580C. Where the mold portion includes locating pins 1580P, the perimeter flange 1510PF can be joined with those locating pins, optionally placing the pins through locating pin openings in the perimeter flange such as those described above in connection with the current embodiment of the pocket. Alternatively, where other structures are used to hold the pocket in place, though structures can be actuated. In placing the perimeter flange, the upper edge 1510U can first be placed on the locating pins 1380P in the region of the scoop. The side edges 1516 can then be placed over the locating pins 1380P in that region of the mold. The lower edge 1510L can be joined with the locating pins in that region after that. Sometimes, the placement of the perimeter flange on the pins can create a tension T across the pocket as described in connection with FIG. 5. Further, the perimeter flange 1510PF can be precisely placed within the respective mold cavities to provide desired distance of the perimeter flange projecting into the mold and placement relative to the sidewalls of the cavity in which the perimeter flange is placed, as described in connection with the current embodiment referring to FIG. 5. The mold portions 1580A and 1580B can be closed to complete the head cavity 1580FC including the respective scoop, side wall and base mold cavities. The perimeter flange remains disposed in portions of those cavities.

After the lacrosse pocket 1510 is placed in the mold 1580, the molding in step 1503 can commence. In general, the output of this step is in a lacrosse pocket embedded within portions of a cured lacrosse head, unable to be removed from the lacrosse head without destroying at least one of the lacrosse head and the lacrosse pocket. The molding can begin by introducing a molten material or liquid into the mold cavity 1580C to substantially fill the mold cavity and its respective scoop, base and sidewall mold cavities, with the perimeter flange remaining in these cavities. As the material is introduced, it extends and/or flows thorough the cavity, and also between adjacent ones of a plurality of strands within the perimeter flange in the cavity, also referred to as an outer perimeter, optionally simultaneously disposed in the different component cavities. The material can flow from a first side of the perimeter flange to a second side of the perimeter flange 1510PF.

As in the current embodiment, when the material contacts the respective edges and/or generally the perimeter flange disposed in the cavity 1580FC, the material, optionally under pressure, encapsulates the individual strands, coating their surfaces on front and back. The material also can extend from a front or first surface of the perimeter flange that faces generally toward the pocket longitudinal axis LA, to a second surface or outside of the perimeter flange that faces generally away from the pocket longitudinal axis. In many cases, the material also permeates through small spaces between the individual strands, connecting the injected material from one side of the flange or edge to the other. This, in turn, embeds the material within the edges and/or perimeter flange. Where the strands are knitted within the perimeter flange, those strands are typically interlooped with one another, or a single strand is interlooped with itself, in multiple columns and rows. In these cases, the strand or strands form one or more loops in the perimeter flange. The introduced material thus permeates through and/or flows through the openings at the interlooped portions of the strand(s), in some cases impregnating the strands and/or spaces between the strands with the material in the perimeter flange. Optionally, the pocket is placed within the mold so that the molten material or liquid material is prevented from entering openings adjacent the perimeter flange. This can be accomplished simply by not positioning those openings within the respective mold cavities. Accordingly, these larger openings, which can contribute to the functionality of the middle pocket or other components of the pocket, are not filled with material.

After the injected material cures to form the lacrosse head portions, it embeds within and extends through the openings of the portion of the edge that was within the mold. Again, these openings can be formed between adjacent interweave strands, or between loops formed from one or more continuous strands in a knit pattern. The material also can encapsulate one or more of the plurality of individual strands, surrounding or circumferentiating each substantially entirely so that all outer surfaces of the strand are within the molten material. With the above embedding, the perimeter flange is sufficiently trapped and molded within the respective portion of the head to anchor it there under the rigors of use during a lacrosse activity.

In some cases, where multiple lacrosse pockets are formed in the mechanical manipulation step, those additional lacrosse pockets can be sequentially molded one by one in the mold, or in a mass mold capable of molding of multiple pockets simultaneously. The process for over molding each of these additional lacrosse pockets similar to that above entails generally placing portions of the individual lacrosse pockets in the mold cavity introducing the molten material and/or liquid into the mold cavity to encapsulate the portions of the traditional lacrosse pockets. The resulting lacrosse pockets mounted in the heads are identical to one another.

After the molten material and/or liquid is satisfactorily introduced into the mold cavity to form the components of the head and encapsulate the perimeter flange, that material is allowed to cure to form a cured lacrosse head 120. The cured lacrosse head includes the various respective components, such as a scoop, side walls, and a base, as well as an optional throat. The cured lacrosse head can be removed from the mold in step 1504, and in particular the mold cavity again with the outer perimeter or perimeter flange of a lacrosse pocket remaining embedded within the lacrosse head. Optionally, during this step, any locator pins can be retracted from the formed head and respective openings in the perimeter flange to facilitate removal of the head from the mold. Additional ejectors can further ejector otherwise push the completed lacrosse head out from the mold, as explained in the current embodiment and applied to this embodiment.

Further optionally, during the molding step 1503, the lowermost portion of a lacrosse head can be molded. When the cured lacrosse head is removed in step 1504 from the mold cavity, however, no structure extends below the portion of the lacrosse pocket that is molded into the cured lacrosse head. As an example, there is no secondary frame or other structure that is joined with the lowermost portion of the lacrosse head to sandwich or secure any portion of the pocket to the lacrosse head. The anchoring and attachment of the pocket is completed with the encapsulation of the perimeter flange in the respective lacrosse head portions. Further, the perimeter flange optionally can extend from the lowermost portion of the structure forming the complete lacrosse head.

Depending on the desired number of completed lacrosse heads including integrally formed lacrosse pockets, the above steps of mechanically manipulating, placing, molding and removing can be repeated to produce multiple identical lacrosse heads with corresponding identical lacrosse pockets all attached thereto. In this manner multiple identical lacrosse heads can be produced on a mass scale and sold to consumers. Each such produced lacrosse head and pocket is virtually identical and dimension, contour and features to provide unparalleled consistency.

Optionally, as mentioned above, the method can include different ways to collect, compile and store the lacrosse pocket data in memory, one of which is to start with an existing lacrosse pocket that is manually strung by a human to a lacrosse head. This existing lacrosse pocket can come from a variety of sources. For example, the lacrosse pocket can be a pocket that is associated with a head possessed by a professional lacrosse player. In some circles, consumers desire to have a particular pocket and/or associated head that mimics those of a professional lacrosse player. To address this desire, a manufacturer or other person or entity can identify a professional lacrosse player who is generally admired by amateur lacrosse players. The professional player can be popular due to their good performance, capabilities and/or personality. The lacrosse pocket of the professional lacrosse player can be imaged and lacrosse pocket data relating to that image can be generated. This lacrosse pocket data can be used to manufacture or form one or more samples of second lacrosse pockets that are identical to that of the professional lacrosse player. In some cases, the second lacrosse pockets can be joined with heads using the overmolding methods herein, and sold to consumers, such as amateur players who admire the professional lacrosse player, desiring to have lacrosse pockets and heads similar to that of the professional lacrosse player. If desired, a significant supply of lacrosse pockets and associated over molded heads can be manufactured in response to a particular consumer demand.

Where the pockets are manufactured using the precise lacrosse pocket data, the manufactured pocket can include a three dimensional concave contour corresponding to the three dimensional concave contour of the pocket of the professional lacrosse player, immediately upon formation of the pocket. The manufactured pocket also or alternatively can include a second apex located in a location corresponding to the apex and location of the professional lacrosse player's pocket immediately upon formation. The manufactured pocket also or alternatively can include a ball channel curvature corresponding to the ball channel curvature of the professional lacrosse player's pocket immediately upon formation. In general, the manufactured pocket can mimic any of the characteristics of features of the professional lacrosse player's pocket.

If desired, the professional lacrosse player can request an additional supply of one or more lacrosse heads from a manufacturer having lacrosse pockets that precisely match her existing pocket, which can be a hand strung pocket. With the current embodiments, that precise pocket can be replicated consistently to form multiple lacrosse pockets, and optionally lacrosse heads joined with or overmolded to the pockets, for supply to the professional lacrosse player.

Optionally, the lacrosse pocket data associated with a professional lacrosse player's pocket, an amateur player's pocket, or any lacrosse player's pocket, can be stored in a file in a library, which itself can be stored in memory. Indeed, lacrosse pocket data corresponding to a plurality of lacrosse player's pockets can be stored in the library. This library and the respective lacrosse pocket data can be selectively accessed by a manufacturer to generate lacrosse pockets, identical to those corresponding to the lacrosse pocket data, for consumers. The consumers can place orders with a manufacturer to produce a desired pocket using preselected lacrosse pocket data, optionally offered via access to the library of different lacrosse pocket data. This library, or certain pocket characteristics associated with the lacrosse pocket data, optionally can be accessible to consumers by subscription via the Internet or some other medium from a manufacturer, distributor and/or retailer.

In an actual manufacturing setting, a manufacturer can collect or design and store multiple lacrosse pocket data in memory, each of which correspond to a lacrosse pocket of a lacrosse player, and/or a theoretical construction or design of a lacrosse pocket. Upon receiving a request or order from a consumer for the construction of a particular pocket, optionally joined with a corresponding head, the manufacturer can access the requested lacrosse pocket data. That data can be selectively input or otherwise accessed by the controller, which in turn controls the automated pocket assembly machine to produce a pocket including the features of the pocket associated with the lacrosse pocket data. The lacrosse pocket can thus be constructed. After it is constructed it can be overmolded with a lacrosse head according to the embodiments herein to produce a lacrosse head having an integrally formed lacrosse pocket attached thereto. This product can then be shipped directly to the consumer from the manufacturer, or through other acceptable channels of trade.

A third alternative embodiment of a lacrosse pocket is illustrated in FIGS. 28-33 and generally designated 1610. The pocket shown there is similar in structure, function and operation to the embodiments described above, for example, the current embodiment, with several exceptions. To begin, the third alternative embodiment 1610 of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material. Large diameter or dimension (greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material. This can contrast conventional traditional lacrosse pockets, which are formed almost substantially from large diameter or dimension (greater than 2.0 mm and/or 3.0 mm) laces, webs, runners and thongs.

The pocket 1610 can include all the features and functionality of the current embodiment pocket 1310 as well. For example, the pocket 1610 can include a pocket body 1610B that includes and/or is joined directly with a perimeter flange 1610PF. The pocket 1610 can include an upper edge 1610U opposite a lower edge 1610L. Side edges 1614 and 1616 can also lie opposite one another across a longitudinal axis LA of the pocket, which longitudinal axis generally bisects the pocket into equal sized left and right sides.

Figure 28:
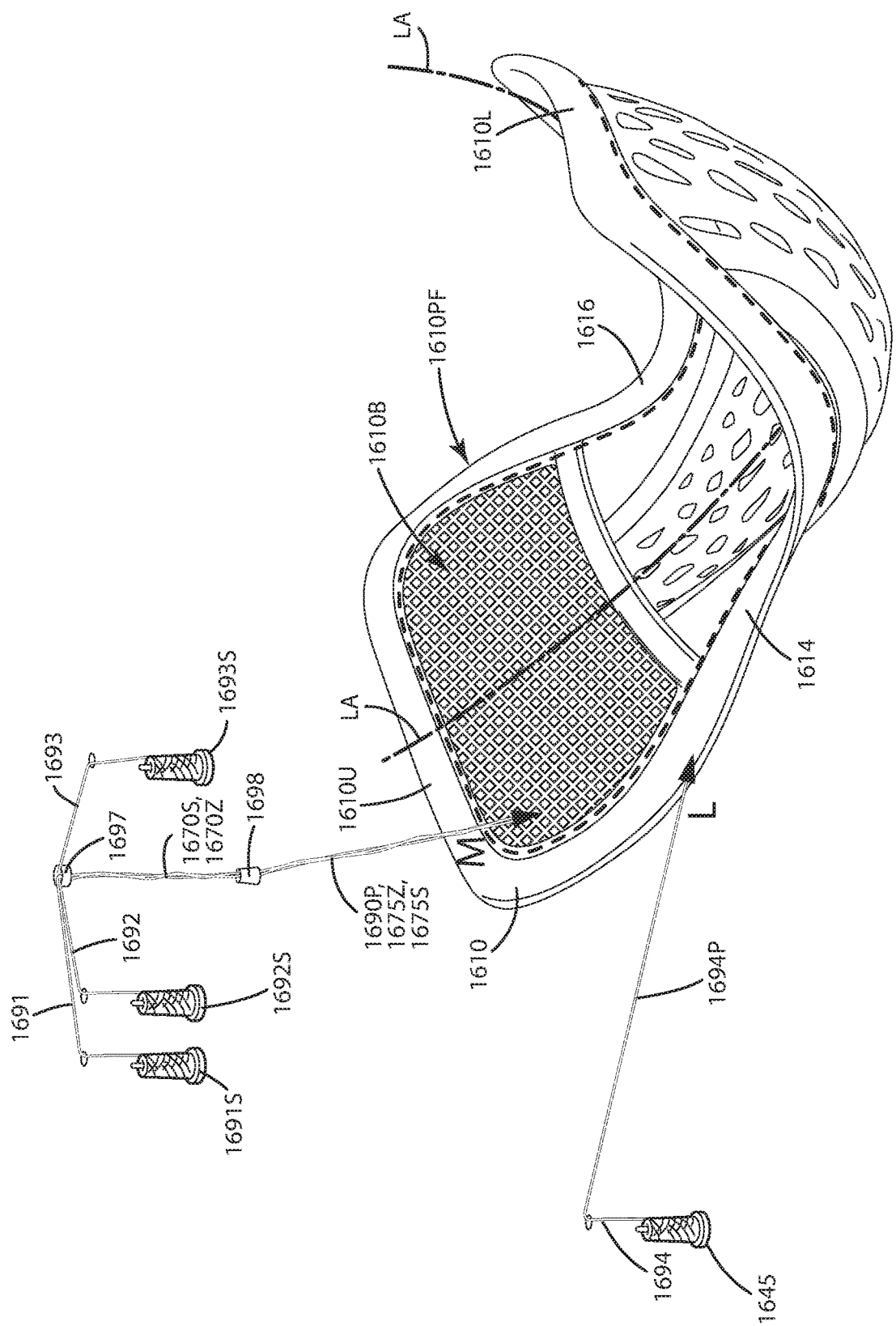
FIG. 28 is a perspective view of a lacrosse pocket of a third alternative embodiment.

As shown in FIG. 28, the edges, 1610U, 1610L, 1614 and 1616 as well as the body 1610B can be formed from one or more pocket strands 1694P and 1690P. The pocket strand can be in the form of a perimeter strand 1694P, which can be used to construct a substantial portion of the perimeter flange 1610PF. Although shown as a single strand, there can be multiple perimeter strands. A pocket strand also can be in the form of a body strand 1690P. Any of the pocket strands herein can be formed by twisting together individual strands to form one or more plies, and twisting the one or more plies with additional strands or two or more additional plies to construct a pocket strand that is resistant to unraveling, does not kink, and/or is relatively balanced rotationally.

Where a pocket strand is in the form of a perimeter strand 1694P, it optionally can be constructed from strands of a first material, which can be less elastic, and/or more abrasion resistant and durable than the second material. Optionally, the first material can be at least one of an aromatic polyamide and an ultra-high molecular weight polyethylene. One suitable aromatic polyamide is poly-para-phenylene terephthalamide, sold under the commercial name of KEVLAR® by DuPont of Wilmington, Del. The first material optionally can have strands having: a tensile modulus of elasticity of optionally 400-1000 g/d, further optionally 500-900 g/d, and even further optionally at least 500 g/d; an elongation at break of optionally 1.0% to 10.0%, further optionally of 3.0% to 2.4%, further optionally 3.6%; a breaking tenacity of optionally 100-300 cN/tex, further optionally 150-250 cN/tex, even further optionally 203-208 cN/tex; and a tensile strength of optionally about 2,000-10,000 MPa, further optionally 3,000-6,000 MPa and even further optionally about 3,600 MPa. This first material can be less elastic and more abrasion resistant and durable and tear resistant than the second material used in for example, the middle pocket shooting ramp or shooting ramp flanks. Another suitable first material can be a melt-spun polyolefin multifilament yarn, as described in U.S. Pat. No. 7,074,483, which is hereby incorporated by reference in its entirety, and sold under the commercial name of INNEGRA by Innegra Technologies of Greenville, S.C. Another suitable first material is an aromatic polyester, sold under the commercial name VECTRAN by Kuraray Co., Ltd. Of Tokyo, Japan.

The perimeter strand, as shown in FIG. 28 can be spooled off of a spool 1694S including a single individual strand 1694 of the first material described above. This strand 1694, shown in the direction of the arrows L is mechanically manipulated by an automated pocket assembly machine in an automated process, such as those described above, optionally utilizing lacrosse pocket data, to manufacture the perimeter flange 1610PF. When making the perimeter flange, the perimeter strand can be knitted, weaved or otherwise combined and joined in a stitchless, seamless manner with the body portion 1610B of a lacrosse pocket, and in particular with any body strand 1690P that is adjacent the perimeter flange. Further optionally, these different pocket strands can be interlooped, interweaved, twisted, braided or otherwise combined with one another at an interface between the lacrosse pocket body 1610 B and its perimeter flange 1610PF.

The remainder of the body 1610B inside the perimeter flange 1610PF, that is, the portion of the body inside the broken lines in FIG. 28, can be constructed from a second material. Optionally, the second material can be a plurality of strands of a thermoplastic polymer, for example high density or high strength polyethylene, polypropylene, a polyethylene multi-fiber yarn and/or nylon microfibers. The second material optionally can have strands having: a modulus of elasticity of optionally 0.1-2.0 GPa, further optionally 0.5-1.0 GPa; elongation at break of optionally greater than 50%, further optionally greater than 100%, even further optionally greater than 500%; and a tenacity of optionally 20-350 kN/tex, further optionally 30-320 kN/tex, and even further optionally 50-100 kN/tex, and even further optionally less than 150 kN/tex. The second material can include strands optionally in a range of 100 Denier to 1000 Denier, further optionally 150 Denier to 840 Denier, even further optionally 210 Denier to 750 Denier, yet further optionally 300 Denier and/or 420 Denier.

Referring in more detail to 28-32, the pocket strand 1690P, which can be in the form of a body strand used to manufacture at least a portion of the body 1610B, can be constructed from multiple individual strands. In particular, a first strand 1691, optionally constructed from the second material above, can be spooled on a spool 1691S. A second strand 1692, optionally also constructed from the second material above, can be spooled on another spool 1692S. These first and second strands 1691 and 1692 can be twisted in a clockwise or counterclockwise direction with a spinner 1697. The precise direction of the twisting can be preselected, depending on the particular attributes of the pocket strand 1690P.

More particularly, the pocket strand 1690P can be in the form of one or more spun first plies 1670S and 1670Z, which are twisted counterclockwise and clockwise, respectively. These plies and the relevant twisting are better understood with reference to FIGS. 29-32. FIG. 29 illustrates the first strand 1691 and second strand 1692 being twisted in a counterclockwise direction. The result of this counterclockwise twisting results in a counterclockwise twisted first ply 1670S. Likewise, FIG. 31 illustrates the first strand 1691 and second strand 1692 being twisted in a clockwise direction. The result of this clockwise twisting results in a clockwise twisted first ply 1670Z. Incidentally, the different first plies in FIGS. 29 and 31 are illustrated with the individual strands 1691 in 1692 loosely twisted together. Upon further spinning and/or incorporation into the lacrosse pocket, these plies can be more tightly twisted. Further, it will be appreciated that with the current embodiments, the individual first and second strands can be twisted in a first and second rotational direction, generally clockwise and counterclockwise, depending on the application.

In the method of the third embodiment, the first plies 1670S and/or 1670Z can be combined with additional plies and/or additional strands of material. For example, as shown in FIGS. 28-32, the first ply 1670S can be twisted with a third strand 1693 in a first direction. Additionally or alternatively, the first ply 1670Z can be twisted with the third strand 1693 in a second, opposite direction. In particular, a third strand 1693, optionally constructed from the first material described above, can be spooled on a third spool 1693S. This third strand can be introduced to and co-mingled or engaged with, one or more of the plies 1670S and/or 1670Z via the spinner 1698.

As an example, referring to FIG. 30, the third strand 1693 can be twisted in a clockwise manner with the first ply 1670S via the spinner 1698. This in turn forms the pocket strand 1675Z. Because the first and second strands 1691 and 1692 are twisted counterclockwise CCW to form the ply 1670S (FIG. 29), and that strand 1670S is twisted in an opposite direction, namely clockwise C with that ply 1670S, the net result is that the pocket strand 1675Z is less prone to unraveling, kinking or otherwise becoming distorted. This is primarily due to the rotational twists in the respective ply and strand within that strand 1675Z countering one another to resist the same.

As a further example, referring to FIG. 32, the third strand 1693 can be twisted in a clockwise manner with the first ply 1670Z via the spinner 1698. This in turn forms the pocket strand 1675S. Because the first and second strands 1691 and 1692 are twisted clockwise C to form the ply 1670Z (FIG. 31), and that strand 1670Z is twisted in an opposite direction, namely counterclockwise CCW with that ply 1670Z, the net result is that the pocket strand 1675S is less prone to unraveling, kinking or otherwise becoming distorted. This is primarily due to the rotational twists in the respective ply and strand within that strand 1675S countering one another to resist the same.

Optionally, a variety of different first plies can be utilized and included in the body 1610B and/or the perimeter flange 1610PF. As an example, plies like 1675Z and 1675S can be combined, for example knitted, weaved, or otherwise combined with one another to form those components, depending on the application. In other cases, it may be suitable to manipulate the three dimensional contour of the pocket 1610 using the natural twisting proclivity of certain plies and/or strands. In such cases, the tendency of the first plies 1670S and 1670Z to twist and/or unravel in a particular direction might not be countered by twisting them in particular directions with other individual strands or other plies.

Further optionally, instead of twisting the respective individual strands and plies as noted above, the resulting pocket strands 1675Z and 1675S, as well as the pocket strand 1694P, can be pre-manufactured, optionally by a supplier, at a location distal from the mechanical manipulation of the pocket strands and/or perimeter strands to form the pocket. Thus the pocket strands and their components can be provided on site, being manufactured at the location of the automated process, and/or provided by an off-site supplier, being pre-manufactured off site, and to be incorporated into the pocket. The finished, twisted pocket strands can be spun on an individual spool and can be mechanically manipulated by the automated pocket assembly machine to manufacture the components of the lacrosse pocket 1610, optionally utilizing lacrosse pocket data as described in the embodiments above. Even further optionally, the perimeter strand 1694P can be constructed utilizing a combination of twisted individual strands and plies, such as those in the construction of the pocket body strand 1690P. Likewise, the pocket body strand 1690P can be constructed from a single individual strand of material, like that of the perimeter flange 1694P as described above, depending on the application.

In some cases, as mentioned above, the first plies can be combined with second plies, instead of being combined with individual strands. For example, as shown in another aspect of the third embodiment in FIG. 33, a pocket strand 1690P' can be formed from multiple plies, such as first and second plies 1670S' and 1670Z'. In particular, the ply 1670S' can be constructed from multiple individual strands 1691' that are twisted together in a first direction, such as a counterclockwise direction. The second ply 1670Z' can be constructed from multiple individual strands 1692' that are twisted together in an opposite direction, such as a clockwise direction. These resulting plies can be then twisted together in a counterclockwise or clockwise orientation to form the pocket strand 1690P'.

Due to the counterclockwise and clockwise twisting of the respective plies, in combination with the counterclockwise or clockwise twisting of those plies with one another in the finished pocket strand 1690P', the rotational forces and natural tendency of the plies to rotate can be countered, so that the finished pocket string 1690P' is resistant to unraveling, kinking or otherwise becoming distorted. The precise number of individual strands 1691' and 1692' can be modified as well as the rate of twist of the plies (turns per meter) in the pocket strand to further prevent, adjust, and/or modify the tendency of the finished pocket strand to unravel, kink and/or become distorted.

In addition, although not shown, in any of the constructions of this embodiment, the number of strands twisted with other strands can be varied in number significantly. For example, the ply 1670S can be constructed from first, second and many additional strands. Likewise the third strand 1693 can be constructed from a number of additional individual strands twisted in a clockwise and/or counterclockwise direction with it. Depending on the application, the number of strands used in different plies and finished pocket strands can vary considerably.

When the pocket 1610 is finished, it can be integrally molded to a lacrosse head (not shown), where the head and pocket have the same structural and functional characteristics as those of the head and pocket in the current embodiment above. In addition, the head and pocket can be integrally combined and/or formed using the same structure and methods as described above in connection with the current embodiment, or any other embodiments herein.

A fourth alternative embodiment of a lacrosse pocket is illustrated in FIGS. 69-91 and generally designated 1710. The pocket shown there is similar in structure, function, and operation to the embodiments described above, for example, the current embodiment, with exceptions. At least a portion of the pocket is formed with strands that are fusible to form one or more fused pocket areas, optionally in combination with any of the different knit and/or weave patterns described above. The shape, dimensions, and location of the fused pocket area can vary to provide the pocket with regions having different physical and/or mechanical properties. For example, the fused pocket area(s) can be configured to provide the pocket with different elasticities, stretch capabilities, different support, different recovery, different abrasion-resistance, and/or different rigidity to provide the desired pocket performance features. Non-limiting examples of pocket performance features include guiding the ball into the pocket during catching/scooping of the ball, guiding the ball out of the pocket during shooting, cradling the ball, pocket area rigidity, pocket area stability, and/or pocket area durability.

Figure 34:
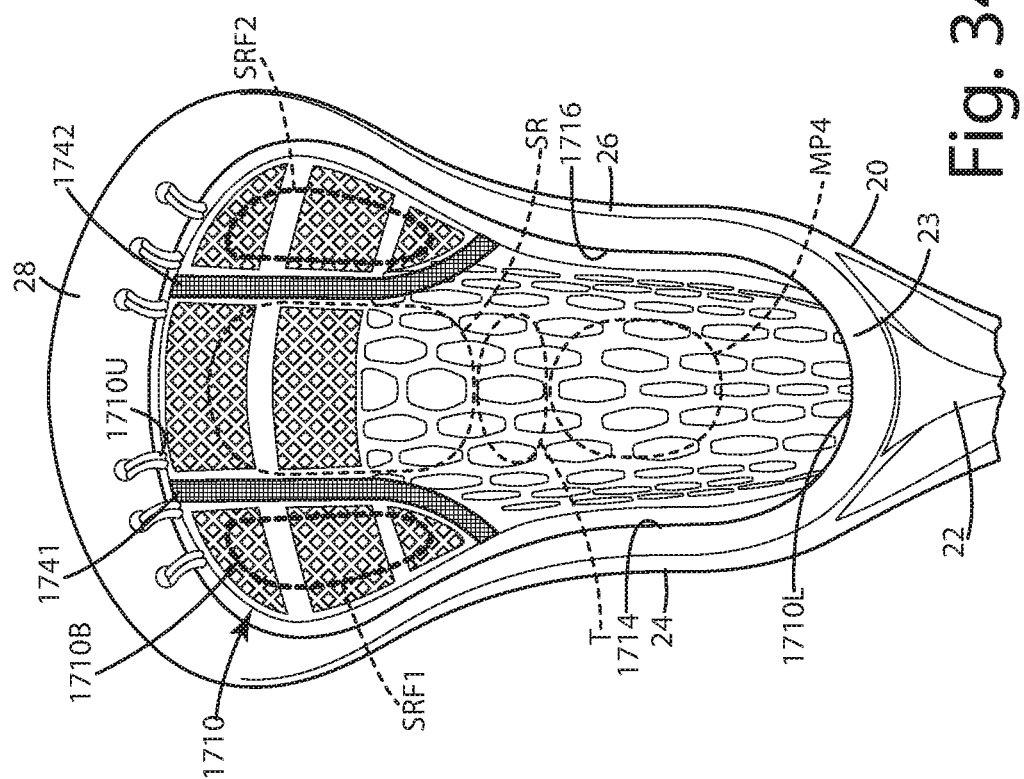
FIG. 34 is a is a front view of the lacrosse pocket of the fourth alternative embodiment illustrating different components thereof.

As shown in FIG. 34, the lacrosse pocket body 1710B generally includes several different regions, including a middle pocket MP4 which transitions at transition T to a shooting ramp SR. The shooting ramp SR is disposed between knitted or weaved runners 1741 and 1742. When the lacrosse pocket body 1710B is formed from a unitary textile material, as illustrated in FIG. 34, the runners 1741 and 1742 are integrally formed with the unitary textile material. In contrast to the lacrosse pocket 1310 of the current embodiment, the lacrosse pocket 1710 includes fused areas, which in the present example forms the runners 1741 and 1742. The remaining areas of the lacrosse pocket 1710, such as the middle pocket MP4, transition T, shooting ramp SR, and/or shooting ramp flanks SRF1 and SRF2, optionally remain unfused.

The unitary textile material forming the lacrosse pocket body 1710B includes a plurality of strands, at least a portion of which are formed from a fusible material, such as a thermoplastic material. A fusing treatment can be applied to specific areas of the lacrosse pocket body 1710B, such as the area forming the runners 1741 and 1742, to cause the thermoplastic strands to melt and/or soften. The melted and/or softened thermoplastic strands at least partially spread over adjacent unmolten/unsoftened strands and/or intermingle with adjacent molten/softened strands. The fused pocket areas are formed as the melted/softened material solidifies.

The pocket 1710 can be formed from a textile material constructed according to any of the embodiments described herein, for example the current or the third embodiments. One or more of the strands used to knit or weave the pocket textile material may be a fusible strand that includes a fusible thermoplastic polymer material, non-limiting examples of which include polyurethane, nylon, polyester, polyolefin, and polyamide. The fusible strands may be formed from a single, fusible material or multiple layers of materials in which an outer layer is a fusible material. For example, the fusible strands can include a fusible material layer surrounding an interior strand material, which may or may not be fusible, in a core-sheath type configuration. In another example, a strand or strip of fusible material may be applied to a strand made from a non-fusible material. Following a fusing treatment, the fusible strand material melts and/or softens to form a "molten" material that at least partially surrounds the non-fusible material, forming a coated or partially coated strand.

Optionally, the fusible strand may be formed entirely of a thermoplastic polymer material or include a thermoplastic polymer coating. The thermoplastic polymer coating may be applied using any known technique, non-limiting examples of which include co-extrusion, dip coating, and spray coating. Optionally, the thermoplastic polymer coating is a reactive coating material that exhibits thermoplastic properties prior to curing and thermosetting properties after it has been exposed to curing conditions. Such a reactive coating exhibits thermoplastic properties below a certain temperature, allowing the material melt/soften and fuse with adjacent strands. Following a curing treatment, the reactive coating cures and to a material with thermoset properties, such as by forming cross links, for example. The curing treatment can include heating the material to a second temperature, higher than the first temperature at which the thermoplastic material melts and fuses. Optionally, the curing treatment includes increased temperature and pressure and/or the addition of a cross-linking agent. One non-limiting example of a reactive coating includes an acrylic acid copolymer and a cross-linking agent. Optionally, the reactive coating is a material available from BASF Corporation under the tradename ACRODUR®. In this manner, the fused pocket area may be thermoset, which can increase the hardness and/or stiffness of the fused pocket area.

Optionally, the fusible strand may be constructed from a first thermoplastic polymer with a first melting temperature and a second thermoplastics polymer with a second melting temperature that is less than the first melting temperature. The first and second thermoplastic polymers may be configured in a core-sheath type configuration or the second thermoplastic polymer may be provided as a strand or strip applied to the first. A heat-based fusing treatment can be applied heat the fusible strand to a temperature sufficient to melt the second thermoplastic polymer, but below the melting temperature of the first thermoplastic polymer. Further optionally, a fusible strand may be combined or twisted with a non-fusible strand or yarn to form a fusible yarn including such fusible strand.

Non-fusible material may include natural or synthetic materials that are incapable of fusing or may include a fusible material that is configured to not fuse during the prescribed fusing treatment. For example, the non-fusible material may having a higher melting point than the fusible material and thus not melt/soften during the prescribed fusing treatment.

The fused runners 1741 and 1742 can provide enhanced rigidity and generally taut structures to facilitate guiding a ball being shot from head 20, for example. The runners 1741 and 1742 can be constructed so as to extend from a region adjacent or forward of the middle pocket MP4 outward toward the scoop 28, as shown in FIG. 34. In another example, the runners 1741 and 1742 can be constructed as shown in FIG. 8 to extend from an upper portion 1710U to a lower portion 1710L of the pocket, optionally stopping short of that lower portion 1710L (not shown). Optionally, the runners 1741 and 1742 can be configured such that the fused strands are more rigid than the remainder adjacent portions of the pocket main body 1710B, which are not fused. This configuration can provide a more defined shooting ramp, also referred to as a ball channel, for the lacrosse ball to exit from the lacrosse head 20. Fusing certain pocket areas, such as the runners 1741, 1742, the shooting ramp SR, and/or the middle pocket MP4 may facilitate maintaining the three-dimensional shape of these pocket areas over time and optionally increase the reproducibility of each lacrosse pocket 1710.

Figure 35:
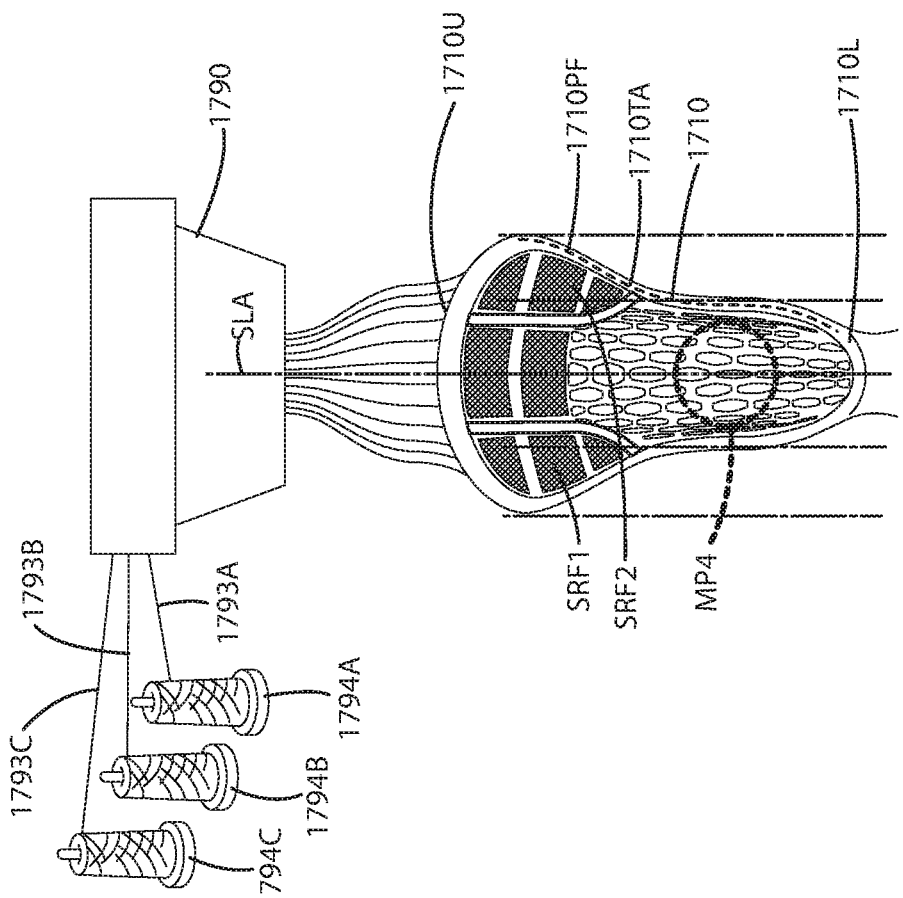
FIG. 35 is a schematic illustrating a portion of a strip of lacrosse pockets of the fourth alternative embodiment being manufactured with a knitting machine or weaving machine in a knitting process or weaving process.

Referring now to FIG. 35, a variety of single material and multi-layer fusible strand configurations may be used to form the pocket textile material. The pocket 1710 may be made using a knitting machine 1790 in the same manner as described above with respect to the knitting machine 1390 of the current embodiment, except that at least one of the strands 1393A, 1393B, and 1393C is replaced with a single material or multi-layer fusible strand. In one example, all three of the strands 1793A, 1793B, and 1793C are in the form of a single material or multi-layer fusible strand, or a combination of single material and multi-layer fusible strands. In another example, one or more of the strands 1793A, 1793B, and 1793C is in the form of a fusible strand while the remaining strand(s) are made from a non-fusible material, such as a natural material or a thermoset polymer. Optionally, the strands can include fusible strand and non-fusible strands, generally in the form of a yarn.

The knitting machine 1790 can be configured to knit the fusible strands throughout the textile material of the pocket 1710 or only into specific regions of the pocket 1710, such as the runners 1741 and 1742 of the present example. During a fusing treatment, the material from the fusible strands 1793A, 1793B, and/or 1793C intermingle with adjacent fusible strands and/or at least partially covers non-fusible strands to form a fused pocket portion. Optionally, lacrosse pocket 1710 can be formed in a manner similar to that described above for the automated pocket assembly machine 1590 of the second embodiment, except that at least one of the strands 1593A and/or 1594B is replaced with a fusible strand and/or yarn of fusible and non-fusible strands, as described above.

When a combination of fusible and non-fusible strands is used, the thermoplastic material of the fusible strands and the material for the non-fusible strands can be selected to be compatible such that the melted thermoplastic materials is capable of bonding to the non-fusible strands when cooled. Optionally, the thermoplastic material of the fusible strands may not be compatible with the non-fusible strands such that little to no bonding between the cooled thermoplastic material and the adjacent non-fusible strands occurs. In this example, the cooled thermoplastic material bonds to the thermoplastic material of adjacent fusible strand portions. The knit or weave pattern of strands can be configured to account for the compatibility between the thermoplastic material of the fusible strands and the non-fusible strands. Joining fusible and non-fusible materials can facilitate securing the materials together, thereby imparting stretch-resistance and/or stiffness to the fused pocket portion. Joining fusible and non-fusible materials can also decrease the unraveling of knitted or woven strands, which can decrease stretching of the fused pocket portion and increase the lifetime of the pocket textile material.

Referring now FIGS. 71 and 72, the pocket textile material can include strands 1791 and 1792 that are twisted in a clockwise or counterclockwise direction with a spinner in a manner similar to that described above for the third embodiment of FIGS. 63-68 to form a hybrid yarn. Strands 1791 and 1792 have different physical properties that can be twisted together to form a hybrid spun ply 1770S. In one embodiment, strand 1791 is a single material fusible strand that is twisted counterclockwise with a non-fusible material strand 1792 to form a fusible spun ply 1770S. Optionally, the strand 1791 is a multi-layer fusible strand. While FIGS. 71 and 72 are discussed in the context of a counterclockwise twisted ply 1770S and a clockwise twisted pocket strand 1775Z, it will be understood that different twist directions and different numbers of strands can be utilized, depending on the application.

Figure 37:
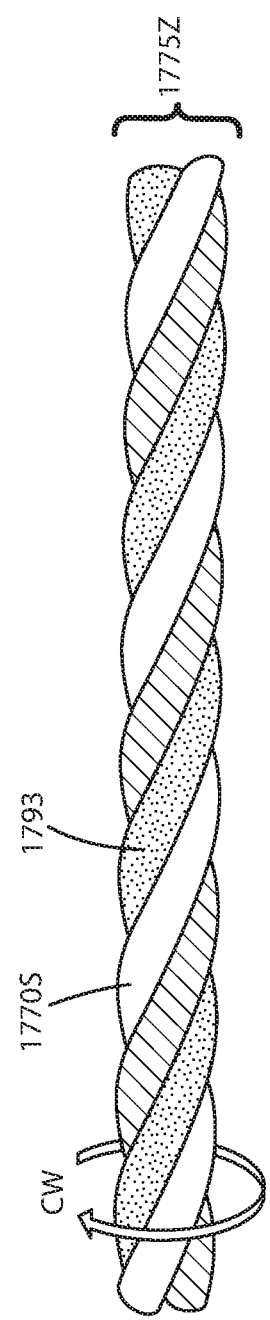
FIG. 37 is a side view of the hybrid ply of the lacrosse pocket twisted in a clockwise direction with a third strand to form a type of pocket strand.

With reference to FIG. 37, the fusible spun ply 1770S can be twisted in a clockwise manner with a third strand 1793 to form a hybrid pocket strand 1775Z for use in knitting the lacrosse pocket 1710. When the hybrid pocket strand 1775Z includes one or more fusible strands, the hybrid pocket strand may be referred to as a fusible pocket strand 1775Z. The third strand 1793 can be a single material or multi-layer fusible strand that is the same or different from the fusible strand 1791. During a fusing treatment, the material of the fusible strand 1791 from the fusible spun ply 1770S and the fusible third strand 1793 can intermingle and/or cover at least a portion of the non-fusible strand 1792, forming a fused pocket strand 1775Z. The fusible pocket strand 1775Z can intermingle and/or surround adjacent fusible pocket strands 1775Z to form a fused pocket portion. Optionally, both the strands 1791 and 1792 of the fusible spun ply 1770S can be in the form of a single material and/or multi-layer fusible strand while the third strand 1793 is formed from a non-fusible material. In another example, all three of the strands 1791, 1792, and 1793 forming the fusible pocket strand 1775Z are in the form of a fusible strand.

Figures 38, 39:
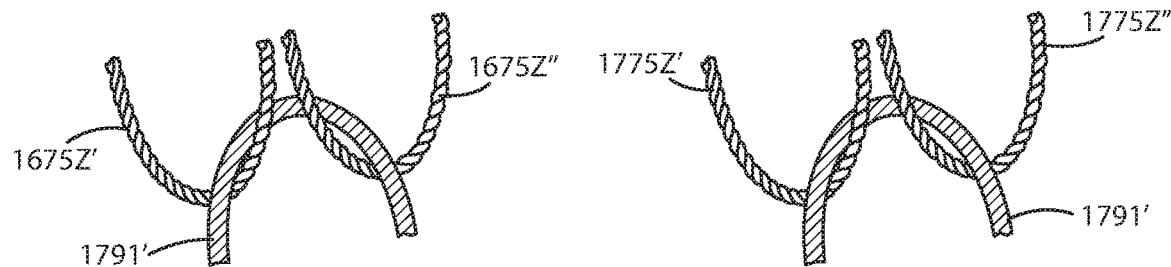
FIG. 38 is a side view of a pair of first ply loops of the lacrosse pocket joined with by a third strand.
FIG. 39 is a side view of a pair of hybrid ply loops of the lacrosse pocket joined with by a third strand.

Referring now to FIGS. 38-3974, fusible strands can also be provided in the pocket textile material to join adjacent strands. FIG. 38 illustrates a configuration in which fusible strand 1791', which is similar to the fusible strand 1791 of FIG. 36, joins adjacent loops 1675Z' and 1675Z" of the pocket strand 1675Z of FIG. 30 of the current embodiment. The thermoplastic material of the fusible strand 1791' and the materials of the pocket strand 1675Z may be selected so as to be compatible for bonding following a fusing treatment. Optionally, the thermoplastic material of the fusible strand 1791' and the materials of the pocket strand 1675Z may not be compatible. In this configuration, following a fusing treatment, the thermoplastic material of the fusible strand 1791' may bond with itself and material from adjacent fusible strands 1791'.

FIG. 39 illustrates a configuration in which fusible strand 1791' joins adjacent loops 1775Z' and 1775Z" of the fusible pocket strand 1775Z of FIG. 37. Following a fusing treatment, the thermoplastic material of the fusible strand 1791' intermingles and bonds with the thermoplastic material of the fusible strands used in forming the fusible pocket strands 1775Z. Optionally, when the fusible pocket strands 1775Z', 1775Z" include fusible strands 1791 and 1793, the thermoplastic material from the fusible strand 1791, fusible strand 1791', and the third fusible strand 1793 can intermingle and bond with one another. In this configuration, the thermoplastic material of the fusible strands 1791, 1791', and 1793 are compatible with one another, and optionally compatible with the non-fusible strand 1792 of the pocket strand 1775Z. The thermoplastic material of each of the fusible strands 1791, 1791', and 1793 may be the same or different from each other.

Figure 40:
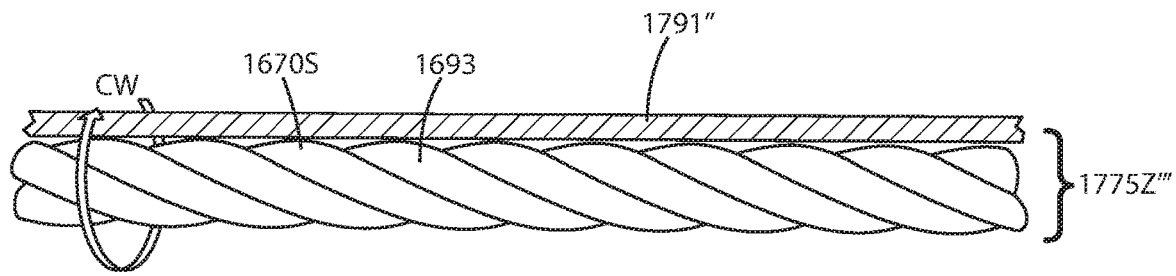
FIG. 40 is a side view of the hybrid ply of the lacrosse pocket twisted in a clockwise direction with a third strand and adjoined with a fourth strand to form a type of pocket strand.

Referring now to FIG. 40, another configuration of a fusible pocket strand 1775Z''' is illustrated. The fusible pocket strand 1775Z''' can include the ply 1670S of FIG. 29 twisted with the third strand 1693 of FIG. 30. One or more fusible strands 1791" is applied to the twisted pocket strand 1775Z''' along at least a portion of its length. Following a fusing treatment, the thermoplastic material of the fusible strand 1791" melts into and around the pocket strand 1775Z''' and bonds with adjacent portions of the strands forming the fusible pocket strand 1775Z"'. In this configuration, the melted thermoplastic material facilitates bonding between the strands 1691, 1692, and 1693 forming the fusible pocket strand 1775Z''' and/or coating of the strands.

Figure 36:
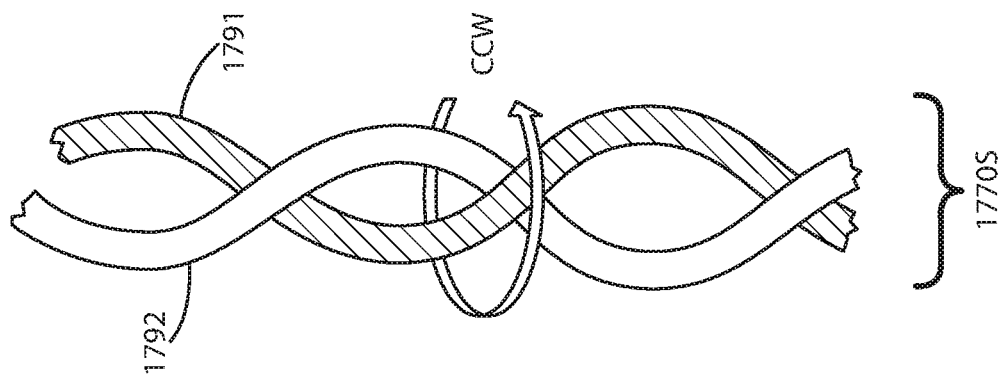
FIG. 36 is a side view of a hybrid ply of the lacrosse pocket formed with first and second individual strands loosely twisted in a counterclockwise direction.

In another example, the fusible strand 1791" may be applied to the fusible ply 1770S of FIG. 36, which has been twisted with the third strand 1793 of FIG. 37. Following a fusing treatment, the fusible strand 1791" may intermingle and bond with melted portions of adjacent fusible strands 1791 and/or 1793. The fusible strand 1791" in this configuration may also bond with and/or provide a coating for adjacent portions of the non-fusible strand 1792.

In another example, a fused pocket area may be formed using fusible monofilament strands instead of, optionally in combination with, the fusible or non-fusible strands of the plies and yarns described above. A monofilament strand can be knit or woven into the unitary textile material forming the pocket body 1710B as an individual strand, in contrast to strands that are first combined to produce a yarn and then the yarn is knit or woven to form the pocket body 1710B. The fusible monofilament strands may be used to form various pocket areas of the pocket body 1710B or join particular pocket areas with adjacent portions of the pocket body 1710B or head 20. Optionally, combinations of monofilament strands and other types of strands, such as plies or yarns, can be knitted/woven together to form different areas of the pocket body 1710B.

The monofilament strands may be formed by extrusion of a fusible polymeric material. The polymer materials forming the fusible monofilament strand and the non-fusible strand which the fusible monofilament strand is knit or woven with may include compatible materials capable of bonding to each other when the fusible monofilament polymer material cools following a fusing treatment. Optionally, the polymer materials forming the fusible monofilament strand and the non-fusible strand may be incompatible materials such that only portions of the fusible monofilament strand in contact with other portions of the fusible monofilament strand may bond.

In one example, a fusible monofilament strand may be knitted/woven with other monofilament strands to form a pocket area that is to be fused, such as the runners 1741, 1742, the middle pocket MP4, and/or the perimeter flange 1710PF. A fusing treatment produces a fused pocket area formed of fused monofilament strands. Optionally, a fusible monofilament strand may be knitted/woven with other types of strands, such as the pocket strands 1675Z of FIG. 30 of the current embodiment or the pocket strands 1775Z of FIG. 37, to form a pocket area or to join different pocket areas to one another or to the lacrosse head 20. Following a fusing treatment, the melted fusible monofilament can intermingle and/or cover at least a portion of the adjacent strand, whether it be a monofilament strand, spun ply, yarn, or other type of strand.

In another embodiment, the monofilament strand may be a non-fusible strand that is knitted/woven with any of the fusible strands described above, such as the fusible strands 1791, 1791', 1791", hybrid spun ply 1770S, and hybrid pocket strand 1775Z, and then subjected to a fusing treatment to form a fused pocket area.

Figure 41:
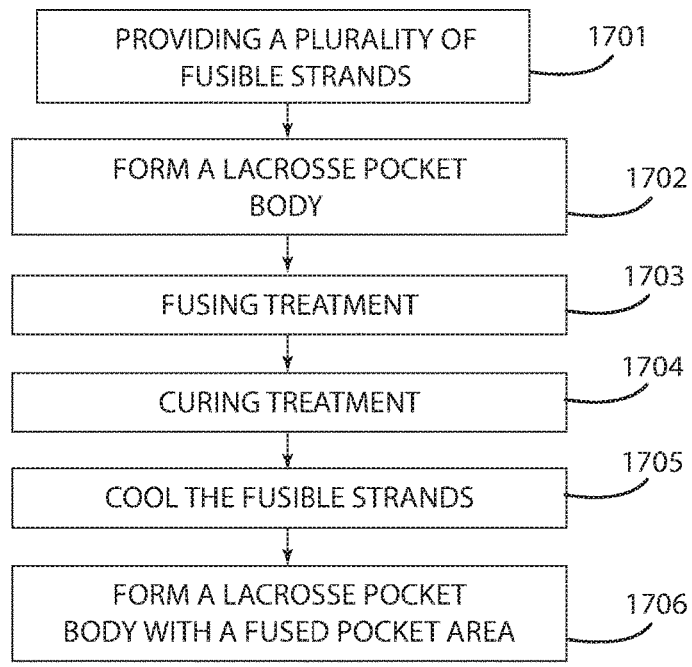
FIG. 41 is a flow diagram showing an exemplary method of manufacturing a lacrosse pocket with a fused pocket area according to the fourth alternative embodiment.

A method of forming a lacrosse pocket 1710 with a fused pocket area is shown in FIG. 41. The method can begin at 1701 with providing a plurality of fusible strands. The fusible strands can be a single material or multi-layer strands according to any of the embodiments described herein. The fusible strand may be formed entirely of a thermoplastic polymer material or include a thermoplastic polymer coating. The thermoplastic polymer coating may be applied using any known technique, non-limiting examples of which include co-extrusion, dip coating, and spray coating.

In step 1702, the lacrosse pocket 1710 is formed using the fusible strands. The fusible strands may be knitted or woven throughout the entire pocket body 1710B or only portions of the pocket body 1710B, such as the runners 1741, 1742. The lacrosse pocket 1710 can be formed using an automated pocket assembly machine to form a pocket body 1710B having a predefined, three dimensional, concave shape, including a lower pocket portion, an upper pocket portion and a middle pocket portion according to any of the methods described. The automated pocket assembly machine may use multiple different strands and/or knit/weave patterns to construct the pocket body 1710B according to any of the embodiments described herein, such as the knitting machines 1390 and 1790 described above. For example, as described above with respect to the current embodiment, the automated pocket assembly machine can be configured to construct a pocket body having regions with different physical properties based on the knit pattern. Optionally, step 1702 of forming the lacrosse pocket body 1710B may include integrally molding the lacrosse pocket 1710 into lacrosse head 20 according to the current, first alternative and second alternative embodiments.

At step 1703, at least the portions of the pocket body 1710B that are to be fused are exposed to a fusing treatment. A fusing treatment can include any treatment capable of melting and/or softening the fusible strands to a degree sufficient to allow the thermoplastic material to intermingle with adjacent material and/or cover adjacent strands based on the desired fused pocket area. Non-limiting example of a fusing treatment includes the application of heat and/or a chemical treatment. The fusing treatment may be applied for a predetermined period of time based on the treatment, the materials to be fused, and/or the desired degree of fusing.

The fusing treatment can be applied to either the entire pocket body 1710B or directed or limited to those areas of the pocket body 1710B to be fused. Optionally, the fusing treatment is directed or limited to those areas of the pocket body 1710B including fusible strands. The fusing treatment at step 1703 is configured to fuse a plurality of fusible strands in one or more regions of the pocket body 1710B to form at least one fused pocket area while the remaining regions of the pocket body 1710B remain unfused. The unfused pocket area may remain unfused because the strands in this region do not include a fusible material, the fusing treatment was not applied to this region, and/or the region was masked or protected from the fusing treatment. The fusing treatment may be applied to a pocket body 1710B having generally uniform physical properties to provide the pocket body 1710B with one or more fused pocket areas having different physical properties from the adjacent unfused pocket areas. For example, the fused pocket area can be less elastic, more rip resistant, more durable, more abrasion resistant and/or less flexible from the remaining portions of the pocket forming the unfused pocket areas.

In another example, the fusing treatment may be applied to form fused pocket areas corresponding to one or more defined regions of the pocket body 1710B. As described above with respect to the current embodiment, the strands and knitting process used to form the pocket body may be configured to provide regions defined by mechanical and/or physical properties that are different from the adjacent portion of the pocket body, examples of which include the runners, the middle pocket, and/or the perimeter flange of the pocket body. The fusing treatment may be applied to fuse the fusible strands in one or more of the defined pocket regions, such as the runners 1741, 1742, the middle pocket MP4, and/or the perimeter flange 1710PF, to form fused pocket areas in the regions, or any other individual component described herein, for example a bullseye opening, a joint element, a vertical element, etc. The adjacent regions of the pocket body 1710B may remain unfused.

The fusing treatment may be heat or chemical treatment based. Heat can be applied to the pocket body 1710B through convection and/or radiation. In one example, one or more heating elements can be brought into position adjacent the areas to be fused in order to melt/soften the thermoplastic material of the fusible strands. In another example, heated air can be directed toward the areas to be fused. Optionally, the areas to be fused can be heated using a heat lamp or laser heater to heat the desired areas sufficiently to cause melting/softening of the thermoplastic material of the fusible strands. The time and temperature of the heat treatment may be based on the materials to be fused and/or the desired degree of fusing.

A chemical treatment can be applied to either to the entire pocket body 1710B or optionally directed or limited to those areas of the pocket body 1710B to be fused. The chemical treatment can be applied by dipping, spraying, or painting the chemical treatment onto the desired areas of the pocket body 1710B. In one example, the chemical treatment is in the form of a solvent capable of softening the thermoplastic material and producing a solvent weld or solvent fusion between the softened material of adjacent fusible strands. The application, type, and amount of solvent, as well as the duration of time that the strands are exposed to the chemical treatment may be based on the materials to be fused and/or the desired degree of fusing.

When the pocket body 1710B is being integrally molded with the lacrosse head 20, the fusing treatment can optionally occur while the pocket body 1710B is supported on a mold portion. For example, when the lacrosse pocket 1710 is integrally molded with the lacrosse head 20 using the mold 1380 of FIGS. 3-5, mold portion 1380C, the fusing treatment may be applied to the desired portions of the pocket body 1710B. As described above with respect to the current embodiment, the central mold portion 1380C can be in the shape of a convex, upwardly extending bulge having a three-dimensional shape that mimics the desired or intended roundness, three-dimensional contour, and/or apex of the finished pocket. The bulging mold surface also can be shaped three dimensionally to mimic the longitudinal and lateral curvatures and angles of the shooting ramp SR. Further, the bulging mold surface can mimic the convex and/or planar shapes of respective shooting flanks adjacent the shooting ramp and/or ball channel of the pocket. Fusing the strands while the pocket body 1710B is on the central mold portion 1380C can facilitate forming the fused pocket area in the desired three-dimensional shape. Fusing certain pocket areas, such as the runners 1741, 1742, the shooting ramp SR, and/or the middle pocket MP4 may facilitate maintaining the three-dimensional shape of these pocket areas over time and optionally increase the reproducibility of each lacrosse pocket 1710 produced in this manner.

Heat can be selectively or fully applied to the pocket body 1710B while it remains on the central mold portion 1380C according to any of the methods described above using convection and/or radiative heating. Optionally, the central mold portion 1380C can include in-mold heaters configured to heat the desired areas of the pocket body 1710B. When the fusing treatment includes the application of a chemical treatment, the chemical treatment may be sprayed or painted onto the desired areas while the pocket body 1710B remains on the central mold portion 1380C.

Optionally, during the fusing treatment at 1703, portions of the lacrosse pocket body 1710B which are not to be fused are protected from the fusing treatment. In one example, a mask or protective cover is applied over the areas of pocket body 1710B which are not to be fused. When the fusing treatment at 1703 includes the application of heat, the areas of pocket body 1710B which are not to be fused may be protected by active cooling, such as the application of a cooling liquid or gas, or by the areas not to be fused with an insulating plate or member. Optionally, when the fusing treatment occurs while the pocket 1710 is supported on a mold, the mold may include cooling channels configured to cool the portions of the mold that overlap with the areas of pocket body 1710B which are not to be fused.

When the fusible strands include a reactive coating material that exhibits thermoplastic properties prior to curing and thermosetting properties after it has been exposed to curing conditions, as described above, the method can include an optional curing treatment at 1704. The curing treatment can include the application of heat, pressure, ultraviolet light, and/or treatment with a cross-linking agent. When the curing treatment includes heat, heat can be applied to those areas that are intended to be cured to increase the fusible strands to a temperature higher than the temperature used during the fusing treatment at 1703. The temperature used during the curing treatment corresponds to a temperature which cures the reactive coating material, causing the cured strands to exhibit thermoset properties. Heat can be applied according to any of the methods for applying heat described above with respect to the fusing treatment 1703. Pressure can be applied using the mold to apply pressure and/or vacuum pressure. Optionally, the curing treatment can include applying a cross-linking agent to the fusible strands before or after the fusing treatment and prior to the curing treatment painting, spraying, and/or dipping at least portions of the pocket body 1710B. Masks or protective covers can be used to guide the application of the cross-linking agent to only the desired areas.

The curing treatment can be applied to all of the fused areas of pocket body 1710B or only a portion of the fused areas. When the curing treatment is applied to all of the fused areas of pocket body 1710B, the pocket body 1710B that is ultimately formed will include unfused pocket areas and fused pocket areas exhibiting thermoset properties. When the curing treatment is applied to only a portion of the fused areas of pocket body 1710B, the pocket body 1710B that is ultimately formed can include unfused pocket areas, fused areas exhibiting thermoplastic properties, and fused areas exhibiting thermoset properties. Areas that are not to be cured can be protected from the curing treatment in a manner similar to that described above for the fusing treatment, including the use of a mask or protective cover and/or cooling of those areas not intended to be cured. Optionally, the cross-linking agent is only applied to those areas intended to be cured. A mask can be used to facilitate limiting application of the cross-linking agent to only the desired areas. A protective cover or mask and/or directed cooling can then be used to facilitate limiting the curing treatment to those areas of the pocket body 1710B that have been treated with the cross-linking agent.

The method can include a cooling or evaporation step at 1705 following the fusing treatment 1703 and the optional curing treatment 1704. When step 1703 includes a fusing treatment involving heat, the cooling at step 1705 may include active and/or passive cooling. Passive cooling includes removal of the heat source used in the fusing process at step 1703 and allowing the lacrosse pocket 1710 to rest and optionally come to room temperature. Active cooling includes the application of a cooling medium, such as a liquid or gas at a lower temperature than the fused pocket areas, to at least the fused areas of the pocket body 1710B. Optionally, a cooling body is applied to the pocket body 1710B. For example, when the pocket body 1710B is supported on a mold during the fusing treatment, as described above, the mold can include in-mold cooling channels to actively cool the pocket body 1710B.

Step 1705 optionally includes an evaporation process for facilitating removal of the solvent when the fusing treatment includes a chemical treatment. The facilitated evaporation process may begin after the strands have been exposed to the chemical treatment for a predetermined period of time. For example, the evaporation of a solvent used to soften the thermoplastic material may be facilitated using heat and/or a stream of gas. Optionally, the lacrosse pocket 1710 is exposed to a vacuum to facilitate removal of the solvent after the predetermined exposure period expires.

The fusing treatment step 1703 and cooling step 1705 may be performed once to fuse all of the desired areas of the pocket body 1710B. Optionally, steps 1703 and 1705 are repeated one or more times for each fused pocket area to be formed. For example, if the lacrosse pocket 1710 includes a fused runner pocket area and a fused middle pocket area, step 1703 and steps 1705 may be repeated sequentially to form each of the fused pocket areas. It is also within the scope of the invention, that each fused pocket area is fused using a different fusing treatment. Optional curing treatment step 1704 may be performed one or more times to provide the desired pattern of fused, unfused, cured, and uncured areas of lacrosse pocket body 1710B.

Following solidification of the thermoplastic material of the fusible strands, and optional thermosetting, at step 1706 the lacrosse pocket 1710 is formed having at least one fused pocket area, and optionally at least one fused pocket area exhibiting thermoset properties. If the lacrosse pocket 1710 was not integrally molded with the lacrosse head 20, the lacrosse pocket formed at step 1706 may be secured to the lacrosse head 20 according to any of the methods described herein.

Optionally, steps 1701 and 1702 of the method may be reversed with the lacrosse pocket body being formed from strands that are not fusible. Providing a plurality of fusible strands may include applying a fusible coating to strands in the desired areas of the already formed lacrosse pocket body. The fusible coating may be applied by dipping, spraying, and/or painting at least some of the strands of the lacrosse pocket body. In one example, following formation of the lacrosse pocket body 1710B at 1702, the entire lacrosse pocket body 1710B is dipped in a fusible material. In another example, the fusible material may be applied to only those portions of the lacrosse pocket body 1710B to be fused. This may include spraying or painting the fusible material onto the strands in the desired pocket areas. Optionally, a mask may be used to limit application of the fusible material to only the desired areas. The fused pocket areas may then be formed according to the steps 1703 to 1706, as described above.

The method of FIG. 41 produces a pocket body 1710B having one or more fused areas adjacent one or more unfused areas. The interface between the fused areas and the unfused areas may or may not be well defined, as it is understood that there may be some "bleeding" during the fusing treatment step 1703. The pocket body 1710B has a three dimensional, concave contour in places and in other places may be quite linear. The interface between the fused areas and the unfused areas may be curved or linear, based on the contour of the pocket body 1710B at the interface.

Figure 42:
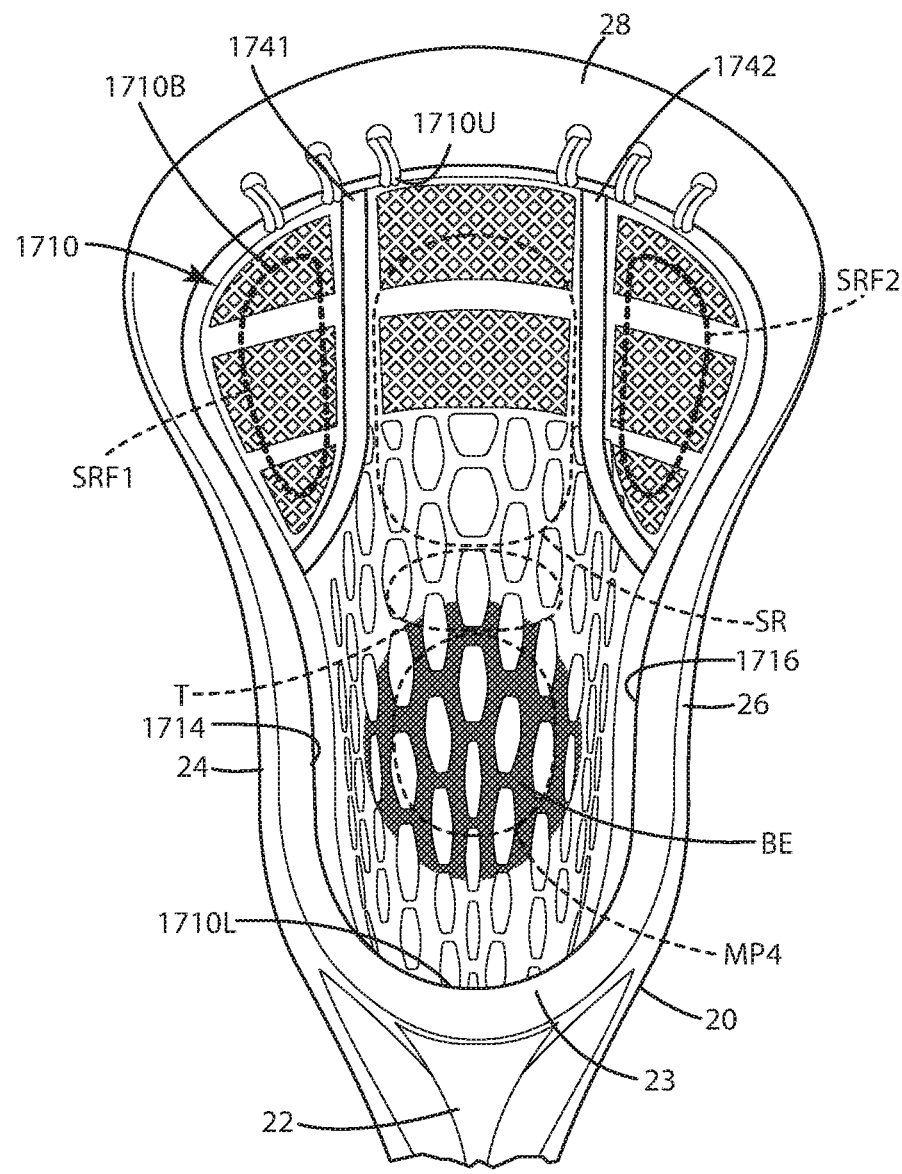
FIG. 42 is a front view of the lacrosse pocket of the fourth alternative embodiment having a fused bullseye pocket area.

Referring now to FIGS. 42-43, an example of using the method of FIG. 41 to form a fused pocket area is illustrated. The lacrosse pocket 1710 in FIG. 42 is shown having a fused pocket area corresponding to the area in which it is desired for the ball to rest, also called a bullseye area BE. The fused bullseye area BE overlaps with the middle pocket portion MP4. Optionally, the fused bullseye area overlaps with a different pocket portion, such as a high pocket area, as desired. Fusing the strands forming the bullseye area BE can facilitate maintaining the three-dimensional shape of the bullseye area BE over time. During use, the material forming a traditional pocket may stretch, causing the area in which the ball comes to rest to shift, resulting in a changing and unpredictable ball rest position. Fusing the bullseye area BE may increase the stability of the shape and/or location of the bullseye area BE overtime, producing a more predictable ball rest position. Fusing the bullseye area BE may also increase reproducibility of the bullseye area in each lacrosse pocket produced.

The fused bullseye area BE may be formed according to the method of FIG. 41 described above. As illustrated in FIG. 43, a mask M may be used during the fusing treatment to protect the portions of the pocket body 1710B which are not to be fused. At step A, the pocket body 1710B is supported on the lacrosse head 20 (as shown), and optionally on a pocket mold portion, such as the central mold portion 1380C described above. At step B, prior to the application of the fusing treatment, the mask M is applied to the pocket body 1710B. The mask M includes an opening corresponding to the bullseye area BE that is to be fused. In this manner, only the area corresponding to the bullseye area BE is exposed to the fusing treatment, which in this example includes the application of heat from heater 1797. Following the fusing treatment, at step C, the mask M is removed revealing the unfused areas of the pocket body 1710B surrounding the fused bullseye area BE.

The mask M may be configured to protect the remaining areas of the pocket body 1710B that are not meant to be fused, based on the nature of the fusing treatment. For example, when the fusing treatment includes heat, the mask M may include a heat reflective surface configured to reflect some or all of the heat applied to the pocket body 1710B. The heat reflective surface may be configured to reflect enough of the applied heat to prevent or minimize fusing and/or damage of strands in the portion of the body 1710B that is not to be fused. Optionally, the mask M includes an active cooling feature, such as liquid or gas cooling channels, which facilitates preventing or minimizing heating of the strands underneath the mask M. When the fusing treatment includes a chemical treatment, the mask M blocks application of the chemical treatment to the areas of the body underneath the mask M.

Figure 45:
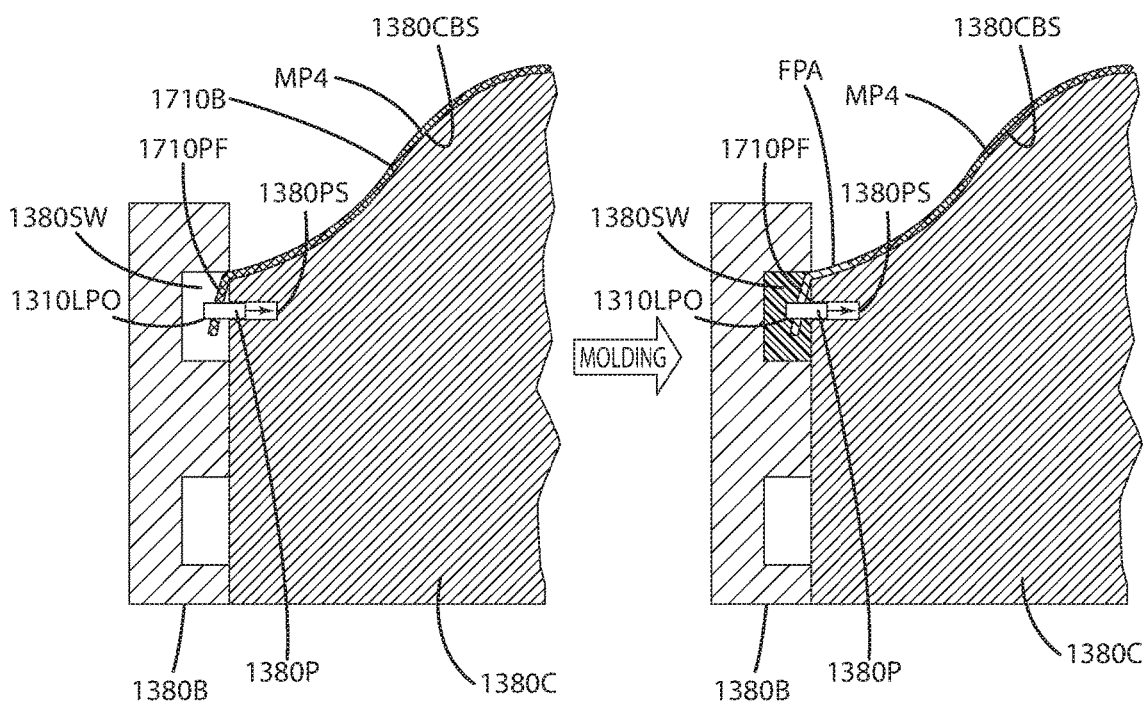
FIG. 45 is a flow diagram illustrating an exemplary process for molding a lacrosse head and forming a fused perimeter pocket area according to the fourth alternative embodiment.

Referring now to FIGS. 44-45, another example of using the method of FIG. 41 to form a fused pocket area is illustrated. As illustrated in FIG. 44, the pocket body 1710B includes a fused perimeter area FPA extending around the perimeter of the pocket body 1710B adjacent the scoop 28, sidewalls 24, 26, and the ball stop 23. Optionally, the fused perimeter area FPA extends only around a portion of the perimeter of the pocket body 1710B, such as the portion adjacent the scoop 28, for example. The fused perimeter area FPA may reinforce the connection between the pocket body 1710B and the adjacent portions of the lacrosse head 20, which may increase the durability of the lacrosse pocket 1710. The fused perimeter area FPA may reduce the likelihood that the pocket 1710 rips or tears out from the overmolded polymeric material from which the head 20 is constructed. The fused perimeter area, or any fused pocket area, also can be configured to be of a reduced or lesser thickness T11 (FIG. 48), from the ball facing interior surface to an opposing exterior surface, than the thickness T12 of the remaining portions of the lacrosse pocket. This can be due to the strands in the fused area melting and flowing onto interstitial spaces between strands, thereby decreasing the volume occupied by strands in the fused pocket area. As a result, the fused pocket area can decrease in thickness relative to the remaining portion, which might have no melting of its strands, in which case the strands retain their volume. With such fusing and compaction of the fused pocket area, that area can become less elastic than adjacent regions, and can better serve as a partially rigid support surface over which a lacrosse ball can roll.

As illustrated in FIG. 45, the fused perimeter area FPA can be formed during the molding process in which the pocket body 1710B is integrally molded with the lacrosse head 20, such as described above with respect to the current embodiment of FIGS. 4-5. As illustrated in step A of FIG. 45, the lacrosse body 1710B is placed adjacent the central mold portion 1380C with the perimeter flange 1710PF placed within the adjacent sidewall mold cavity 1380SW (shown), scoop mold cavity 1380SC, and base mold cavity 1380BA. At least the perimeter flange 1710PF includes fusible strands, optionally the entire pocket body 1710 includes fusible strands.

At step B, molten material is supplied to the mold cavities 1380SW, 1380SC, and 1380BA during the molding process to form the corresponding portions of the lacrosse head 20. The thermoplastic material of the fusible strands forming or included in the perimeter flange 1710PF may be configured to melt and/or soften from the heat released from the molten material during the molding process. The distance the fused perimeter area FPA extends from the lacrosse head 20 may be based on the thermoplastic material of the fusible strands and the temperature of the lacrosse body 1710B adjacent the mold cavities 1380SW, 1380SC, and 1380BA during the molding process. In some cases, the fused perimeter area FPA may barely be visible to the naked eye beyond the edge of the scoop 28, sidewalls 24, 26, and the ball stop 23. Optionally, additional heat is applied during the molding process to facilitate forming the fused perimeter area FPA. The additional heat may be supplied by a convective or radiative heat source or in-mold heaters provided in the central mold portion 1380C.

The thermoplastic material of the fusible strands of the perimeter flange 1710PF and the polymeric material from which the head 20 is constructed may be selected from compatible materials to facilitate intermingling of the thermoplastic material and the head molding material. The use of compatible materials may strengthen the connection between the embedded strands of the perimeter flange 1710PF and the head molding material within which the strands are embedded. Optionally, the embedded strands of the perimeter flange 1710PF may act as a fiber reinforcement for the polymeric material forming the head 20.

FIGS. 46-56 illustrate several, non-limiting examples of fused pocket areas that may be utilized with a lacrosse pocket. While the examples are illustrated in the context of a traditional mesh pocket, it will be understood that the example fused pocket areas may be used with any knit or woven lacrosse pocket pattern, including those patterns described herein. In addition, any of the exemplary fused pocket areas may be combined with one or more other fused pocket areas to provide the desired pocket performance features. As described above, the shape, dimensions, and location of the fused pocket area may be designed to increase the stability, inelasticity, structural rigidity and/or durability of particular areas of the lacrosse pocket. Optionally, the fused pocket area facilitates guiding the lacrosse ball in and/or out of the lacrosse pocket during catching, scooping, and/or throwing of the lacrosse ball. Optionally, the fused pocket area facilitates directing and/or maintaining the lacrosse ball within a desired resting or cradling position within the lacrosse pocket.

Figure 46:
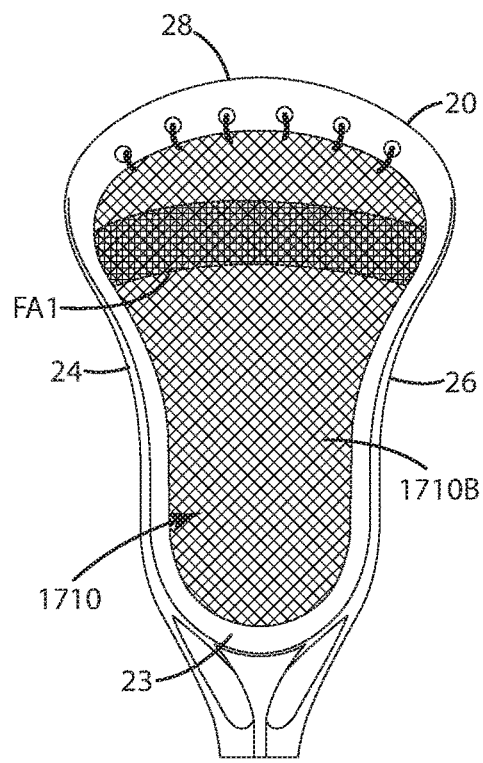
FIG. 46 is a front view of the lacrosse pocket of the fourth alternative embodiment having a fused ball release area.

FIG. 46 illustrates an example of a fused area FA1 corresponding to a ball release area extending between the sidewalls 24, 26 adjacent to the scoop 28. The fused area FA1 may generally correspond to the area in which the shooting strings are generally located. The dimensions of the fused area FA1 may be less than or greater than the dimensions of the area traditionally defined by the shooting strings. Optionally, the fused area FA1 overlaps with or is disposed between shooting strings, when present.

Figure 47:
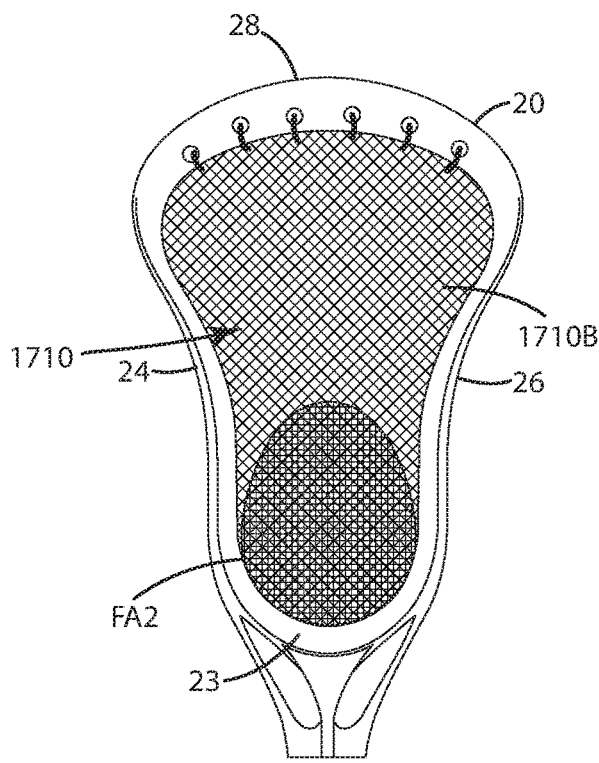
FIG. 47 is a front view of the lacrosse pocket of the fourth alternative embodiment having a fused ball pocket area.

FIG. 47 illustrates an example of a fused area FA2 corresponding to a ball pocket adjacent the stop 23. The shape and dimensions of the fused area FA2 may vary depending on the desired pocket performance. The fused area FA2 provides a ball pocket area having the desired three-dimensional shape which does not require the user to break-in the material to form a ball pocket. The fused area FA2 may also provide a ball pocket that is generally less elastic than the remaining portions of the pocket, that resists deformation and that retains its shape longer.

FIG. 48 illustrates an example of a pair of opposing fused areas FA3 defining a ball channel therebetween which guides the lacrosse ball into and out of the lacrosse pocket 1710. Each fused area FA3 extends from scoop 28 to the adjacent sidewall 24, 26. The shape, width, and length of each fused area FA3 may be selected as desired to define the ball channel. The fused areas FA3 may facilitate guiding the ball from its resting position in the ball pocket adjacent the stop 23 toward the release position adjacent the scoop 28 in a motion generally aligned with the longitudinal axis of the lacrosse head 20. Optionally, each fused area FA3 overlaps with a runner provided in the pocket body 1710B.

FIG. 49 illustrates an example of a fused area FA4 corresponding to an area adjacent the scoop 28. The fused area FA4 may be configured to provide increased durability to the portion of the pocket body 1710B adjacent the scoop 28, which may increase the lifespan of the lacrosse pocket 1710. The fused area FA4 may extend across the entire length of the scoop 28 (as shown) or only a portion of the length of the scoop 28, such as a central area of the scoop 28. The extent to which the fused area FA4 extends from the scoop 28 toward the stop 23 may vary as desired.

FIGS. 50-56 illustrate example fused areas in which areas adjacent the scoop 28 are fused while the area adjacent the stop 23, generally corresponding to the ball pocket area is unfused. The fused area patterns may be configured to aid in releasing the ball, guiding the ball in and out of the pocket, and/or increasing the stiffness and/or durability of certain areas of the lacrosse pocket 1710.

Figure 50:
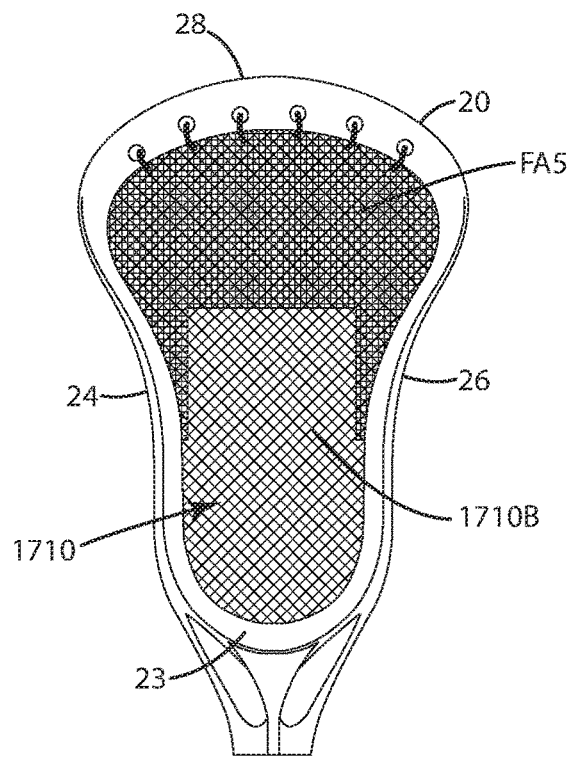
FIG. 50 is a front view of the lacrosse pocket of the fourth alternative embodiment having a fused extended ball release area.

With reference to FIG. 50, the fused area FA5 includes an area corresponding to a ball release area extending between the sidewalls 24, 26 adjacent to the scoop 28, a ball channel therebetween which guides the lacrosse ball into and out of the lacrosse pocket 1710, and the area adjacent the scoop 28 to provide increased durability to the portion of the pocket body 1710B adjacent the scoop 28.

Figure 51:
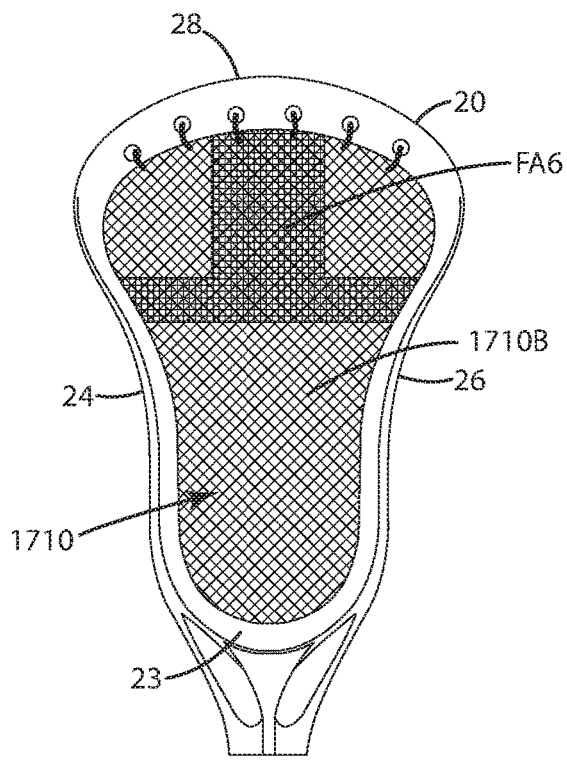
FIG. 51 is a front view of the lacrosse pocket of the fourth alternative embodiment having a fused "T" shaped pocket area

FIG. 51 illustrates a "T" shaped fused pocket area FA6 which includes a fused area portion corresponding to a ball release area extending between the sidewalls 24, 26 adjacent to the scoop 28. The fused pocket area FA6 also includes a fused area portion extending from the scoop 28 to the fused ball release area which may facilitate guiding the lacrosse ball into the lacrosse pocket 1710 and/or increase the durability of the area adjacent the scoop 28. FIG. 52 illustrates a "T" channel fused pocket area FA7 having a portion similar to the fused pocket area FA6 and including additional fused area portions extending from the ball release area toward the stop 23 adjacent each of the sidewalls 24, 26. The additional fused area portions may define a channel pocket that facilitates guiding the ball into and out of the pocket.

The additional fused area portions adjacent the sidewalls 24, 26 optionally increase the durability of the connection between the lacrosse pocket body 1710B and the head 20.

Figure 53:
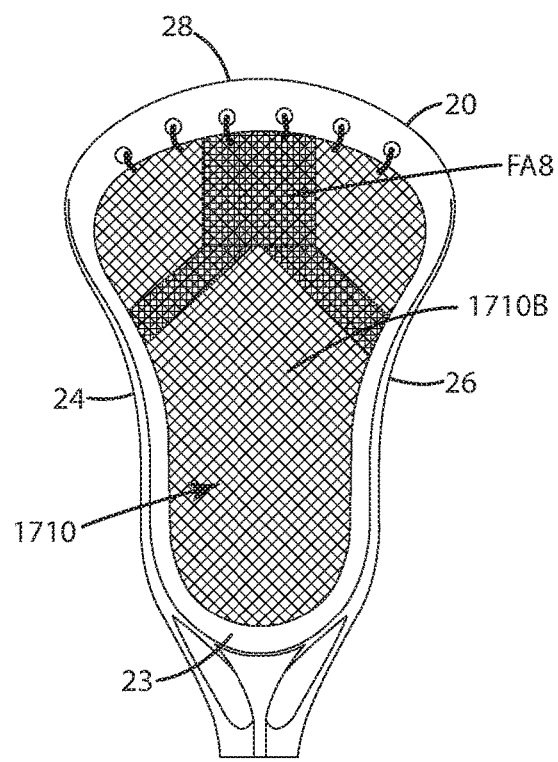
FIG. 53 is a front view of the lacrosse pocket of the fourth alternative embodiment having a fused "V" shaped pocket area.
Figure 55:
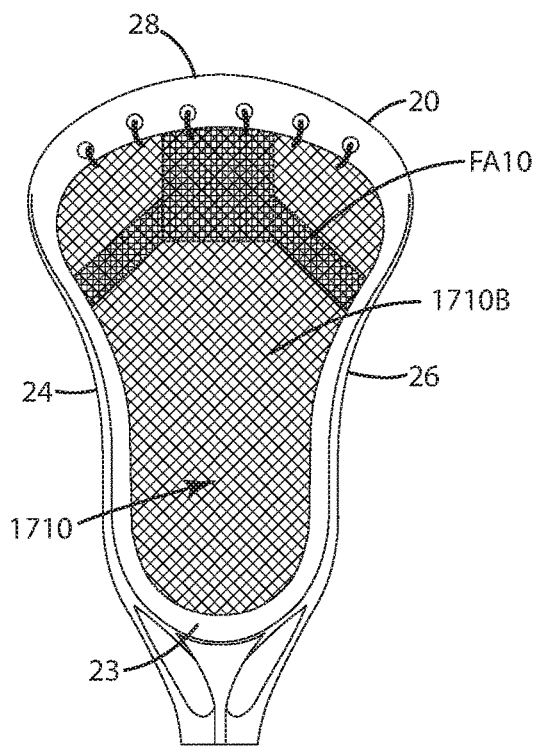
FIG. 55 is a front view of the lacrosse pocket of the fourth alternative embodiment having a fused "U" shaped pocket area.

FIG. 53 illustrates a "V" shaped fused pocket area FA8 and FIG. 55 illustrates a "U" shaped fused pocket area FA10 that is similar to the "T" shaped fused pocket area FA6 of FIG. 86. The differences in the overall shape and dimensions of the fused pocket areas FA6 of FIG. 51, FA8 of FIG. 53, and FA10 of FIG. 55 may provide the lacrosse pocket 1710 with different performance characteristics suited for different player preferences and/or different player positions.

Figure 54:
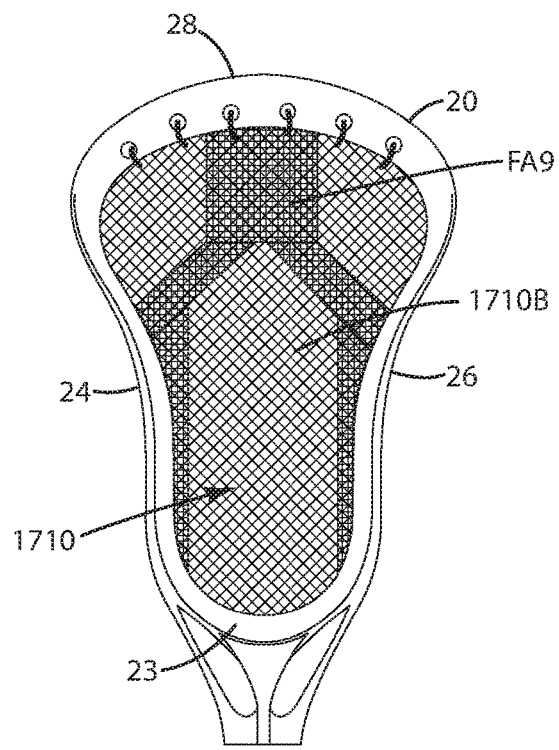
FIG. 54 is a front view of the lacrosse pocket of the fourth alternative embodiment having a fused "V" channel pocket area.
Figure 56:
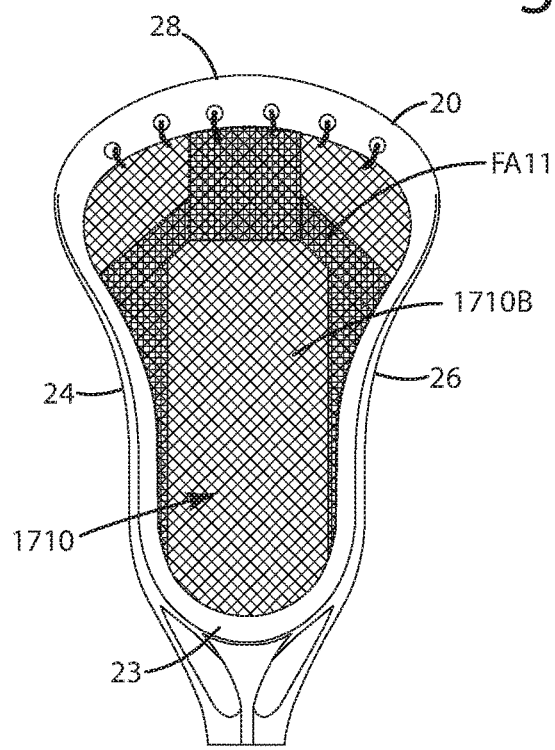
FIG. 56 is a front view of the lacrosse pocket of the fourth alternative embodiment having a fused "U" channel pocket area.

FIG. 54 illustrates a "V" channel fused pocket area FA9 having a portion similar to the fused pocket area FA8 of FIG. 53 and includes additional fused area portions extending from the ball release area toward the stop 23 adjacent each of the sidewalls 24, 26. FIG. 56 illustrates a "U" channel fused pocket area FA11 having a portion similar to the fused pocket area FA10 of FIG. 55 and includes additional fused area portions extending from the ball release area toward the stop 23 adjacent each of the sidewalls 24, 26. The differences in the overall shape and dimensions of the channel fused pocket areas FA7 of FIG. 52, FA9 of FIG. 54, and FA11 of FIG. 56 may provide the lacrosse pocket 1710 with different performance characteristics suited for different player preferences and/or different player positions.

Optionally, rather than forming the pocket body 1710B from strands which fuse with adjacent strands during a heat treatment, the pocket body 1710B can be formed from strands which exhibit different levels of thermal shrinkage. A strand with a relatively low shrinkage can be combined with a strand having a relatively high shrinkage to form the entire pocket body 1710B or only portions of the pocket body 1710B. At least portions of the pocket body 1710B can then be thermally treated to heat set the relatively high shrinkage strands to increase a tightness of the pocket areas including the heat set, relatively high shrinkage strands. Increasing the tightness of the knit/weave in these pocket areas can increase the dimensional stability of the pocket area, decrease the stretch or give of the pocket area, and/or increase the durability of the pocket area. The pocket body 1710B can be formed and treated to provide one or more heat set pocket areas according to any of the patterns of fused pocket areas described above. The heat set pocket areas can be more tightly knitted/woven while the surrounding non-heat set pocket areas are more loosely knitted/woven. The heat set, more tightly knitted/woven pocket areas can be selected to provide the lacrosse pocket 1710 with the desired performance characteristics.

Some degree of thermal shrinkage can be useful for creating a tightly constructed pocket body. Tightly constructed knits/weaves can sometimes be more dimensionally stable than loosely constructed knits/weaves. When the pocket body 1710B is made from strands that have a relatively high shrinkage, the body can be heat treated to shrink the heat setting strands and tighten the knit/weave, increasing the dimensional stability of the pocket body 1710B. During shrinkage, at least one dimension of the strand, such as a length of the strand, decreases. However, there are some materials that offer benefits in forming the pocket body 1710B, such as materials with increased strength or lightness, which have a relatively low shrinkage and will not shrink as desired during a heat treatment, thus limiting the tightness of the body formed with these materials. A strand with a relatively low shrinkage can be combined with a strand having a relatively high shrinkage to form a pocket body 1710B that takes advantage of the properties of the relatively low shrinkage material while utilizing the heat setting properties of the relatively high shrinkage material to tighten the pocket body as desired.

Referring again to FIGS. 36 and 37, the pocket textile material can include strands 1791 and 1792 that are twisted in a clockwise or counterclockwise direction with a spinner in a manner similar to that described above for the third embodiment of FIGS. 63-68. Strands 1791 and 1792 have different physical properties that can be twisted together to form a hybrid spun ply 1770S, in this embodiment a hybrid including a relatively high shrinkage strand 1791 and a relatively low shrinkage strand 1792. Optionally, the relatively high shrinkage strand 1791 has a relatively low modulus while the relatively low shrinkage strand 1792 has a relatively high modulus. A relatively high shrinkage strand 1791 can be used to form a hybrid pocket strand 1775Z or used to adjoin adjacent strands, as illustrated in FIGS. 72-74. The relatively high shrinkage strand 1791 and relatively low shrinkage strand 1792 can be combined by forming plys and strands, as described above, or by knitting these strands.

As described above with respect to the current and fourth embodiments, the pocket and pocket body can include different components and regions that are constructed from strands of different materials having different properties. To create such a pocket, the knitting machine 1790 can be set up so that the different spools 1794A, 1794B and 1794C include appropriate amounts of continuous, elongated strands of a first material and at least one different second material, such as a relatively high shrinkage material and a relatively low shrinkage material. In some cases, the first material 1793A can be a relatively high shrinkage material while the second material 1793B and 1793C is a relatively low shrinkage material. The knitting machine 1790 can pull strands 1793A from the first cone or spool 1794A and construct at least one area of the pocket body 1710B with this plurality of strands. The knitting machine 1790 can separately pull the strands 1793B and 1793C of the second material off the cones or spools 1794B and 1794C, respectively, and interloop/weave certain ones of those strands with the strand 1793A. Thus, the strands in certain regions can be of one material, and can be interlooped/woven and connected directly with strands of the second material in predefined locations such that the knitting/weaving can be tightened by heat treatment.

Non-limiting examples of suitable relatively high shrinkage material includes polypropylene (PP), which also has a relatively low modulus. Optionally, polyethylene terephthalate (PET) is combined with the PP of the relatively high shrinkage material strand. Non-limiting examples of a relatively low shrinkage material includes ultra-high molecular weight polyethylene (UHMWPE), which also has a relatively high modulus. Additional examples of low shrinkage materials include carbon fibers, aramids (e.g. sold under the tradename TECHNORA), high strength PET, thermoset liquid-crystalline polyoxazoles (e.g. sold under the tradename ZYLON), and para-aramids (e.g. sold under the tradename TWARON). The combination of relatively high shrinkage, low modulus materials (e.g. PP) with relatively low shrinkage, high modulus materials (e.g. UHMWPE) takes advantage of the heat setting properties of the first material and the increased strength of the second material. A hybrid strand or interlooping/weaving provides for greater design choice in choosing the materials used to form the pocket body 1710B to provide the pocket body 1710B with the desired combination of physical and mechanical properties.

The method of FIG. 41 can be used to form one or more heat set pocket areas in a manner similar to that described above for forming the fused pocket areas. Rather than applying a fusing treatment at 1703, the pocket body 1710B can be heated to a temperature that causes the relatively high shrinkage material to shrink as desired to tighten the body in the heat set pocket area to form a pocket area that is tighter than areas which are not heat set. Heat may be applied according to any of the methods described above at step 1703. Heat may be applied selectively to the desired areas of the pocket body 1710B. Optionally, a mask or protective cover can be used to inhibit heat setting in areas where heating or shrinkage is not desired. The heat setting treatment may be applied to heat the relatively high shrinkage material strands in one or more of defined pocket regions, such as the runners 1741, 1742, the middle pocket MP4, and/or the perimeter flange 1710PF, to form tightened, heat set pocket areas in the regions. The strands in adjacent regions of the pocket body 1710B can remain unchanged, and thus these pocket areas remain untightened. The heat set areas can have a tighter knit/weave than the adjacent regions of the pocket body 1710B, which may allow for these areas to have less stretch, increased durability, and/or increased dimensional stability compared to non-heat set areas. Increased stretch in some of the non-heat set areas compared to the heat set areas may be desirable for some aspects of pocket performance. Following the heat treatment, the heat set strands can be cooled as described at step 1705.

Figure 57:
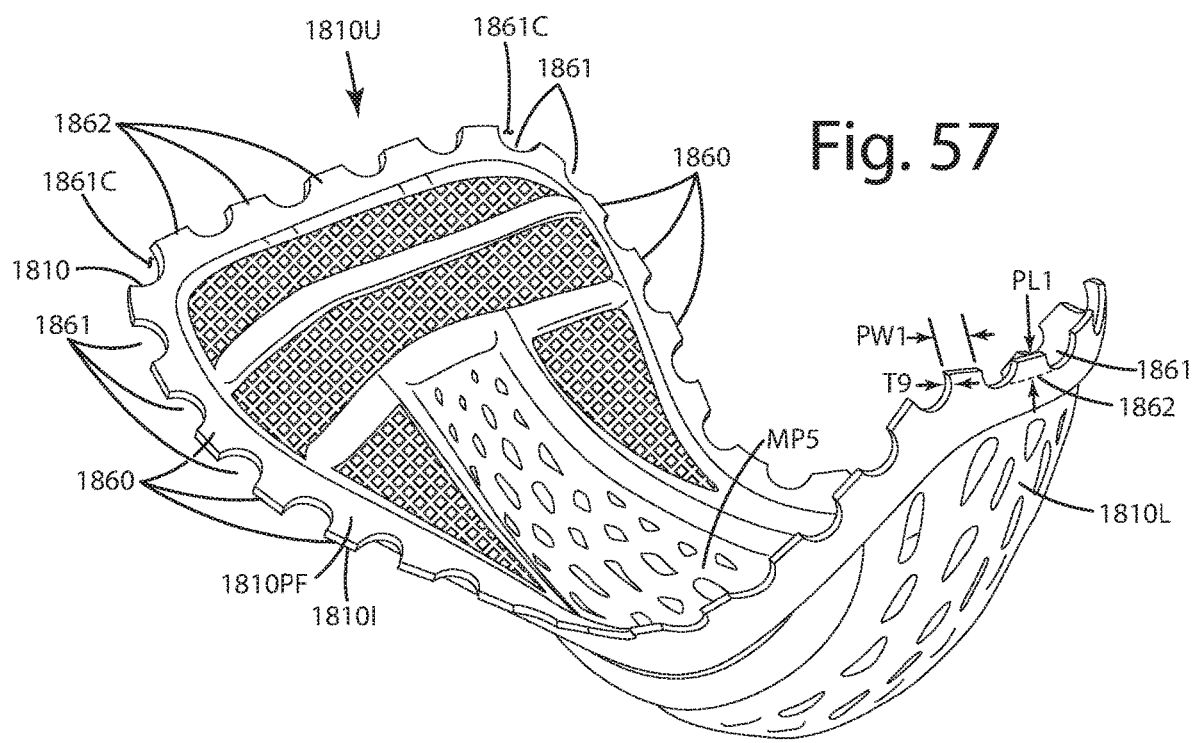
FIG. 57 is a side view of a lacrosse pocket of a fifth alternative embodiment including a perimeter flange having defined therein multiple voids.
Figure 58:
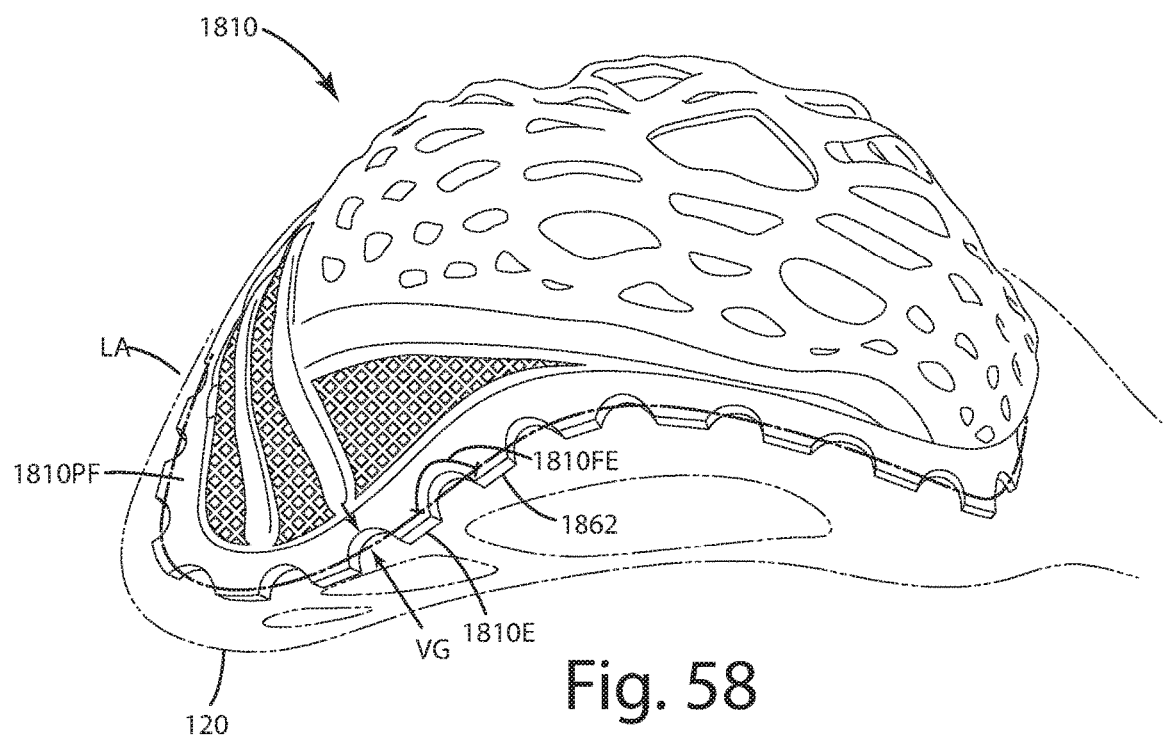
FIG. 58 is a bottom perspective view of the lacrosse pocket of the fifth alternative embodiment joined with a lacrosse head.
Figure 59:
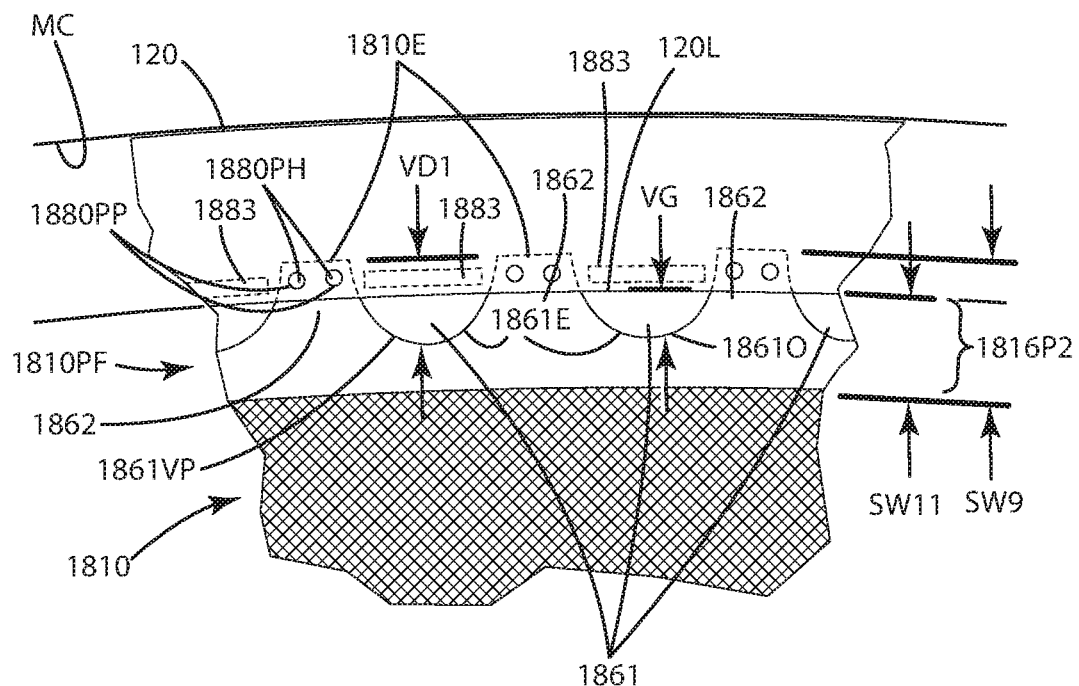
FIG. 59 is a side view of the lacrosse pocket of the fifth alternative embodiment with a perimeter flange in an unloaded state.

A fifth alternative embodiment of a lacrosse pocket is illustrated in FIGS. 57-59 and generally designated 1810. The pocket shown there is similar in structure, function and operation to the embodiments described above, for example, the current embodiment, with several exceptions. To begin, the fifth alternative embodiment of the lacrosse pocket and its components are constructed from a unitary textile material and is manufactured from strands, which like the embodiments above, can be in the form of threads, cables, yarn, fibers, filaments, cords and other strand-like elongated structures. Strands, however, optionally can exclude large diameter or dimension (greater than 1.0 mm, greater than 2.0 mm and/or greater than 3.0 mm) laces, thongs or nylon webs that are manually tied or connected to one another or other structures. The entire unitary textile material can be produced through machine implemented, mechanical manipulation of strands on an automated pocket assembly machine thereby producing weaved, knitted or some other textile material. Large diameter or dimension (greater than 1.0 mm, greater than 2.0 mm and/or greater than 3.0 mm) laces, webs and strings are not knitted or weaved directly with the strands of the unitary textile material. However, these large diameter or dimension laces, webs or thongs can be snaked through tubular components or other structures integrally formed in the knitted or weaved structure as described below or placed through holes defined by the knitted or weaved structure. This is not the same as those elements being knitted (interlooped) or weaved with the strands of the unitary textile material; and this contrasts conventional traditional lacrosse pockets, which are formed almost substantially from large diameter or dimension (greater than 1.0 mm, greater than 2.0 mm and/or 3.0 mm) laces, webs, runners and thongs.

The pocket 1810 can include all the features and functionality of the current embodiment pocket 1310 as well. In addition, the pocket can be integrally molded to a lacrosse head 120 (shown in broken lines), where the head and pocket have the same structural and functional characteristics as those of the head and pockets in any of the embodiments above. In addition, the head and pocket can be integrally combined and/or formed using the same structure and methods as described in connection with the embodiments above.

In this second embodiment shown in FIGS. 57-60, however, a particular method of manufacturing a lacrosse pocket 1810, for example, that of the current embodiment, that can be separate or integral with a lacrosse head is provided. In general, to perform the method, an automated pocket assembly machine, similar to any of those described in the embodiments above, for example, as shown in FIGS. 16, 23, 28 and 35, can mechanically manipulate a plurality of first strands and a plurality of second strands during an automated process to form a lacrosse pocket body 1810 during the automated process. That formed lacrosse pocket body can include a predefined, three dimensional, concave shape, and can have a lower pocket portion, an upper pocket portion and a middle pocket portion therebetween. The automated pocket assembly machine can form a perimeter flange 1810PF in the pocket body 1810 during the automated process. The perimeter flange 1810PF can include the plurality of first strands interlooped with one another. The perimeter flange can include an outer edge 1860 that is intermittently interrupted by a plurality of voids 1861 defined by the perimeter flange 1810PF. The automated assembly machine can form at least one of the upper pocket portion 1810U, the lower pocket portion 1810L and the middle pocket portion MP5 to include the plurality of second strands interlooped with one another, and with ones of the plurality of first strands so that the perimeter flange 1810PF and the at least one of the upper pocket portion, the lower pocket portion and the middle pocket portion form a unitary textile material. Optionally, this unitary textile material is void of any large diameter or dimension (greater than 1.0 mm, greater than 2.0 mm and/or greater than 3.0 mm) laces, webs and strings that are knitted or weaved directly with the strands of the unitary textile material. Further optionally, when the pocket body 1810 is joined with a lacrosse head, for example during a molding process as described below, the connection between the lacrosse pocket body and in particular the unitary textile material does not include an is void of any of the above-mentioned large diameter or dimension laces, webs and strings. The connection can merely be between the remaining strips 1862 of perimeter flange 1810PF, which themselves form an integral piece of the unitary textile material, and the corresponding molded over portion of the lacrosse head.

The method also can include forming the perimeter flange 1810PF to have an edge width SW8 when the lacrosse pocket body is in an unloaded state (FIG. 59), without a lacrosse ball therein. The perimeter flange 1810PF and its respective voids 1861 are configured to stretch so that the edge width increases when the lacrosse pocket is in a loaded state with the lacrosse ball therein, thereby providing dampening to the lacrosse pocket body when a lacrosse ball exerts force upon the lacrosse pocket body in the loaded state.

Figure 60:
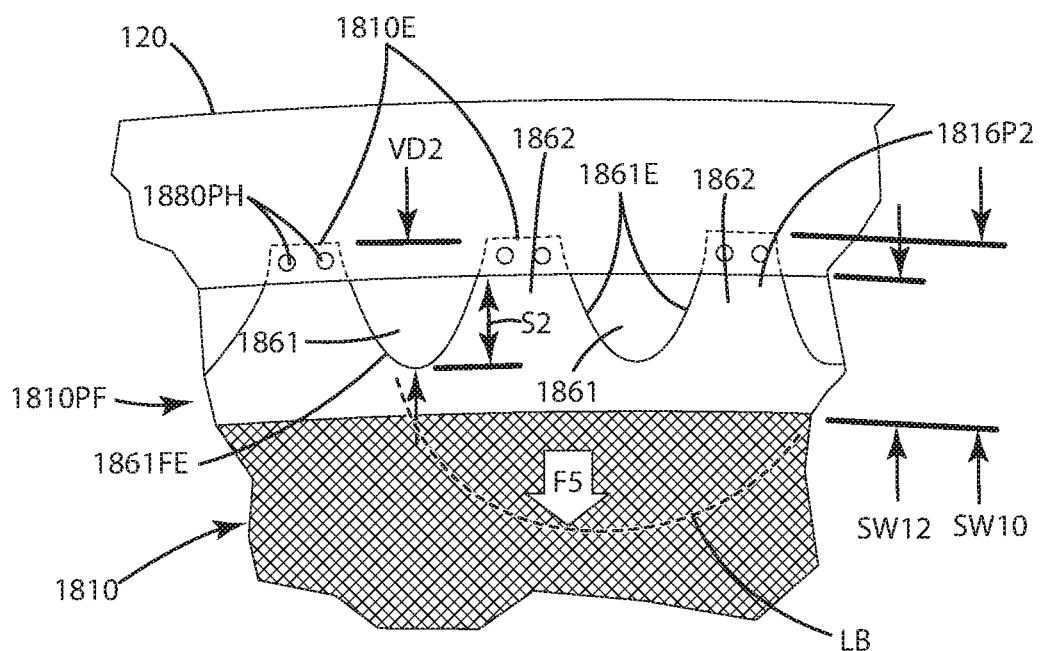
FIG. 60 is a side view of the lacrosse pocket of the fifth alternative embodiment with the perimeter flange in a loaded state.

To understand the dynamic, stretchable nature of the perimeter flange 1810PF and its features, reference is made to FIGS. 59-60. FIG. 59 illustrates the overall edge width SW9 of the perimeter flange 1810PF and/or an associated edge of the lacrosse pocket body 1810. This edge width SW9, however is the actual width of the perimeter flange or edge when the lacrosse pocket body 1810 is in an unloaded state. Typically the unloaded state is achieved when a lacrosse ball is absent from the pocket. In some cases however, when the ball is in the lacrosse pocket body but not exerting any forces on the lacrosse pocket body, that lacrosse pocket body still can be considered in an unloaded state. In some constructions, the edge width SW9 can be dynamically alterable depending on whether the pocket body 1810 is in a loaded state or an unloaded state.

For example, where the perimeter flange 1810PF includes the voids 1861, it is configured to stretch, widen and/or elongate so that the edge with SW9 increases to an edge width SW10 when the lacrosse pocket body 1810 is in a loaded state shown in FIG. 60. This loaded state can be achieved when the lacrosse ball LB shown in broken lines exerts a force F5 on the lacrosse pocket body 1810. In turn, this causes all of the joined strands of the lacrosse pocket body to react. The forces ultimately transfer through to the perimeter flange 1810PF and in particular through the strips 1862 which connect the remainder of the lacrosse pocket body to the lacrosse head. As a result of that force transfer, and the stretchable, elastic properties of the material of the strands and yarn in the perimeter flange 1810PF, primarily due to the voids being defined therein, that perimeter flange, and in particular the strips 1862 are able to stretch in direction S2, and thus increase in width from SW9 to SW10. In cases where the portion 1816P1 of the perimeter flange 1810PF and more particularly of an individual connector strip 1862, is located within and molded over by the lacrosse head portion 120, that portion 1816P1 may remain at a static width, that is, the portion does not change in width because it is trapped in the polymeric material of the lacrosse head. In contrast, however the second portion 1816P2 of the strip 1862 and generally the perimeter flange 1810PF can change its width from SW11 to SW12. Thus, part of the perimeter flange and strips can remain a constant width (inside the molded lacrosse head portion 120), while the remainder of the perimeter flange below the head can vary in width such that the total edge width SW9 increases to a second width SW10.

It is been discovered that the edge width of a perimeter flange 1810PF, constructed to include the respective voids 1861 and corresponding connector strips 1862 can increase upon loading to a loaded state an amount that is suitable to provide dampening to the remainder of the lacrosse pocket body when the ball exerts the force on the lacrosse pocket body. In turn, the ball can be less likely to be deflected out of the pocket upon catching. The pocket also is provided with more elasticity so that an apex of the pocket can move away from the lowermost portions of the sidewalls, thereby giving the pocket a deeper feel to a player when the pocket is loaded with a ball. This extra elasticity in the perimeter flange also can eliminate excessive noise upon entry and/or exit of the lacrosse ball from the pocket.

To provide this dynamic edge width, the perimeter flange can be formed with the voids 1861 and connector strips 1862 dimensioned so that the perimeter flange 1810PF stretches or elongates in a manner to increase the edge width, when transitioning from an unloaded state to a loaded state (or a more loaded state), optionally by at least 1.0%, at least 2.5%, at least 5%, at least 10%, at least 15%, 5% to 25%, 5% to 15% and/or 1% to 25%. Of course, other percentages of the increase in edge width can be selected. The foregoing percentages however have been found to provide good dampening for the lacrosse pocket body, without increasing the springiness or bounciness of the lacrosse pocket body, which could lead to the lacrosse ball being inadvertently ejected from the lacrosse pocket. It is to be noted that in transitioning from the loaded state to an unloaded state, the edge width can decrease by corresponding percentages.

Turning now to FIGS. 57-58, the structure of the voids 1861 and the connector strips 1862 will now be described in further detail. As mentioned above, the perimeter flange 1810PF can terminate generally at an outer edge 1810E. This edge can be constructed to include a plurality of knitted and/or weaved strands that are uncut and that generally are interlooped, crisscrossed or interwoven with one another (all three being referred to as interlooped herein). This edge can be generally free upon completion of the mechanical manipulation of the strands to form the lacrosse pocket body. Optionally, it also can be free from surrounding material that can be cut or otherwise removed from the lacrosse pocket body after the mechanical manipulation in the automated machine. Alternatively, in some cases, this edge can be cut so that the respective voids are formed in the perimeter flange.

As shown, the outer edge 1810E can be interrupted multiple times along its length surrounding the lacrosse pocket body 1810 by the plurality of voids 1861. The voids 1861 can be spaced equidistant from one another in some cases, or can be placed at strategic differential distances from one another to provide or stretch and/or elasticity to the perimeter flange in certain regions of the lacrosse pocket body 1810. As an example, in the scoop, there can be fewer voids 1861 and the spacing between the voids can be greater so that the upper pocket portion 1810U can remain more taught and less elastic. In contrast, the middle pocket portion MP5 and/or the lower pocket portion 1810L can include more pocket voids having less spacing between the voids, so that the middle pocket portion and/or lower pocket portion can stretch more, to provide enhanced ball retention and cradling capabilities in those regions. As another example, voids can be defined in regions of the perimeter flange where it difficult to install in a mold. In particular, the perimeter flange 1810PF can define corner voids 1861C in the respective upper corners of the lacrosse pocket body. This in turn can reduce the amount of tension exerted to stretch the lacrosse pocket body along the upper portion and fit the pocket onto a mold.

As shown in FIGS. 57-60, the voids 1861 can be of a partial circular, parabolic, rounded, and or elliptical shape, all of which can be referred to as a scalloped shape herein. Indeed, the voids themselves can be referred to as scallops. Of course, although not shown, the voids or scallops can be of other rounded, circular and/or polygonal shapes as well, such as a triangular shape, a square shape, a rectangular shape, a trapezoidal shape all of which can be referred to as polygonal shapes herein. Each respective void can be at least partially bounded by a void perimeter 1861VP, which optionally can be the location where a knitted structure terminates at a free edge, further optionally such that the free edge is formed immediately upon the end of a knitting or weaving operation so that no material need be removed from the free edge to form the perimeter. Of course, in other applications, the void perimeter can be formed by cutting or removing waste or other material from an edge of the material in a secondary operation after knitting or weaving operations are complete. The void perimeter 1861VP can have a corresponding shape as the void. The void perimeter also can transition directly to the outer edge 1810E, and can be continuous with that outer edge. Optionally, the void perimeter can form the void so that the void is inwardly extending relative to the outer edge. The void perimeter also can terminate so that the void opens at the outer edge 1810E. In some cases, the void optionally does not form a closed, fully bounded hole through the perimeter flange.

Figure 61:
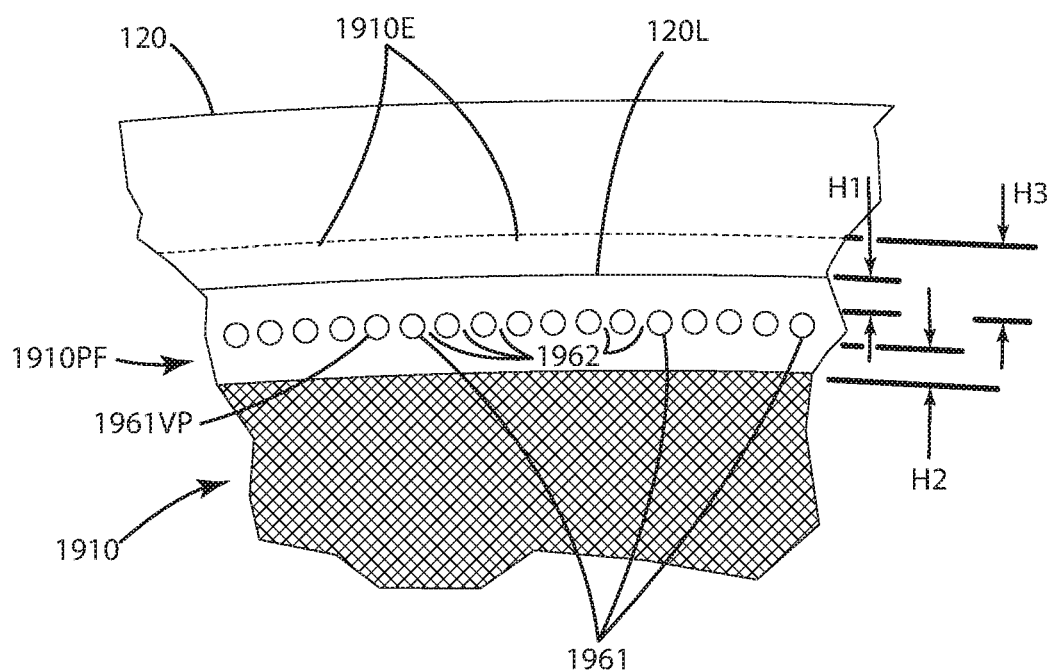
FIG. 61 is a side view of a lacrosse pocket of a sixth alternative embodiment showing another configuration for voids in a perimeter flange.

Further optionally, in other cases, as shown in a sixth alternative embodiment of FIG. 61, the voids 1961 can form closed, fully bounded holes through the perimeter flange 1910PF. As illustrated, these voids 1961 can be in the form of open through holes in the perimeter flange 1910PF. Although shown in the form of circular through holes, these voids can have void perimeters 1961VP having other rounded shapes, such as ellipses and/or can be in the form of polygonal shapes such as rectangles, triangles and squares. Optionally, as shown in FIG. 61, the holes also can be spaced inwardly from the outer edge 1910E a distance H3, and inward from the lowermost portion of the lacrosse head portion 120 that is molded over or otherwise joined with the perimeter flange 1910PF. The distance H1 can be optionally 0.1 mm to 10 mm, further optionally 1 mm to 3 mm, yet further optionally about 2 mm. By separating the voids from the area of the perimeter flange that is overmolded by the lacrosse head portion, seal off within a mold cavity can be simplified to prevent molten material forming the lacrosse head portion from squirting out in locations where the perimeter flange is not present in the mold. The voids also can be distal from the remainder of the pocket body 1910 by distance H2. This distance H2 can be equal to or different from the distance H1, depending on the particular application. Optionally, the distance H2 can be greater than distance H3, such that the voids 1961 are offset from the outer edge 1910E a greater distance than they are offset from the remainder of the pocket body 1910.

As further shown in FIG. 61, the voids 1961 can be unfilled, that is, there are no laces or other structures extending transversely through and/or penetrating the perimeter flange through these voids, such as a lacing to string the pocket to the lacrosse head portion, which again, optionally might not be present. The voids also can be structured so that they are separated by connector strips 1962 which can mirror the shape of the voids 1961. Of course, when a lacrosse ball exerts a force on the remainder of the pocket body 1910, as explained below, the strips 1962 can stretch slightly so that the overall width of the perimeter flange 1910PF can increase. The voids 1961 can assist in allowing the connector strips 1962 to stretch. Indeed, when the perimeter flange is stretched, the voids deform from the shape as illustrated in FIG. 61 to an elongated form of that shape. For example, a circular hole can transform into an elliptical hole due to the flange and material stretching when a ball is in the pocket.

Returning to the fifth embodiment in FIGS. 59 and 60, the void perimeter 1861VP of each respective void 1861 can include a free edge 1861 E. This free edge extends toward the outer edge 1810E where the void is in the form of an open recess. This free edge can be constructed to include a plurality of knitted and/or weaved strands that are uncut and that generally are interlooped, crisscrossed or interwoven with one another (all three being referred to as interlooped herein). This free edge can be generally free upon completion of the mechanical manipulation of the strands to form the lacrosse pocket body. Optionally, it also can be free from surrounding material that can be cut or otherwise removed from the lacrosse pocket body after the mechanical manipulation in the automated machine. Alternatively, in some cases, this free edge 1861E can be cut to form one or more perimeters of voids. Further optionally, this free edge and the void perimeter can be of a curvilinear configuration and can transition to a linear outer edge. Even further optionally, if the perimeter flange is overmolded material to form a portion or a lacrosse head, the free edge or at least portions thereof 1861 FE can remain un-engaged by the material, so that after the overmolding operation, the free edge remains free and unconstrained along a length thereof by the portion of the lacrosse head and the polymeric material does not engage a portion of the free edge so that the portion of the free edge remains free.

Each of the respective voids also can include a void depth VD1, which is generally the distance between a continuation of the outer edge 1810E and the apex or lowest point of the void as shown in FIG. 59. As explained above, the perimeter flange can dynamically change in edge width. When this occurs, the void depth can change from VD1 to VD2. The proportion of change can be the same as the percentages of change of the edge with increasing when the lacrosse pocket body 1810 is in a loaded state, as described above.

As mentioned above, adjacent respective voids can be separated by connector strips 1862. These connector strips can each be bounded by the outer edge and a portion of the void perimeter and its respective free edge. The connector strips 1862 can be integrally formed with the perimeter flange and the remainder of the lacrosse pocket body. The strands and/or yarns forming portions of the connector strips can extend to and be interlooped with other strands of the respective lacrosse pocket body portions as well as other portions of the perimeter flange. Optionally, in the regions where the voids or scallops are formed between the connector strips in an optional knitted pocket, the number of stitches can be decreased in the form of columns or wales to effectively eliminate more columns or wales from being formed in the regions, which in turn produces the voids. Alternatively, the number of stitches also can be increased to effectively produce more columns or wales in the areas where the connector strips are located, which in turn produces those strips there. In other optional constructions utilizing a knitting machine to produce the pocket, rows of knitted strands can be cast on and off to produce voids.

As shown in FIG. 57, the connector strips 1862 of the perimeter flange can be of a particular construction so that their width PW1 is substantially greater than their thickness T9. In some cases, the width PW1 is at least 5, at least 10, at least 20 times the thickness T9. Further, the strips can include a length PL1 that also is substantially greater than their thickness T9. In some cases, the length PL1 is at least 5, at least 10, at least 20 times or greater than their thickness T9. Further optionally, the strips 10 can be form so that the thickness T9 substantially uniform across the width PW1. Thus, a cross-section of an individual strip can in some cases resemble a rectangular shape, rather than a circular or ellipsoid shape. Of course these other shapes can be created depending on the particular knit or weave pattern used in the strips. Generally however, the strips optionally might not resemble or have a cross-section similar to that of large diameter or dimension laces.

As mentioned above, the lacrosse pocket body 1810 can be formed via mechanical manipulation of strands by an automated pocket assembly machine. After the pocket body is constructed, it can be further processed for inclusion in a lacrosse head. As an example, the pocket body 1810 can be joined with a lacrosse head 120 by molding polymeric material over the unitary textile material of the lacrosse pocket body 1810. The polymeric material can be in a molten and/or fluid state and can encapsulate and embed within strands of the lacrosse pocket body 1810 more particularly the portions of the perimeter flange 1810PF as described below.

A particular production operation will now be described in more detail. To begin, the pocket body 1810 can be formed by the automated assembly machine. The lacrosse pocket body 1810 can be placed adjacent a mold so that portions of the perimeter flange and in particular the connector strips 1862 are located within a mold cavity configured to form a portion of a lacrosse head, for example a sidewall, a base and/or a scoop. The remainder of the lacrosse pocket body however can remain outside the mold cavity.

As shown in FIG. 59, the portion 1816P1 of the perimeter flange and/or connector strip is placed in a mold cavity that is filled with the material forming the lacrosse head 120. In this manner, the outer edge 1810E is also placed in the mold cavity so that the strands of that portion can be engaged by, encapsulated by and/or embedded within the polymeric material during the molding process. The portion of the perimeter flange 1816P2 however is not placed in the mold cavity that is filled with the material forming the lacrosse head 120. Thus, the strands of that portion are not engaged by, encapsulated by or embedded within the polymeric material during the molding process.

Optionally, to facilitate connection of the outer edge 1810E and in particular the connector strips 1862 to the mold, the perimeter flange optionally can define a plurality of pinholes 1880PH, through which one or more pins, such as pins 1380 in FIG. 5 of the embodiment described above, or pins 1880PP in FIG. 59, can be placed through. The pins interaction with these pinholes can thus firmly hold the connector strips in a fixed location within a mold cavity. These pinholes also can be separately formed from the voids 1861 and optionally fully bounded by the material of the connector strips so they form a closed through hole extending through the perimeter flange 1810PF at the ends of the connector strips adjacent the outer edge 1810E. As illustrated, there can be two pinholes for each connector strip. This can assist in ensuring that the connector strip does not deform or curl excessively when being molded over. Of course, other numbers of pinholes 1, 3, 4, 5, etc. in different configurations can be defined by the connector strips and other corresponding numbers of pins can likewise be used. In addition, as optionally shown in FIG. 59, the lacrosse head portion 120 can be molded over the connector strips 1862, while seal off gates 1883 can prevent the molten material from squirting or projecting past the mold cavity and into the voids 1861 below the lowermost 120L portion of the lacrosse head to prevent unwanted or excessive flashing.

The void perimeter 1861VP can be partially within the mold cavity and thus molded over by the portion of the lacrosse head 120 during the molding process. The portion of the void perimeter that is not placed within the mold cavity is not however molded over by a portion of the lacrosse head 120. In that regard, the polymeric material that forms the portion of the lacrosse head does not engage, encapsulate or embed the free edge 1861 E. Thus, this free edge remains truly free and able to dynamically stretch or change in shape depending on the unloaded or loaded state of the lacrosse pocket body.

As shown in FIGS. 59 and 60, the perimeter flange can be overmolded by the polymeric material to form the portion of the lacrosse head such that a void gap VG is formed between the outermost portion 1861O of the free edge or void in general, and the lowermost portion 120L of the lacrosse head 120. This void gap of course can increase in depth when the perimeter flange is widened during loading of the lacrosse pocket body. The amount of increase in depth of the void gap can be proportional to and/or the same as the increase in the edge width described above.

After the polymeric material is molded over the portions of the perimeter flange described above, the material is allowed to cure. This in turn forms a cured lacrosse head but the respective portions that are molded over the perimeter flange. As a result, the lacrosse pocket body 1810 is permanently joined with the cured lacrosse head so that the lacrosse pocket cannot be removed there from without destroying the pocket body and/or the lacrosse head.

Figure 62:
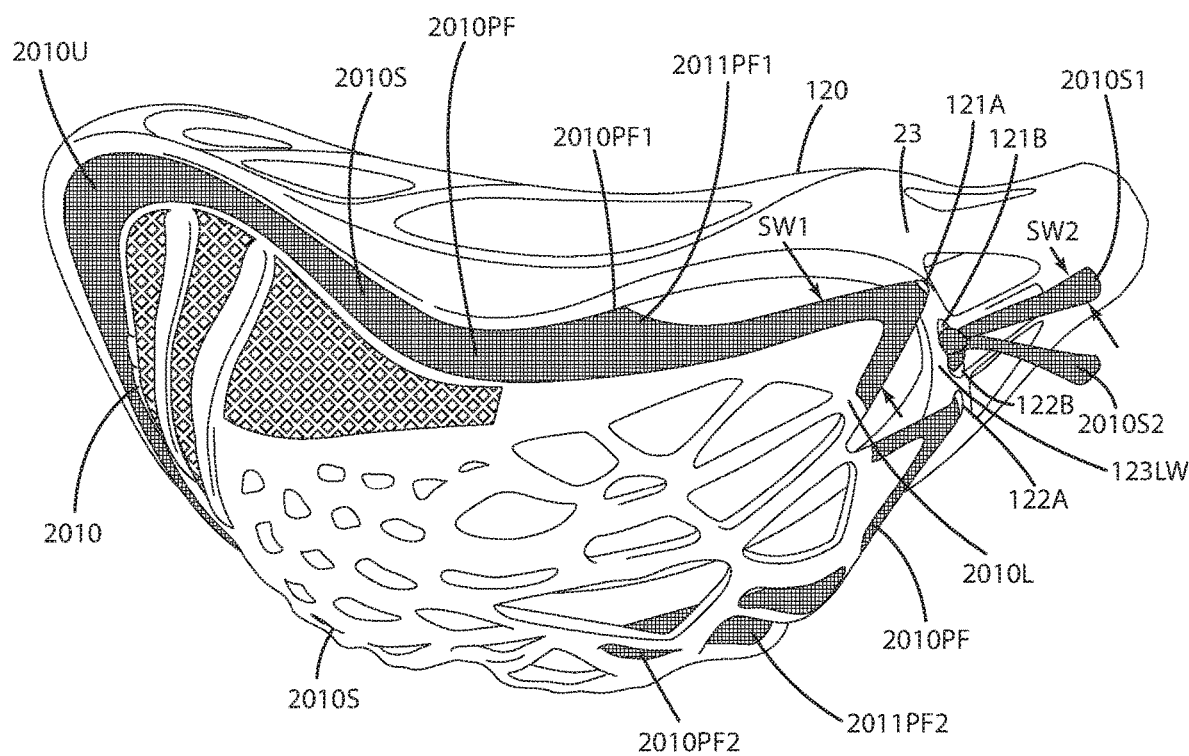
FIG. 62 is a bottom view of a lacrosse pocket of the seventh alternative embodiment showing a hybrid pocket partially molded to the head and partially strung to the head via straps through string holes.
Figure 63:
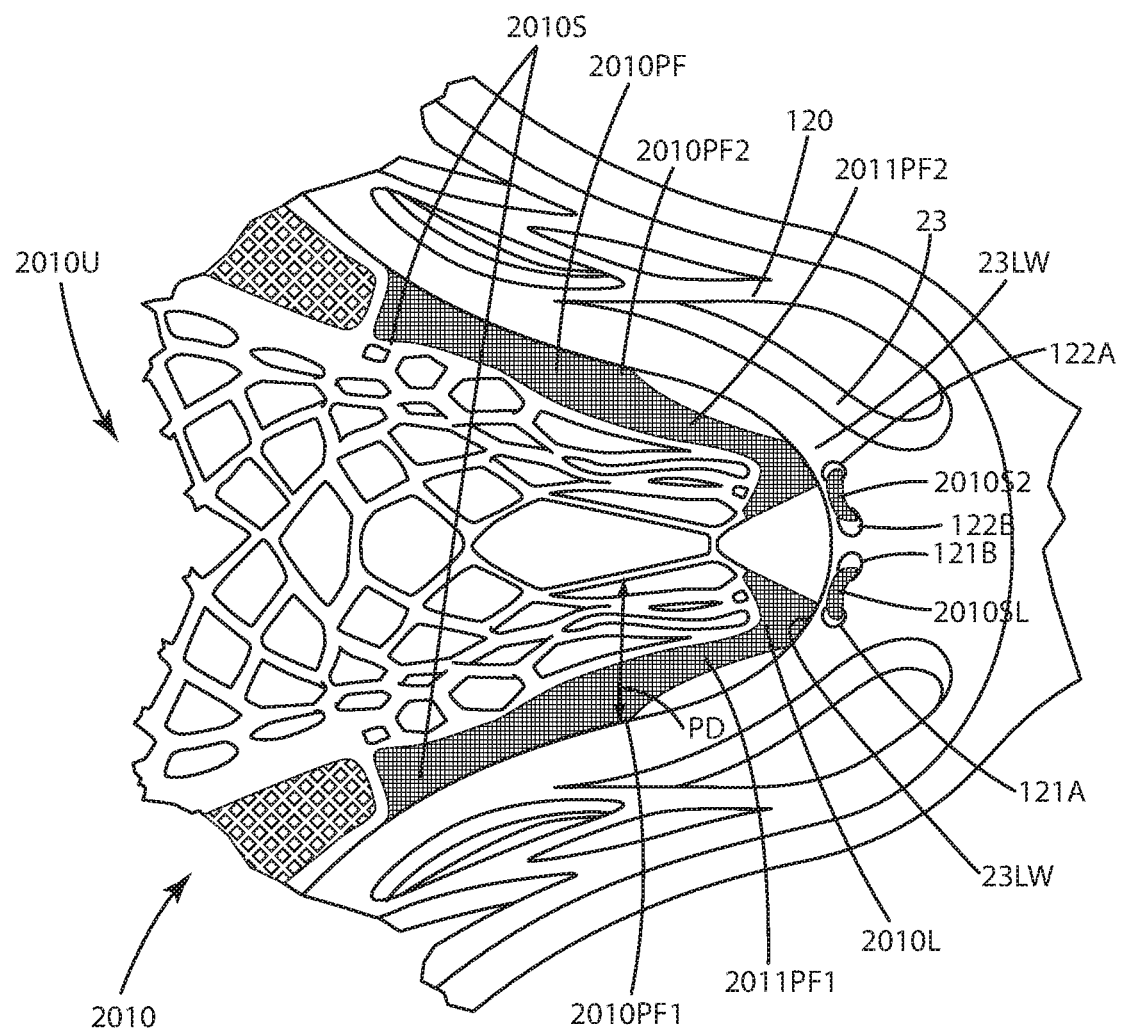
FIG. 63 is a top view of a lacrosse pocket of the seventh alternative embodiment.

A modification of the fifth and sixth embodiments of the pocket is shown in the pocket 2010 of a seventh embodiment in FIGS. 62 and 62, which is similar in structure, function and operation to the embodiments herein with several exceptions. This pocket 2010 can be a hybrid of the fifth and sixth embodiments, but can include integrally formed laces or straps 2010S1 and 2010S2 that are strung through string holes 121A and 121B, as well as 122A and 122B, respectively. This pocket can include a perimeter flange 2010PF that is substantially molded into, engaged by, encapsulated by and/or embedded within the polymeric material that forms the head 120 during the molding process up to respective first and second terminus portions 2010PF1 and 2010PF2. These terminus portions can transition to free portions 2011PF1 and 2011 PF2, which are not placed in the mold cavity that is filled with the material forming the lacrosse head 120. Thus, the free portions 2011PF1 and 2011PF2, also referred to as free edges, like those in the above embodiments, are not substantially molded into, engaged by, encapsulated by and/or embedded within the polymeric material that forms the head 120. These free portions can extend to the lower portion 2010L of the pocket 2010. Like the remainder of the pocket, these free portions or free edges can be integrally formed as part of the unitary textile material. These free portions, or other parts of the pocket, can further transition to integral first and second straps 2010S1 and 201052, which can be formed as free edges as well in some application. These straps can extend outward from and beyond the lower portion 2010L of the pocket, and can be formed integrally as part of the unitary textile material, having been formed as the pocket itself was knitted, weaved or otherwise mechanically produced, rather than in a secondary operation after such forming of the pocket and its shapes and contours as explained in other embodiments herein. Each strap can be formed from a single layer of textile material, or each strap can have a tubular configuration (for example as shown in FIG. 12) that is effectively formed from two layers of the textile material.

Although shown as forming two extensions of the perimeter flange, and in particular the free portions 2011PF1 and 2011PF2, these straps 2010S1 and 201052 can extend from any part of the pocket, and can be of any number. For example, the straps can extend from the lower portion 2010L as shown or can extend in other areas such as the upper portion 2010U or along the sides 2010S, or along multiple ones of these areas. These straps can be tapering in width from near the pocket to away from the pocket at respective ends of the straps so that the ends are lesser in width SW2 nearer the ends and a greater width SW1 near the pocket. Of course, the straps can be a unitary width depending on the application. The ends can be small enough in dimension so that they can fit through the string holes 121A and 121 B, as well as 122A and 122B, respectively. As an example, the ends and intermediate parts of the straps can be threaded through those holes in any particular order, and can extend rearward from a lower wall 23LW of the base 23 of the head. Those ends can then be tied or otherwise fastened to one another or to some other structure, such as part of the head, to secure the straps to the head. In this manner, the lower portion 2010L of the pocket can be secured to the head via tied straps, rather than being molded into the head as the upper portion of the pocket or sides of the pocket. The straps can be tightened to any desired tightness, to manually adjust the depth PD of the pocket near the base 23.

The straps can have a length that is sufficient to allow the straps to extend through the string holes and to be tied. That length can be optionally between two inches and twelve inches, inclusive, further optionally between three inches and eight inches, depending on the desired pocket depth PD adjustment range and the location of the terminus portions of the pocket molded into the sidewalls of the head. Further optionally, in some cases, the ends of the straps can include a fastener (not shown), such as a hook-and-loop fastener, such as VELCRO®, but they may also be snaps, buttons, or other desired fasteners to secure the ends to one another or to the head to set the length of the straps and the pocket depth with those straps.

To construct the embodiment shown in FIGS. 61-62, processes very similar to the processes in the embodiments herein can be followed, with a few modifications. For example, to begin, the pocket body 2010 can be formed by the automated assembly machine. Integrally formed with the pocket body can be the straps 2010S1 and 201S2 extending from the lower portion 2010L, or some other portion depending on the application. The lacrosse pocket body 2010 can be placed adjacent a mold so that portions of the perimeter flange are located within a mold cavity up to the terminus portions 2010PF1 and 2010PF2. These terminus portions can transition to free portions 2011 PF1 and 2011 PF2, which along with the straps and the remainder of the lacrosse pocket body, are not placed in the mold cavity. Thus, when the material forming the lacrosse head 120 is injected into the mold cavity, these free portions 2011PF1 and 2011PF2 and the straps 2010S1 and 2010S2 are not substantially molded into, engaged by, encapsulated by and/or embedded within the polymeric material that forms the head 120. The straps thus remain free, and can be held away from the mold cavity to prevent them from being engaged by molten material of the head as it forms. After the remainder of the perimeter flange is permanently joined with the head, and the head material cures as described in the embodiments above, the head, with the pocket attached to it can be removed from the mold. The straps can be strung thought the respective string holes, for example, those 121A, 121 B and 122A, 122B and extended so the ends extend beyond the lower wall 23LW, away from the pocket. Those ends can then be secured to one another by tying them. The precise tying length can be selected based on a desired pocket depth and/or feel of the pocket to a user. Thus, with the tying complete, a portion of the pocket is integrally molded to the head, and another portion is tied to the head via straps strung through string holes in the head.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the broader aspects of the invention as defined in the appended claims, which are to be interpreted in accordance with the principles of patent law including the doctrine of equivalents. To the extent any definitions, interpretation or construction herein conflict with definitions, interpretations or construction of similar items in any item incorporated by reference herein, the definitions, interpretations or construction herein shall govern. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of making a lacrosse pocket comprising:
  mechanically manipulating a plurality of first strands and a plurality of second strands with an automated pocket assembly machine during an automated process to form a lacrosse pocket body during the automated process, the lacrosse pocket body including a predefined, three dimensional, concave shape, the lacrosse pocket body having a lower pocket portion, an upper pocket portion and a middle pocket portion therebetween;
  forming a perimeter flange in the lacrosse pocket body during the automated process, the perimeter flange including the plurality of first strands interlooped with one another,
  forming at least one of the lower pocket portion, the upper pocket portion, and the middle pocket portion of the lacrosse pocket body with the plurality of second strands interlooped with one another, and with ones of the plurality of first strands so that the perimeter flange and at least one of the lower pocket portion, the upper pocket portion, and the middle pocket portion form a unitary textile material,
  wherein the plurality of first strands are constructed from a first material that is polyamide 6,6 and are in the form of a first yarn having a plurality of first twisted filaments, the first yarn having a tenacity of 7 g-f/denier to 10 g-f/denier, the first material having an elongation at break of between 30% and 50%,
  wherein the perimeter flange includes an edge width of 2.5 mm to 15.0 mm when the lacrosse pocket body is in an unloaded state, without a lacrosse ball therein,
  wherein the perimeter flange with its first yarn is configured to stretch so that the edge width increases at least 2.5% when the lacrosse pocket is in a loaded state with the lacrosse ball therein, thereby providing dampening to the lacrosse pocket body when a lacrosse ball exerts force upon the lacrosse pocket body in the loaded state.

2. The method of claim 1, comprising:
  mechanically manipulating the plurality of first strands so the perimeter flange substantially surrounds the lacrosse pocket body,
  wherein the at least one of the lower pocket portion, the upper pocket portion, and the middle pocket portion inside the perimeter flange is constructed from the plurality of second strands which are constructed from a second material, first individual ones of the plurality of second strands being in the form of a second yarn having a plurality of second twisted filaments, the second yarn having an elongation at break of between 10% and 30%.

3. The method of claim 2,
  wherein second individual ones of the plurality of second strands are constructed from a third material that is polyethylene and are in the form of a third yarn having a plurality of third twisted filaments, the third yarn having an elongation at break of between 5% and 25%.

4. The method of claim 3 comprising:
  mechanically manipulating the third yarn to produce first and second runner elements disposed on opposite sides of a longitudinal axis of the lacrosse pocket body.

5. The method of claim 4 comprising:
  mechanically manipulating the second yarn to produce a first side portion between the first runner element and the perimeter flange, and a second side portion between the second runner element and the perimeter flange.

6. The method of claim 1, comprising: wherein the density of the first yarn is between 0.90 g/cm3 and 1.2 g·cm3.

7. A method of manufacturing a lacrosse pocket comprising:
  mechanically manipulating a plurality of first strands and a plurality of second strands with an automated pocket assembly machine during an automated process to form a lacrosse pocket body during the automated process, the lacrosse pocket body including a predefined, three dimensional, concave shape, the lacrosse pocket body having a lower pocket portion, an upper pocket portion and a middle pocket portion therebetween;
  forming a perimeter flange in the pocket body during the automated process, the perimeter flange including the plurality of first strands interlooped with one another,
  forming at least one of the upper pocket portion, the lower pocket portion and the middle pocket portion to include the plurality of second strands interlooped with one another, and with ones of the plurality of first strands so that the perimeter flange and the at least one of the upper pocket portion, the lower pocket portion and the middle pocket portion form a unitary textile material, and
  wherein the plurality of first strands are constructed from a first material that is polyamide 6,6 and are in the form of a first yarn having a plurality of first twisted filaments, the first yarn having tenacity of 7 g-f/denier to 10 g-f/denier,
  wherein the perimeter flange includes an edge width when the lacrosse pocket body is in an unloaded state, without a lacrosse ball therein,
  wherein the perimeter flange with its first yarn is configured to stretch so that the edge width increases by at least 1.0% when the lacrosse pocket is in a loaded state with the lacrosse ball therein, thereby providing dampening to the lacrosse pocket body when a lacrosse ball exerts force upon the lacrosse pocket body in the loaded state.

8. The method of claim 7, comprising:
  forming the perimeter flange so the edge width is configured to increase by at least 5% when the lacrosse pocket is in the loaded state.

9. The method of claim 7, comprising:
forming the perimeter flange so the edge width is configured to increase by 1% to 25% when the lacrosse pocket is in the loaded state.

10. A method of manufacturing a lacrosse pocket comprising:
mechanically manipulating a plurality of first strands and a plurality of second strands with an automated pocket assembly machine during an automated process to form a lacrosse pocket body during the automated process, the lacrosse pocket body including a predefined, three dimensional, concave shape, the lacrosse pocket body having a lower pocket portion, an upper pocket portion and a middle pocket portion therebetween;
forming a perimeter flange in the pocket body during the automated process, the perimeter flange including the plurality of first strands interlooped with one another, the perimeter flange including an outer edge that is intermittently interrupted by a plurality of voids defined by the perimeter flange, and defining individual ones of the plurality of voids to include a void perimeter that transitions to the outer edge and the void perimeter includes a free edge,
forming at least one of the upper pocket portion, the lower pocket portion and the middle pocket portion to include the plurality of second strands interlooped with one another, and with ones of the plurality of first strands so that the perimeter flange and the at least one of the upper pocket portion, the lower pocket portion and the middle pocket portion form a unitary textile material, and
introducing a molten polymeric material over the outer edge so that the polymeric material encapsulates and embeds within the plurality of first strands, but so that the polymeric material does not engage a portion of the free edge so that the portion of the free edge remains free.

11. The method of claim 10, comprising:
forming the perimeter flange to include an edge width when the lacrosse pocket body is in an unloaded state, without a lacrosse ball therein,
wherein the perimeter flange with the plurality of voids is configured to stretch so that the edge width increases when the lacrosse pocket is in a loaded state with the lacrosse ball therein, thereby providing dampening to the lacrosse pocket body when a lacrosse ball exerts force upon the lacrosse pocket body in the loaded state.

12. The method of claim 11, comprising:
forming the perimeter flange so the edge width is configured to increase by at least 2.5% when the lacrosse pocket is in the loaded state.

13. The method of claim 10 comprising:
curing the polymeric material to produce a cured lacrosse head having a scoop, a pair of sidewalls and a base, with the lacrosse pocket body permanently attached to the cured lacrosse head.

14. A method of manufacturing a lacrosse pocket comprising:
mechanically manipulating a plurality of first strands and a plurality of second strands with an automated pocket assembly machine during an automated process to form a lacrosse pocket body during the automated process, the lacrosse pocket body including a predefined, three dimensional, concave shape, the lacrosse pocket body having a lower pocket portion, an upper pocket portion and a middle pocket portion therebetween;
forming a perimeter flange in the pocket body during the automated process, the perimeter flange including the plurality of first strands interlooped with one another, the perimeter flange including an outer edge that is intermittently interrupted by a plurality of voids defined by the perimeter flange;
forming at least one of the upper pocket portion, the lower pocket portion and the middle pocket portion to include the plurality of second strands interlooped with one another, and with ones of the plurality of first strands so that the perimeter flange and the at least one of the upper pocket portion, the lower pocket portion and the middle pocket portion form a unitary textile material; and
introducing a polymeric material over the perimeter flange so that the polymeric material encapsulates and embeds within the plurality of first strands, but so that the polymeric material does not engage a free edge that bounds a portion of individual ones of the plurality of voids.

15. A method of manufacturing a lacrosse pocket comprising:
mechanically manipulating a plurality of strands with an automated pocket assembly machine during an automated process to form a lacrosse pocket body during the automated process, the lacrosse pocket body including a predefined, three dimensional, concave shape, the lacrosse pocket body having a lower pocket portion, an upper pocket portion and a middle pocket portion therebetween;
forming a perimeter flange in the pocket body during the automated process, the perimeter flange including the plurality of first strands joined with one another, the perimeter flange including an outer edge that is intermittently interrupted by a plurality of voids defined by the perimeter flange, the perimeter flange including an edge width when the lacrosse pocket body is in an unloaded state, without a lacrosse ball therein,
forming at least one of the upper pocket portion, the lower pocket portion and the middle pocket portion to include the plurality of strands so that the perimeter flange and the at least one of the upper pocket portion, the lower pocket portion and the middle pocket portion form a unitary textile material,
wherein the perimeter flange with the plurality of voids is formed so that the edge width increases when the lacrosse pocket is in a loaded state with the lacrosse ball therein, thereby providing dampening to the lacrosse pocket body when a lacrosse ball exerts force upon the lacrosse pocket body in the loaded state,
wherein the mechanically manipulating includes knitting the perimeter flange with the plurality of strands,
wherein the individual ones of the plurality of voids defined by the perimeter flange include a free edge extending toward and transitioning to the outer edge.

16. The method of claim 15 comprising:
molding a portion of a lacrosse head over the outer edge but not over a portion of the free edge, wherein a void gap is established between the portion of the lacrosse head and the portion of the free edge.

* * * * *